US010840982B2

(12) United States Patent
Zhang et al.

(10) Patent No.: US 10,840,982 B2
(45) Date of Patent: Nov. 17, 2020

(54) BEAMFORMING SWEEPING AND TRAINING IN A FLEXIBLE FRAME STRUCTURE FOR NEW RADIO

(71) Applicant: CONVIDA WIRELESS, LLC, Wilmington, DE (US)

(72) Inventors: Guodong Zhang, Woodbury, NY (US); Allan Y. Tsai, Boonton, NJ (US); Qing Li, Princeton Junction, NJ (US); Pascal M. Adjakple, Great Neck, NY (US); Lakshmi R. Iyer, King of Prussia, PA (US); Wei Chen, San Diego, CA (US); Joseph M. Murray, Schwenksville, PA (US)

(73) Assignee: Convidia Wireless, LLC, Wilmington, DE (US)

( * ) Notice: Subject to any disclaimer, the term of this patent is extended or adjusted under 35 U.S.C. 154(b) by 0 days.

(21) Appl. No.: 16/323,840

(22) PCT Filed: Aug. 11, 2017

(86) PCT No.: PCT/US2017/046483
§ 371 (c)(1),
(2) Date: Feb. 7, 2019

(87) PCT Pub. No.: WO2018/031875
PCT Pub. Date: Feb. 15, 2018

(65) Prior Publication Data
US 2019/0229789 A1    Jul. 25, 2019

Related U.S. Application Data

(60) Provisional application No. 62/373,662, filed on Aug. 11, 2016, provisional application No. 62/417,162, filed on Nov. 3, 2016.

(51) Int. Cl.
H04B 7/02      (2018.01)
H04B 7/06      (2006.01)
H04W 16/28     (2009.01)

(52) U.S. Cl.
CPC ......... *H04B 7/0617* (2013.01); *H04B 7/0695* (2013.01); *H04W 16/28* (2013.01)

(58) Field of Classification Search
CPC .. H04B 7/0617; H04B 7/0695; H04B 7/0417; H04B 7/0669; H04W 16/28; H04L 1/0618; H04L 1/06; H04L 25/0204
(Continued)

(56) References Cited

U.S. PATENT DOCUMENTS 8,902,773 B2    12/2014   Anderson et al.
9,002,979 B2     4/2015   Hansen
(Continued)

FOREIGN PATENT DOCUMENTS

CN    104205930 A    12/2014
EP     2464076 A2     6/2012
(Continued)

OTHER PUBLICATIONS

3GPP TSG GERA1 Adhoc #3 GPC150521, Samsung Electronics, "Discussions of Grant-Free Multiple Access in CIoT (Update GPC150512)", Jul. 2015, 9 pages.
(Continued)

Primary Examiner — Zewdu A Kassa
(74) Attorney, Agent, or Firm — BakerHostetler

(57) ABSTRACT

The present application is at least directed to an apparatus on a network including a non-transitory memory including instructions stored thereon for beamforming training during an interval in the network. The apparatus also includes a processor, operably coupled to the non-transitory memory, capable of executing the instructions of receiving, from a
(Continued)

new radio node, a beamforming training signal and beam identification for each of plural beams during the interval. The processor is also configured to execute the instructions of determining an optimal transmission beam of the new radio node based on the beamforming training signals of the plural beams. The processor is further configured to execute the instructions of transmitting, to the new radio node, a signal including a beam identification of the optimal transmission beam and an identification of the apparatus during the interval. The processor is further configured to execute the instructions of receiving, from the new radio node, an optimal transmission beam for the apparatus including a beam identification based upon a determination from the new radio during the interval.

20 Claims, 42 Drawing Sheets

(58) Field of Classification Search
USPC ............... 375/267, 260, 259, 316, 295, 219
See application file for complete search history.

(56) References Cited

U.S. PATENT DOCUMENTS

| | | |
|---|---|---|
| 9,198,181 B2 | 11/2015 | Blankenship et al. |
| 9,338,700 B2 | 5/2016 | Schulist et al. |
| 9,413,451 B2 | 8/2016 | Park et al. |
| 10,306,671 B2 | 5/2019 | Li et al. |
| 2008/0205351 A1 | 8/2008 | Lindoff et al. |
| 2009/0298497 A1 | 12/2009 | Lee |
| 2009/0323607 A1 | 12/2009 | Park et al. |
| 2010/0027466 A1 | 2/2010 | Mustapha |
| 2010/0035611 A1 | 2/2010 | Montojo et al. |
| 2010/0061361 A1 | 3/2010 | Wu |
| 2010/0227611 A1 | 9/2010 | Schmidt et al. |
| 2011/0077013 A1 | 3/2011 | Cho et al. |
| 2011/0222428 A1 | 9/2011 | Charbit et al. |
| 2011/0242997 A1 | 10/2011 | Yin |
| 2012/0009963 A1 | 1/2012 | Kim et al. |
| 2012/0127934 A1 | 5/2012 | Anderson et al. |
| 2013/0017833 A1 | 1/2013 | Sakamoto et al. |
| 2013/0034071 A1 | 2/2013 | Lee et al. |
| 2013/0155847 A1 | 6/2013 | Li et al. |
| 2013/0225184 A1 | 8/2013 | Liu et al. |
| 2013/0265932 A1 | 10/2013 | Huang et al. |
| 2014/0036806 A1 | 2/2014 | Chen et al. |
| 2014/0086217 A1 | 3/2014 | Park et al. |
| 2014/0204854 A1 | 7/2014 | Freda et al. |
| 2014/0206854 A1 | 7/2014 | Bennett et al. |
| 2014/0223095 A1 | 8/2014 | Storm et al. |
| 2014/0254544 A1 | 9/2014 | Kar et al. |
| 2014/0293901 A1 | 10/2014 | Hegde |
| 2014/0315593 A1 | 10/2014 | Vrzic et al. |
| 2014/0321375 A1 | 10/2014 | Agiwal et al. |
| 2014/0369201 A1 | 12/2014 | Gupta et al. |
| 2015/0103725 A1 | 4/2015 | Sun et al. |
| 2015/0223279 A1 | 8/2015 | Jiao et al. |
| 2015/0234708 A1 | 8/2015 | Storm et al. |
| 2015/0282130 A1 | 10/2015 | Webb et al. |
| 2015/0326484 A1 | 11/2015 | Cao et al. |
| 2015/0327245 A1 | 11/2015 | Zhu et al. |
| 2016/0020877 A1 | 1/2016 | Koutsimanis et al. |
| 2016/0036578 A1 | 2/2016 | Malladi et al. |
| 2016/0073302 A1 | 3/2016 | Yang et al. |
| 2016/0113039 A1 | 4/2016 | Hole et al. |
| 2016/0135153 A1 | 5/2016 | Suzuki et al. |
| 2016/0156397 A1 | 6/2016 | Onggosanusi et al. |
| 2016/0234736 A1 | 8/2016 | Kubota et al. |
| 2016/0234759 A1 | 8/2016 | Kubota et al. |
| 2016/0249269 A1* | 8/2016 | Niu ................. H04W 56/0095 |
| 2016/0270102 A1 | 9/2016 | Zeng et al. |
| 2016/0352545 A1 | 12/2016 | Johnson |
| 2016/0353343 A1 | 12/2016 | Rahman et al. |
| 2017/0013598 A1 | 1/2017 | Jung et al. |
| 2017/0034845 A1 | 2/2017 | Liu et al. |
| 2017/0118054 A1 | 4/2017 | Ma et al. |
| 2017/0134913 A1 | 5/2017 | Cui et al. |
| 2017/0164212 A1 | 6/2017 | Opsenica et al. |
| 2017/0164349 A1 | 6/2017 | Zhu et al. |
| 2017/0201980 A1 | 7/2017 | Hakola et al. |
| 2017/0230985 A1 | 8/2017 | Yamada et al. |
| 2017/0273063 A1 | 9/2017 | Kim et al. |
| 2017/0289791 A1 | 10/2017 | Yoo et al. |
| 2017/0290052 A1 | 10/2017 | Zhang et al. |
| 2017/0331670 A1 | 11/2017 | Parkvall et al. |
| 2017/0331785 A1 | 11/2017 | Xu et al. |
| 2017/0359731 A1 | 12/2017 | Soldati et al. |
| 2018/0034612 A1 | 2/2018 | Lin et al. |
| 2018/0076994 A1 | 3/2018 | Lee et al. |
| 2018/0123763 A1 | 5/2018 | Yu |
| 2018/0124598 A1 | 5/2018 | Zeng |
| 2018/0139656 A1 | 5/2018 | Xu et al. |
| 2018/0167938 A1 | 6/2018 | Stephenne et al. |
| 2018/0184415 A1 | 6/2018 | Rong et al. |
| 2018/0198504 A1 | 7/2018 | Li et al. |
| 2018/0199361 A1 | 7/2018 | Zhang et al. |
| 2018/0220407 A1 | 8/2018 | Xiong et al. |
| 2018/0242304 A1 | 8/2018 | Rong et al. |
| 2018/0287722 A1 | 10/2018 | Takano |
| 2018/0294860 A1 | 10/2018 | Hakola et al. |
| 2018/0338277 A1 | 11/2018 | Byun et al. |
| 2018/0343043 A1* | 11/2018 | Hakola ................ H04B 7/0417 |
| 2018/0368018 A1 | 12/2018 | Kim et al. |
| 2019/0045340 A1 | 2/2019 | Zhu et al. |
| 2019/0045577 A1 | 2/2019 | Kim et al. |
| 2019/0159107 A1 | 5/2019 | Kim et al. |
| 2019/0190579 A1 | 6/2019 | Wang et al. |
| 2019/0208474 A1 | 7/2019 | Ali et al. |
| 2019/0281623 A1 | 9/2019 | Andgart et al. |

FOREIGN PATENT DOCUMENTS

| | | |
|---|---|---|
| EP | 2882110 A1 | 6/2015 |
| EP | 3051906 A1 | 8/2016 |
| EP | 3082362 A1 | 10/2016 |
| EP | 3101971 A1 | 12/2016 |
| EP | 3420659 A1 | 1/2019 |
| JP | 2010-508789 A | 3/2010 |
| JP | 2010-519838 A | 6/2010 |
| JP | 2016-504798 A | 2/2016 |
| JP | 2016-504851 A | 2/2016 |
| JP | 2016-514416 A | 5/2016 |
| KR | 10-2008-0109535 A | 12/2008 |
| KR | 10-2009-0085640 A | 8/2009 |
| KR | 10-2010-0097625 A | 9/2010 |
| KR | 10-2011-0063565 A | 6/2011 |
| KR | 10-2015-0118874 A | 10/2015 |
| KR | 10-1563469 B1 | 10/2015 |
| WO | 2007/052753 A1 | 5/2007 |
| WO | 2007/125910 A1 | 11/2007 |
| WO | 2010/001474 A1 | 1/2010 |
| WO | 2014/090200 A1 | 6/2014 |
| WO | 2014/090208 | 6/2014 |
| WO | 2014/135126 A1 | 9/2014 |
| WO | 2015/045658 A1 | 4/2015 |
| WO | 2015/067196 A1 | 5/2015 |
| WO | 2015/080646 A1 | 6/2015 |
| WO | 2015/100533 A1 | 7/2015 |
| WO | 2015/113205 A1 | 8/2015 |
| WO | 2015/141982 A1 | 9/2015 |
| WO | 2017/147515 A1 | 8/2017 |
| WO | 2017/191833 A1 | 11/2017 |

OTHER PUBLICATIONS

ETRI, "FS_NEO updated requirement of network slicing", 3GPP TSG-SA WG1 #74 S1-161171, Apr. 29, 2016, URL:http://www.3gpp.org/ftp/tsg_sa/WG1_Serv/TSGS1_74_Venice/docs/S1-161171.zip, 6 pages.

(56) References Cited

OTHER PUBLICATIONS

ETRI, "High-level Functional Architecture for the Network Slicing", 3GPPTSG-SA WG2 #114 SZ-161833, Apr. 6, 2016, URL: http://www.3gpp.org/ftp/tsg_sa/WG2_Arch/TSGS2_114_Sophia_Antipolis/Docs/S2-161833.zip, 7 pages.
Huawei, "HiSilicon, UE Slice Association/Overload control Procedure", 3GPP TSG-SA WG2 #115 SZ-162605, May 17, 2016, URL:http://www.3gpp.org/ftp/tsg_sa/WG2_Arch/TSGS2_115_Nanjing_China/Docs/S2-162605.zip, 11 pages.
ITRI, "Updates to Solution 6. 1.3: Introducing Network Instance ID", 3GPP TSG-SA WG2 #115 SZ-162666, May 17, 2016, URL:http://www.3gpp.org/ftp/tsg_sa/WG2_Arch/TSGS2_115_Nanjing_China/Docs/S2-162666.zip>.
MediaTek Inc., "HARQ Enhancement for Improved Data Channel Efficiency" [online], 3GPP TSG-RAN WG1#84b, R1-162797, <URL:http://www.3gpp.org/ftp/tsg_ran/WG1_RL1/TSGR1_84b/Docs/R1-162797.zip>, Apr. 2016, 4 pages.
Nokia, "Alcatel-Lucent Shanghai Bell", Slice Selection solution update, 3GPP TSG-SA WG2 #115 SZ-162982, May 27, 2016, URL: http://www.3gpp.org/ftp/tsg_sa/WG2_Arch/TSGS2_115_Nanjing_China/Docs/S2-162982.zip, 15 pages.
Nokia, "Solutions for Network Slice Selection", Alcatel-Lucent Shanghai Bell, 3GPP TSGG-RAN WG3 Meeting #92, R3-161356, China, May 23-27, 2016, 9 pages.
ZTE, "Consideration on RAN architecture impacts of network slicing", 3GPP TSG-RAN WG2 Meeting #93bis, R2-162627, Croatia, Apr. 11-15, 2016, 10 pages.
3GPP TSG RAN WG1 Meeting #84bis R1-163049, Design Options for Longer Cyclic Prefix for MBSFN Subframes, Apr. 2016, 3 pages.
3rd Generation Partnership Project (3GPP) TR 22.891 V14.2.0, Technical Specification Group Services and System Aspects, Feasibility Study on New Services and Markets Technology Enablers, Stage 1 (Release 14), Sep. 2016, 95 pages.
3rd Generation Partnership Project (3GPP) TR 22.864 V14.1.0, Technical Specification Group Services and System Aspects, Feasibility Study on New Services and Markets Technology Enablers—Network Operation, Stage 1 (Release 14), Sep. 2016, 35 pages.
3rd Generation Partnership Project (3GPP) TR 22.863 V14.1.0, Technical Specification Group Services and System Aspects, Feasibility Study on New Services and Markets Technology Enablers—Enhanced Mobile Broadband, Stage 1 (Release 14), Sep. 2016, 21 pages.
3rd Generation Partnership Project (3GPP) TR 22.863 V0.3.1, Technical Specification Group Services and System Aspects, Feasibility Study on New Services and Markets Technology Enablers—Enhanced Mobile Broadband; Stage 1 (Release 14), Feb. 2016, 13 pages.
3rd Generation Partnership Project (3GPP) TR 22.862 V14.1.0, Technical Specification Group Services and System Aspects, Feasibility Study on New Services and Markets Technology Enablers for Critical Communications, Stage 1 (Release 14), Sep. 2016, 31 pages.
3rd Generation Partnership Project (3GPP) TR 22.861 V14.1.0, Technical Specification Group Services and Systems Aspects, Feasibility Study on New Services and Markets Technology Enablers for Massive Internet of Things, Stage 1 (Release 14), Sep. 2016, 28 pages.
3rd Generation Partnership Project (3GPP) SA WG2 Meeting #115 S2-162511 "Common CP functions and dedicate CP function for simultaneous multiple Network Slice (update of solution 1.3)" May 23-27, 2016, 4 pages.
3rd Generation Partnership Project (3GPP) S2-162982 was S2-162717-MDD and Slice Selection in core and RAN V1, 3rd vol. SA WG2, , Nokia et al., No. Nanjing, P.R. China; May 27, 2016, 13 pages.
3rd Generation Partnership Project (3GPP) S2-161324 SA WG2 Meeting #113, Solution to Key Issue on Mobility Framework, Sophia Antipolis, FR, Feb. 23-26, 2016, 3 pages.

3rd Generation Partnership Project (3GPP) S2-161198 SA WG2 Meeting #113AH, Solution for optimized UE sleep state and state transitions, Sophia Antipolis, France, Feb. 23-26, 2016, 3 pages.
3rd Generation Partnership Project (3GPP) S1-161323 TSG-SA WG1 Meeting #74, Editorial cleanup and alignment of eMBB TR22.863, Venice, Italy, May 9-13, 2016, 4 pages.
3rd Generation Partnership Project (3GPP) S1-152395 Revision of S1-152074, ZTE Corporation et al., "Update the network slicing use case in Smarter", ZTE Smarter Update the Network Slicing Use case REV3, vol. SA WG1, No. Belgrade Serbia, Aug. 24, 2015, 3 pages.
3rd Generation Partnership Project (3GPP) RP-161214 TSG RAN Meeting #72, Revision of SI: Study on New Radio Access Technology, NTT DOCOMO, Busan, Korea, Jun. 13-16, 2016, 8 pages.
3rd Generation Partnership Project (3GPP) RP-160540 TSG RAN Meeting #71, New WI proposal: Signalling reduction to enable light connection for LTE, Gothenburg, Sweden, Mar. 7-10, 2016, 7 pages.
3rd Generation Partnership Project (3GPP) RP-160425 TSG RAN Meeting #71, Further enhancements on signaling reduction to enable light connection for LTE, Intel Corporation, Gothenburg, Sweden, Mar. 7-10, 2016, 7 pages.
3rd Generation Partnership Project (3GPP) RP-160301 TSG RAN Meeting #71, Motivation for new WI on Light Connection in LTE, Huawei, HiSilicon, Goteborg, Sweden, Mar. 7-11, 2016, 14 pages.
3rd Generation Partnership Project (3GPP) R2-162571 TSGRAN WG2 Meeting #93bis, Introduction of Virtual Cell, CATT, Dubrovnik, Croatia, Apr. 11-15, 2016, 3 pages.
Sesia et al., "LTE—The UMTS Long Term Evolution", Chapter 9.3.3., LTE—The UMTS Long Term Evolution : from theory to Practice; Jul. 20, 2011, pp. 198-200.
Samsung: "Signaling of Slot Structure", 3GPP Draft; R1-1609127, 3rd Generation Partnership Project (3GPP), Mobile Competence Centre; 650, Route Des Lucioles; F-06921 Sophia Anti Polis Ceo Ex ; France, RAN WG1, No. Lisbon, Portugal; Oct. 10, 2016-Oct. 14, 2016 Sep. 30, 2016.
Qualcomm, 3GPP R1-1612062, TSG-RAN WG1 #87, Control Channel for slot format indicator, Nov. 14-18, 2016 (Year: 2016).
Qualcomm Incorporated: "Frame structure requirements", 3GPP Draft; vol. RAN WG1, No. Nanjing, China; May 14, 2016.
NGMN 5G Initiative White Paper v1.0, Feb. 17, 2015, 125 pages.
International Telecommunication Union (ITU-R), "IMT Vision—Framework and overall objectives of the future development of IMT for 2020 and beyond", Recommendation ITU-R M.2083-0, Sep. 2015, 21 pages.
IEEE P802.11, Wireless LANs, Proposed TGax draft specification, Comment Resolutions on UL MU Operation, Jul. 25, 2016, 27 pages.
Chu, David, "Polyphase Codes With Good Periodic Correlation Properties", IEEE Transactions On Information Theory, Jul. 1972, 531-532.
Budisin, "Decimation Generator of Zadoff-Chu Sequences", C. Carlet and A. Pott (Eds.): SETA 2010, LNCS 6338, pp. 30-40, 2010.
Budisin S. "Decimation Generator of Zadoff-Chu Sequences", In: Carlet C., Pott A. (eds) Sequences and Their Applications—SETA 2010. SETA 2010. Lecture Notes in Computer Science, vol. 6338. Springer, Berlin, Heidelberg, 2010, 40 pages.
3rd Generation Partnership Project; (3GPP) TSG-RAN WG1 #86bis, R1-1610177, "DL Control Channels Overview", Qualcomm Incorporated, Oct. 10-14, 2016, Lisbon, Portugal, Discussion, Oct. 1, 2016, 6 pages.
3rd Generation Partnership Project; (3GPP) TS 36.331 V13.0.0, Technical Specification Group Radio Access Network; Evolved Universal Terrestrial Radio Access (E-UTRA); Radio Resource Control (RRC); Protocol specification (Release 13), Dec. 2015, 507 pages.
3rd Generation Partnership Project; (3GPP) TS 36.304 V13.0.0, 3rd Generation Partnership Project; Technical Specification Group Radio Access Network; Evolved Universal Terrestrial Radio Access (E-UTRA); User Equipment (UE) Procedures in idle Mode (Release 13), Dec. 2015, 42 pages.
3rd Generation Partnership Project; (3GPP) TS 36.211 V13.1.0, 3rd Generation Partnership Project; Technical Specification Group Radio

(56) References Cited

OTHER PUBLICATIONS

Access Network; Evolved Universal Terrestrial Radio Access (E-UTRA); Physical Channels and Modulation (Release 13), Mar. 2016, 155 pages.
3rd Generation Partnership Project; (3GPP) TR 38.913 V0.2.0, 3rd Generation Partnership Project; Technical Specification Group Radio Access Network; Study on Scenarios and Requirements for Next Generation Access Technologies; (Release 14), Feb. 2016, 19 pages.
3rd Generation Partnership Project; (3GPP) TR 23.799, "Technical Specification Group Services and System Aspects; Study on Architecture for Next Generation System (Release 14)", vol. SA WG2, No. V0.5.0, Jun. 8, 2016, pp. 1-179.
3rd Generation Partnership Project; (3GPP) TR 22.891 V1.1.0, 3rd Generation Partnership Project; Technical Specification Group Services and System Aspects; Feasibility Study on New Services and Markets Technology Enablers; Stage 1 (Release 14), Nov. 2015, 95 pages.
3rd Generation Partnership Project (3GPP), TSG RAN WG1 Meeting #86, "RAN1 Chairman's Notes", Gothenburg, Sweden, Aug. 22-26, 2016, 105 pages.
3rd Generation Partnership Project (3GPP), TS 36.212 V10.8.0, RAN WG1, Technical Specification Group Radio Access Network; Evolved Universal Terrestrial Radio Access (E-UTRA); Multiplexing and Channel Coding (Release 10), Jun. 17, 2013, pp. 1-79.
3rd Generation Partnership Project (3GPP), RI-165027, vol. RAN WG1, Nokia et al: "Basic frame structure 1 principles for 5G", 3GPP Draft; No. Nanjing, P.R. China; May 23, 2016-May 27, 2016 May 13, 2016.
3rd Generation Partnership Project (3GPP) TSG-RAN WG2 Meeting #94, R2-163718 "Control Plane functions in NR", Nanjing, China; May 23-27, 2016, 4 pages.
3rd Generation Partnership Project (3GPP) TSG-RAN WG2 Meeting #94 R2-163371, "System Information Signalling Design in NR", May 23-27, 2016, 7 pages.
3rd Generation Partnership Project (3GPP) TSG-RAN WG1#85, R1-165363, Nokia, Alcatel-Lucent Shanghai Bell, Scalability of MIMO Operation Across NR Carrier Frequencies, Nanjing, P.R. China, May 23-27, 2016, 5 pages.
3rd Generation Partnership Project (3GPP) TSG-RAN WG1#85 R1-165027 "Basic Frame Structure Principles for 5G" May 23-27, 2016, 6 pages.
3rd Generation Partnership Project (3GPP) TSG-RAN WG1 #85, R1-164694, Frame Structure Requirements, Qualcomm, Nanjing, China, May 23-27, 2016, 5 pages.
3rd Generation Partnership Project (3GPP) TSG-RAN WG1 #85, R1-164628, Frame Structure for NR, Ericsson, Nanjing, China, May 23-27, 2016, 3 pages.
3rd Generation Partnership Project (3GPP) TSG RAN WG1 Meeting #86bis R1-1610524, WF on NR RS Definition, Huawei, HiSilicon, Lisbon, Portugal, Oct. 10-14, 2016, Agenda Item: 8.1.4.4, 4 pages.
3rd Generation Partnership Project (3GPP) TSG RAN WG1 Meeting #85 R1-165174 "Uplink multiple access schemes for NR", May 23-27, 2016, 4 pages.
3rd Generation Partnership Project (3GPP) TSG RAN WG1 Meeting #85 R1-164871 "Frame structure for new radio interface", May 23-27, 2016, 3 pages.
3rd Generation Partnership Project (3GPP) TSG RAN WG1 Meeting #84bis R1-162797, "Harq Enhancement for Improved Data Channel Efficiency", Busan, Korea, Apr. 11-15, 2016, 3 pages.
3rd Generation Partnership Project (3GPP) TSG RAN WG1 Meeting #84bis R1-162379, "Overview of new radio access technology requirements and designs" Apr. 11-15, 2016, 4 pages.
3rd Generation Partnership Project (3GPP) TSG RAN WG1 Meeting #83 R1-157351, Initial Views on Technical Design for NB-IoT, Nov. 15-22, 2015, 3 pages.
3rd Generation Partnership Project (3GPP) TSG RAN WG1 #85, R1-165669, Way Forward on Frame Structure, Qualcomm and etc., Nanjing, China, May 23-27, 2016, Agenda Item 7.1.4, 2 pages.
3rd Generation Partnership Project (3GPP) TSG RAN WG1 #85, R1-164014, Discussion on RS for Beamformed Access, Samsung, Nanjing, China, May 23-27, 2016, 3 pages.
3rd Generation Partnership Project (3GPP) TSG RAN WG1 #85, R1-164013, Framework for Beamformed Access, Samsung, Nanjing, China, May 23-27, 2016, 4 pages.
3rd Generation Partnership Project (3GPP) TSG RAN WG1 #84bis Meeting, R1-163757, Way Forward on Channel Coding Evaluation for 5G New Radio, Busan, Korea, Apr. 11-15, 2016, Agenda Item 8.1.6.1, 5 pages.
3rd Generation Partnership Project (3GPP) TS 36.321 V13.0.0, Technical Specification Group Radio Access Network, Evolved Universal Terrestrial Radio Access (E-UTRA), Medium Access Control (MAC) protocol specification (Release 13), Dec. 2015, 82 pages.
3rd Generation Partnership Project (3GPP) TS 36.300 V13.3.0, Technical Specification Group Radio Access Network, Evolved Universal Terrestrial Radio Access (E-UTRA) and Evolved Universal Terrestrial Radio Access Network (E-UTRAN), Overall description; Stage 2 (Release 13), Mar. 2016, 295 pages.
3rd Generation Partnership Project (3GPP) TS 36.213 V13.0.0, Technical Specification Group Radio Access Network, Evolved Universal Terrestrial Radio Access (E-UTRA), Physical layer procedures (Release 13), Dec. 2015, 326 pages.
3rd Generation Partnership Project (3GPP) TS 36.133 V14.7.0, Technical Specification Group Radio Access Network, Evolved Universal Terrestrial Radio Access (E-UTRA), Requirements for support of radio resource management (Release 14), Mar. 2018, 2997 pages.
3rd Generation Partnership Project (3GPP) TS 24.302 V13.5.0, Technical Specification Group Core Network and Terminals, Access to the 3GPP Evolved Packet Core (EPC) via non-3GPP access networks; Stage 3 (Release 13), Mar. 2016, 126 pages.
3rd Generation Partnership Project (3GPP) TS 23.401 V13.6.1, Technical Specification Group Services and System Aspects, General Packet Radio Service (GPRS) enhancements for Evolved Universal Terrestrial Radio Access Network (E-UTRAN) access (Release 13), Mar. 2016, 365 pages.
3rd Generation Partnership Project (3GPP) TS 23.060 V13.6.0, Technical Specification Group Services and System Aspects, General Packet Radio Service (GPRS), Service description, Stage 2 (Release 13), Mar. 2016, 362 pages.
3rd Generation Partnership Project (3GPP) TR 45.820 V13.1.0, Technical Specification Group GSM/EDGE Radio Access Network, Cellular system support for ultra-low complexity and low throughput Internet of Things (CIoT) (Release 13), Nov. 2015, 495 pages.
3rd Generation Partnership Project (3GPP) TR 38.913 V14.3.0, Technical Specification Group Radio Access Network, Study on Scenarios and Requirements for Next Generation Access Technologies, (Release 14), Jun. 2017, 39 pages.
3rd Generation Partnership Project (3GPP) TR 38.801 V0.2.0, Technical Specification Group Radio Access Network, Study on New Radio Access Technology: Radio Access Architecture and Interface (Release 14), Jun. 2016, 20 pages.
3rd Generation Partnership Project (3GPP) TR 36.912 V13.0.0, Technical Specification Group Radio Access Network, Feasibility study for Further Advancements for E-UTRA (LTE—Advanced) (Release 13), Dec. 2015, 273 pages.
3rd Generation Partnership Project (3GPP) TR 36.897 V13.0.0, Technical Specification Group Radio Access Network, Study on Elevation Beamforming/Full-Dimension (FD) Multiple Input Multiple Output (MIMO) for LTE; (Release 13), Jun. 2015, 58 pages.
3rd Generation Partnership Project (3GPP) TR 36.881 V14.0.0, Technical Specification Group Radio Access Network, Evolved Universal Terrestrial Radio Access (E-UTRA), Study on Latency Reduction Techniques for LTE (Release 14), Jun. 2016, 249 pages.
3rd Generation Partnership Project (3GPP) TR 23.720 V13.0.0, Technical Specification Group Services and System Aspects, Study on architecture enhancements for Cellular Internet of Things, (Release 13), Mar. 2016, 94 pages.
3GPP TSG-RAN WG2 Meeting #95 R2-164693, Samsung, "System Information Signalling Design in NR" Aug. 2016, 6 pages.

(56) References Cited

OTHER PUBLICATIONS

3GPP TSG-RAN2 meeting #95bis R2-166202, Huawei et al., "Further Discussions of Minimum SI" Oct. 2016, 3 pages.
3GPP TSG-RAN2 Meeting #95bis R2-166203, Huawei et al., "Delivery of "Other SI" in NR", Oct. 2016, 5 pages.
3GPP TSG=RAN WG2 Meeting #95bis, ETSI MCC, "Skeleton report", Oct. 2016, 5 pages.
Consideration on System Information Broadcast in New RAT, ZTE, 3GPPTSG-RANWG2 Meeting #93bis, R2-162629, Apr. 15, 2016.

* cited by examiner

US 10,840,982 B2

BEAMFORMING SWEEPING AND TRAINING IN A FLEXIBLE FRAME STRUCTURE FOR NEW RADIO

CROSS-REFERENCE TO RELATED APPLICATIONS

This application is the National Stage Application of International Patent Application No. PCT/US2017/046483 filed Aug. 11, 2017, which claims the benefit of priority of U.S. Provisional Application No. 62/373,662, filed Aug. 11, 2016, entitled "Beamforming Sweeping and Training in a Flexible Frame Structure for New Radio; and U.S. Provisional Application No. 62/417,162 filed Nov. 3, 2016, entitled Beam Based Mobility and Beam Based Management in NR", the contents of which are incorporated by reference in their entireties herein.

FIELD

The present application is directed to methods for beam forming (BF) training in active states. The application is also directed to RS Configuration for CSI acquisition and beam management. The application is further directed to beam based mobility.

BACKGROUND

Current network access procedures are based on omnidirectional transmission or sector-based transmission. For example, this may include cell search procedures and subsequent Physical Broadcast Channel (PBCH) acquisition. However, some functions for beamforming based access are not supported by existing omni-directional or sector-based transmission access procedures. One of these functions includes beamforming pair determination in idle state. Another function includes beamforming training feedback and beamforming training reference signal (BT-RS) transmission, e.g., whether to perform before, during or after RRC Connection setup. Yet another function includes the resources of uplink (UL) channel for beamforming (BF) training feedback in view of time and frequency. A further function includes beamforming based PBCH detection.

Separately, existing frame structures in LTE lack the support of beamforming training procedures in RRC_Connected states. In the NR, flexible frame structure concepts presently discussed in 3GPP standards are too high-level for generic downlink (DL) or UL data transmission. For example, these flexible frame structures are incapable of supporting use cases in the areas of beamforming training in RRC_Connected states.

A channel state information reference signal (CSI-RS) or a sounding reference signal (SRS) may be required for CSI acquisition and beam management. Since downlink (DL) and uplink (UL) have different requirements for CSI-RS and SRS designs, a UE should be aware of the CSI-RS and SRS configurations for different usages. Currently, there is a deficiency in the design of CSI-RS and SRS configurations and related signaling to enable efficient usage in an NR system.

In a 5G New Radio (NR) system, system information is divided into minimum SI (System Information) and other SI. Minimum SI is periodically broadcast. The minimum system information may include the following: (i) basic information required for initial access (i.e., information to support cell selection including information required to evaluate whether or not the UE is allowed to access the cell); and (ii) information for acquiring other SI and scheduled information for broadcast SI.

The other SI encompasses everything not broadcasted in minimum SI. The other SI may either be broadcast, provisioned in a dedicated manner, triggered by the network or triggered by UE request. Before the UE sends the other SI request, the UE needs to know whether it is available in the cell and whether it is broadcasted. This can be done by checking the minimum SI. However, the following problems pervasively exist in the art: (i) whether all cells/transmission reception points (TRPs) periodically broadcast the minimum; (ii) whether the minimum SIs are periodically broadcasted in every cell on which a UE can camp; (iii) whether there are cells in the system where the UE cannot camp; and (iv) whether the UE should be allowed to camp on a cell that doesn't broadcast the minimum SIs.

SUMMARY

This summary is provided to introduce a selection of concepts in a simplified form that are further described below in the Detailed Description. This Summary is not intended to limit the scope of the claimed subject matter. The foregoing needs are met, to a great extent, by the present application describing mechanisms for beamforming based initial access, beamforming training in active states, and corresponding flexible frame structure designs for NR systems.

The present application is at least directed to an apparatus on a network including a non-transitory memory including instructions stored thereon for beamforming training during an interval in the network. The apparatus also includes a processor, operably coupled to the non-transitory memory, capable of executing the instructions of receiving, from a new radio node, a beamforming training signal and beam identification for each of plural beams during the interval. The processor is also configured to execute the instructions of determining an optimal transmission beam of the new radio node based on the beamforming training signals of the plural beams. The processor is further configured to execute the instructions of transmitting, to the new radio node, a signal including a beam identification of the optimal transmission beam and an identification of the apparatus during the interval. The processor is further configured to execute the instructions of receiving, from the new radio node, an optimal transmission beam for the apparatus including a beam identification based upon a determination from the new radio during the interval.

The present application is also directed to an apparatus on a network including a non-transitory memory including instructions stored thereon for uplink signal resource allocation in new radio. The present application also includes a processor, operably coupled to the non-transitory memory, capable of executing the instructions of receiving, from a zone on the network, system information including an uplink signal resource allocation of plural nodes in the zone. The processor is also configured to execute the instructions of configuring an uplink signal based on the received system information. The processor is also configured to execute the instructions of sending the configured uplink signal to the plural nodes in the zone. The processor is yet even further configured to execute the instructions of receiving, from one or more of the plural nodes selected by a router on the network, a paging message including network feedback.

The present application is also directed to an apparatus on a network including a non-transitory memory including instructions stored thereon for reference signal configuration in new radio. The present application also includes a processor, operably coupled to the non-transitory memory, capable of executing the instructions of determining, at the apparatus, an absence of a supported configuration of a channel state information reference signal for user equipment. The processor is also configured to execute the instructions of sending, to a new radio node in the new radio, a request for the channel state reference signal of the user equipment. The processor is further configured to execute the instructions of receiving, from the new radio node in the new radio, the supported configuration for the UE.

There has thus been outlined, rather broadly, certain embodiments of the invention in order that the detailed description thereof may be better understood, and in order that the present contribution to the art may be better appreciated.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

Figure 1A:
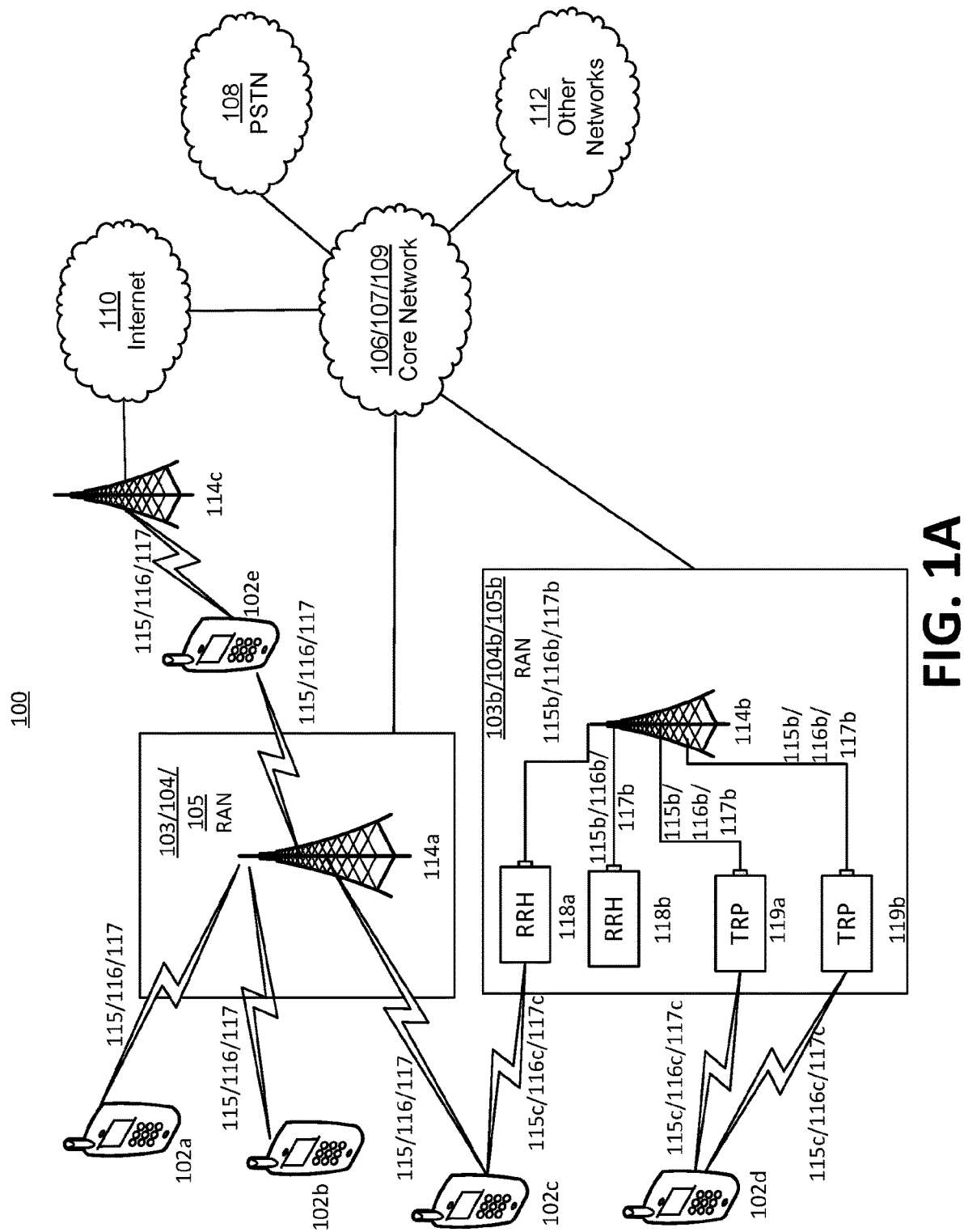
FIG. 1A illustrates an exemplary communications system according to an embodiment.

DETAILED DESCRIPTION OF THE
ILLUSTRATIVE EMBODIMENTS

A detailed description of the illustrative embodiment will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

Generally, the application is directed to methods and systems with beamforming based initial access, beamforming training in active state, and a corresponding flexible frame structure design for NR (new radio) systems. According to one aspect, a NR-Node broadcasts its beamformed cell (or sector or slice) search signals by sweeping through N (wide) beams. In an embodiment, the Beam ID should be implicitly carried on beamforming training reference signal (BT-RS). If Time Division Multiplexing (TDM) the beam's BT-RS is employed, the total number of beams and detected beam IDs may help user the user equipment (UE) acquire symbol and subframe timing. The BT-RS beamforming capabilities of the UE may be defined as part of the UE's capability. For example, this includes a maximum number of beams, e.g., type 1, type 2 or both, that can be supported, and also supported granularity of beam steering time interval units in the time domain (orthogonal frequency division multiplexing (OFDM) symbol level granularity, sub-frame level, beam width resolution, etc.).

In another embodiment, Type 1 beam and Type 2 beams may use different BT-RSs. The number of beams N can be configurable to different cells or sectors and may use a different number of beams, which can be blindly detected at the UE. N may denote the total number of beams inclusive of all types of beams (e.g., type 1 versus type 2 beams) per cell or per sector. Alternatively, there may be N configurable type 1 beams per cell or per sector, and N' configurable type 2 beam per Type 1 beam which may vary across cells or sectors.

Yet another embodiment is envisaged for the UE receiving multiple beams with a similar signal-to-interference-plus-noise ratio (SINR). Different beams (and corresponding BT-RS) can be assigned to M-sequences with different shifts or other quasi-orthogonal sequences to allow the UE to distinguish multiple beams within the set of received beams. If NR supports multiple numerologies then either different numerology or radio access network (RAN) slice broadcast their own BT-RS configuration or share a same BT-RS configuration.

In another embodiment, the PBCH is designed for initial access. The PBCH is associated with each sweeping beam. Moreover, the PBCH is employed for detection.

According to another aspect of the application, periodic BF training procedures and the frame structure are described. These aspects may include detailed signaling. These may also include a flexible time structure (time interval x) to support periodic beamforming training. These may further include a transmission (Tx) beam sweeping pattern.

In another embodiment, on-demand BF training and the frame structure are described. This may include NR-Node initiated beamforming training. This may also include detailed signaling. This may further include flexible time structures (time interval x) to support on-demand beamforming training. This may further include a Tx beam sweeping pattern.

In another embodiment, with respect to RS Configuration for CSI acquisition and Beam Management, the following aspects are described, by way of example and without limitation: (i) CSI-RS and SRS configurations; and (ii) CSI-RS and SRS indication.

With respect to Beam Based Mobility, the following aspects are described for CSI feedback designs, by way of example and without limitation:

(i) a method to allocate UL signal resources to a configurable set of UEs in an area/zone that may be used for the transmission of UL tracking signals.

(ii) a method for tracking UEs in an NR network that is based on the transmission of UL tracking signals from a UE.

(iii) a NR-Mobility set that includes set of beams transmitted by TRPs in an NR cell/cells that are used to define a RAN Notification Area (RNA) or zone.

(iv) a mechanism to signal the NR-Mobility and UL tracking signal configuration to a UE that is based on the RRC Connection Establishment or RRC Suspend/Resume procedures.

(v) a method to control the transmission of the UL tracking signals that is dependent on the following: measurements of the beams in the in the NR-Mobility set, the device type/service, the speed/mobility state, the UE's location within the zone.

(vi) an enhanced paging procedure that makes use of the precise UE location to determine which TRPs/beams to use to page the UE.

Definitions/Acronyms

Provided below are definitions for terms and phrases commonly used in this application in TABLE 1.

TABLE 1

| Acronym | Term or Phrase |
| --- | --- |
| AR | Augmented Reality |
| AS | Access Stratum |
| BR-RS | BeamForm Reference Signal |
| BT-RS | Beamformed Training Reference Signal |
| CE | Control Element |
| CoMP | Coordinated Multipoint |
| CP | Cyclic Prefix |
| CQI | Channel Quality Indication |
| CRS | Cell-specific Reference Signals |
| CSI | Channel State Information |
| CSI-RS | Channel State Information Reference Signals |
| DCI | Downlink Control Information |
| DL | Downlink |
| DM-RS | Demodulation Reference Signals |
| DRX | Discontinuous Reception |
| eMBB | Enhanced Mobile Broadband |
| eNB | Evolved Node B |
| ePDCCH | Enhanced Physical Downlink Control Channel |

TABLE 1-continued

| Acronym | Term or Phrase |
| --- | --- |
| FD | Full-Dimension |
| FDD | Frequency Division Duplex |
| FFS | For Further Study |
| GUI | Graphical User Interface |
| HARQ | Hybrid Automatic Repeat Request |
| ID | Identification |
| IMT | International Mobile Telecommunications |
| KP | Kronecker-Product |
| KPI | Key Performance Indicators |
| LTE | Long Term Evolution |
| MAC | Medium Access Control |
| MCL | Maximum Coupling Loss |
| MCS | Modulation and Coding Scheme |
| MME | Mobility Management Entity |
| MIMO | Multiple-Input and Multiple-Output |
| NAS | Non-Access Stratumn |
| NB | Narrow Beam |
| NDI | New Data Indicator |
| NEO | Network Operation |
| NR | New Radio |
| NR-Node | New Radio-Node |
| OCC | Orthogonal Cover Codes |
| OFDM | Orthogonal Frequency Division Multiplexing |
| PDCCH | Physical Downlink Control Channel |
| PDSCH | Physical Downlink Shared Channel |
| PMI | Precoder Matrix Indication |
| PRS | Positioning Reference Signals |
| PUSCH | Physical Uplink Shared Chanel |
| PUCCH | Physical Uplink Control Channel |
| RAN | Radio Access Network |
| RAT | Radio Access Technology |
| RB | Resource Block |
| RE | Resource Element |
| RI | Rank Indication |
| RRC | Radio Resource Control |
| RRH | Remote Radio Head |
| RS | Reference Signal |
| RSSI | Received Signal Strength Indicator |
| RSRP | Reference Signal Received Power |
| RSRQ | Reference Signal Received Quality |
| RV | Redundancy Version |
| SC-FDMA | Single Carrier-Frequency Division Multiple Access |
| SI | System Information |
| SIB | System Information Block |
| SISO | Single-Input and Single-Output |
| SRS | Sounding Reference Signal |
| 2D | Two-Dimensional |
| 3D | Three-Dimensional |
| TDD | Time Divisional Duplex |
| TPC | Transmit Power Control |
| TRP | Transmission and Reception Point |
| TTI | Transmission Time Interval |
| TXSS | Transmit Sector Sweep |
| UAV | Unmanned Aerial Vehicle |
| UE | User Equipment |
| UL | UpLink |
| URLLC | Ultra-Reliable and Low Latency Communications |
| VR | Virtual Reality |
| WB | Wide Beam |
| WRC | Wireless Planning Coordination |

General Architecture

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

FIG. 1A illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 1A-1E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 1A may be configured to communicate with the base station 114a, which may employ a cellular-based radio technology, and with the base station 114c, which may employ an IEEE 802 radio technology.

Figure 1B:
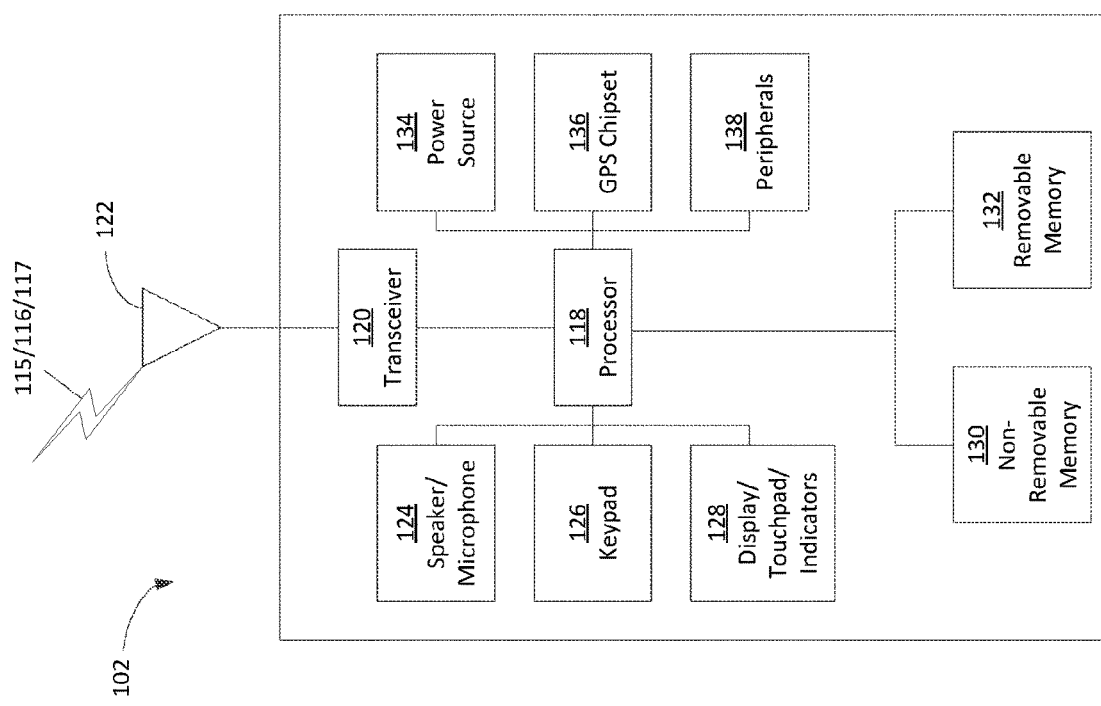
FIG. 1B illustrates an exemplary apparatus configured for wireless communication according to an embodiment.

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to, transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 1C:
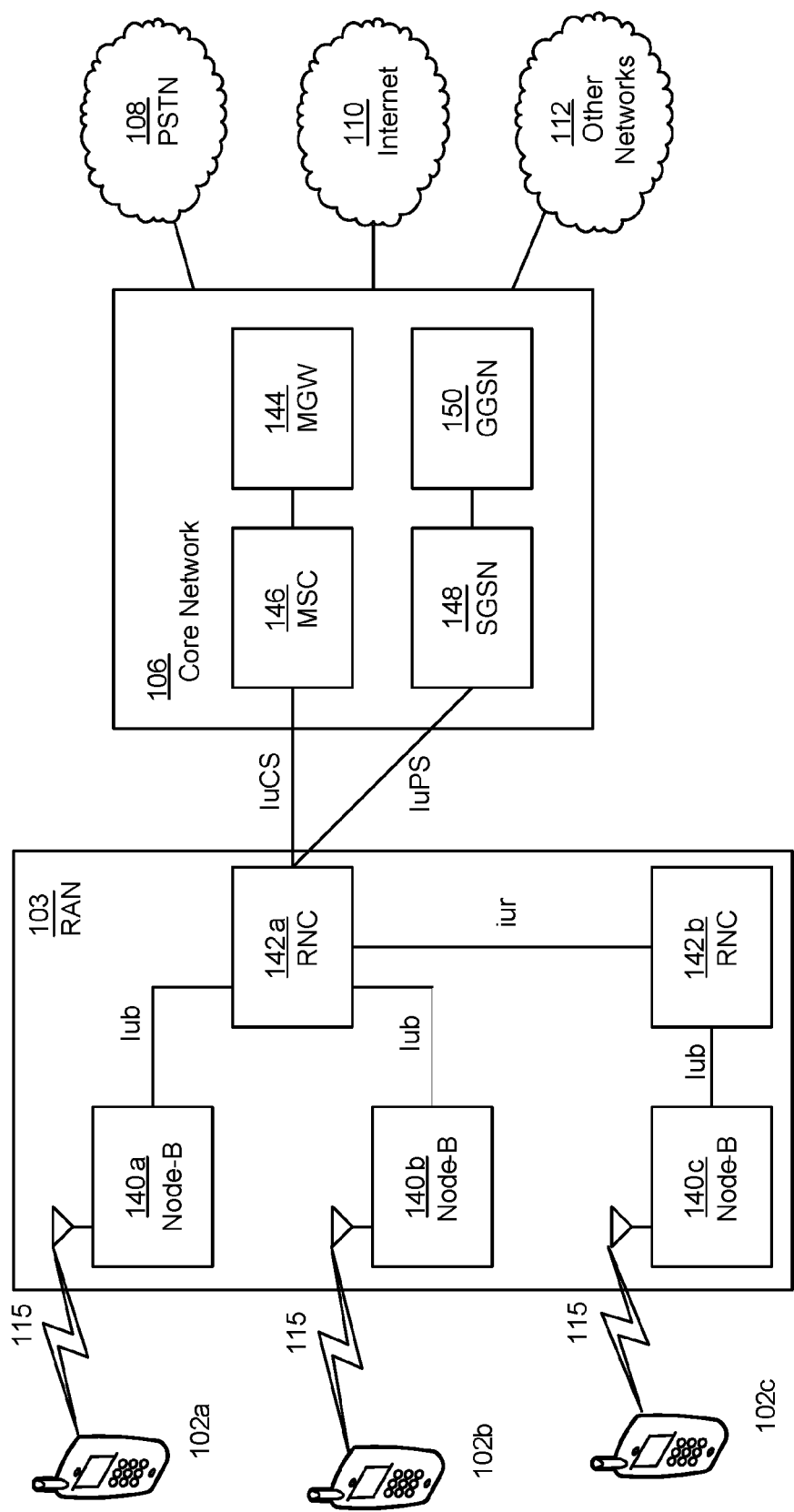
FIG. 1C illustrates a system diagram of a radio access network and a core network according to an embodiment.

FIG. 1C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
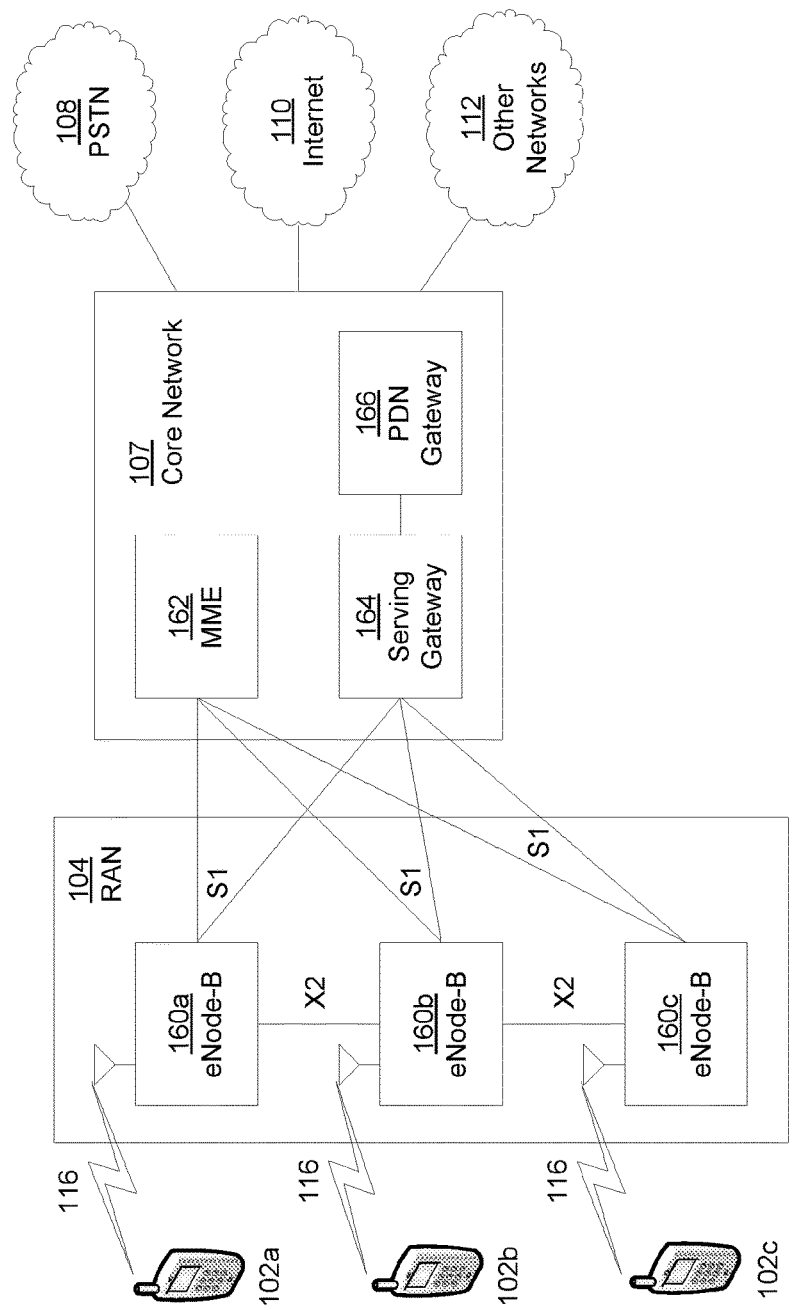
FIG. 1D illustrates a system diagram of a radio access network and a core network according to another embodiment.

FIG. 1D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
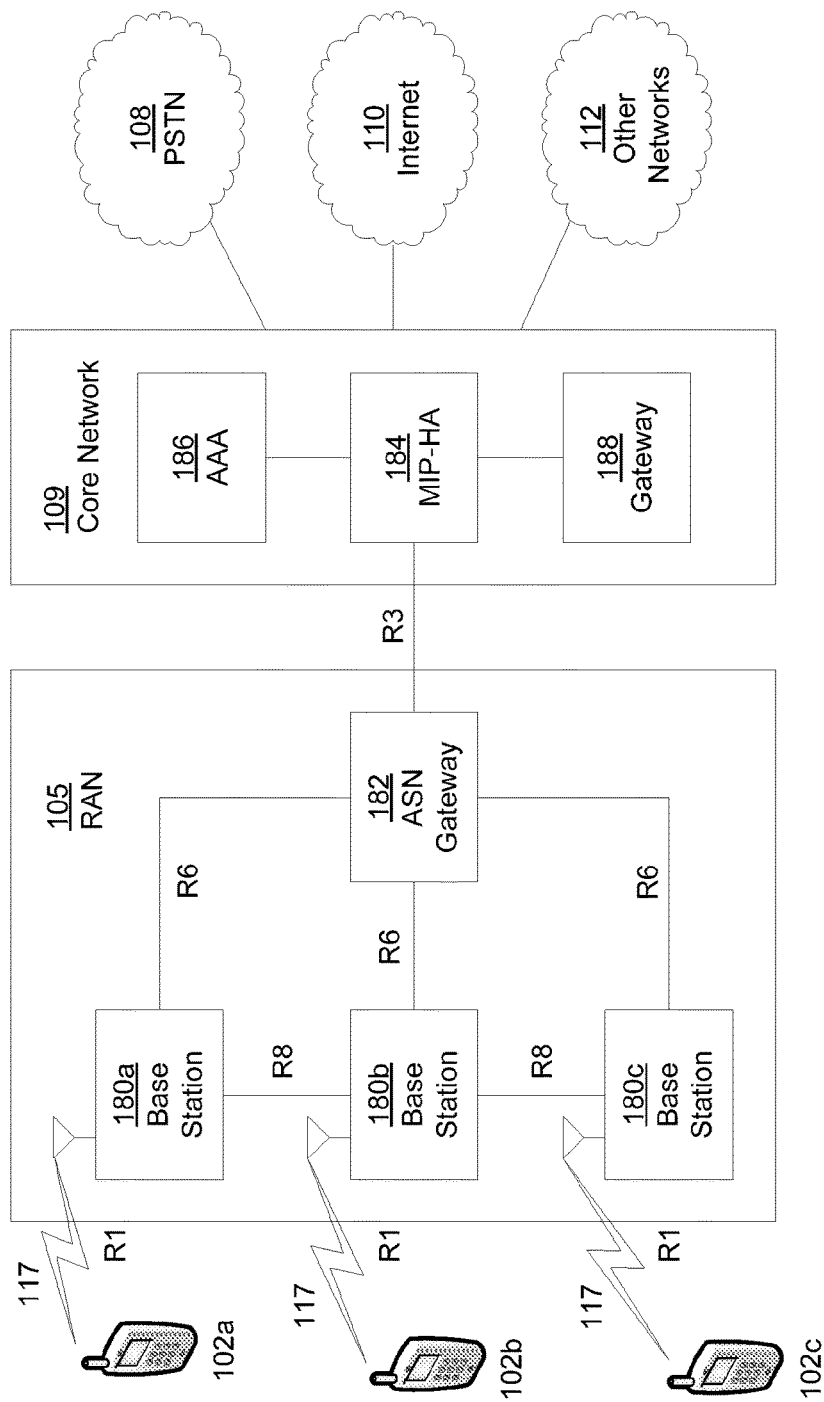
FIG. 1E illustrates a system diagram of a radio access network and a core network according to yet another embodiment.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1F:
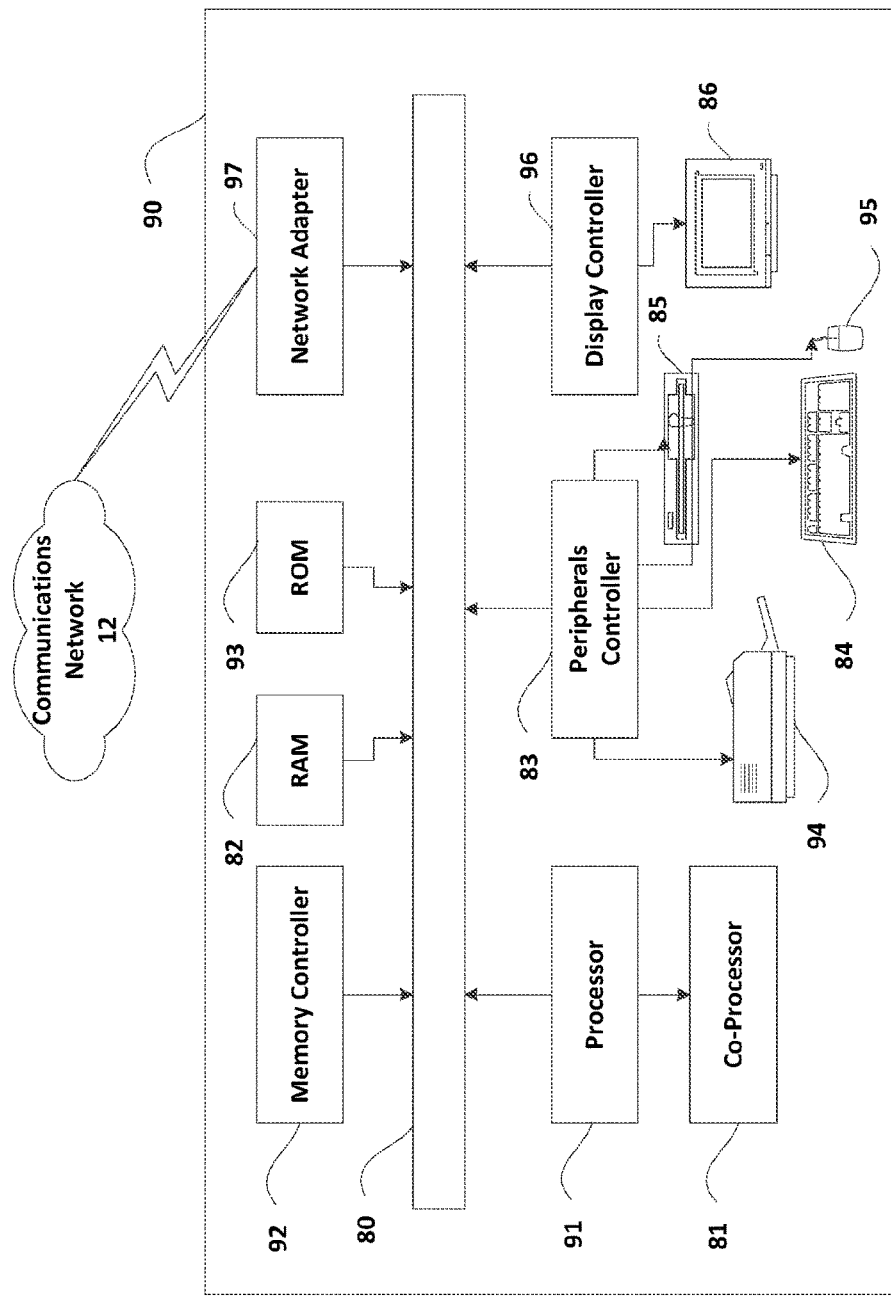
FIG. 1F illustrates a block diagram of an exemplary computing system in communication with one or more networks previously shown in FIGS. 1A, 1C, 1D and 1E according to an embodiment.

FIG. 1F is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

Reference Signals in LTE

DL RSs are predefined signals occupying specific Reference Elements (REs) within the downlink time-frequency RE grid. The LTE specification includes several types of DL RSs transmitted in different ways for different purposes. One purpose of the DL RSs includes Cell-specific Reference Signals (CRSs). CRSs are used, for example by: (1) User Equipment (UE) for channel estimation for coherent demodulation of DL physical channels; (2) UE to acquire Channel State Information (CSI); and (3) UEs for measurements of cell-selection and handover.

Another purpose of the DL RSs includes Demodulation Reference Signals (DM-RS). These are referred to as UE-specific reference signals. They are used, for example, to perform (1) channel estimation by a specific UE and only transmitted within the RBs specifically assigned for PDSCH/ePDCCH transmission to that UE; and (2) associations with data signals and precoding prior to the transmission with the same precoder as data.

Yet another purpose of the DL RSs include Channel State Information Reference Signals (CSI-RS). This is used by UEs to acquire CSI for channel-dependent scheduling, link adaptation and multi-antenna transmissions.

Separately, reference signals are also used in LTE UpLink in similar fashion as LTE DL. Specifically, two types of RSs are defined for LTE UL. One of these RSs includes UL Demodulation Reference Signals (DM-RS). This is used by the base station for channel estimation for coherent demodulation of Physical Uplink Shared Channel (PUSCH) and Physical Uplink Control Channel (PUCCH). DM-RSs are transmitted within the RBs specifically assigned for PUSCH/PUCCH transmission and span the same frequency range as the corresponding physical channel.

Another reference signal includes the UL Sounding Reference Signals (SRS). This is used by the base station for CSI estimation for supporting uplink channel-dependent scheduling and link adaptation. SRSs are also used by the base station to obtain CSI estimation for DL under the case of channel reciprocity.

CSI Feedback in LTE

In yet another embodiment, DL channel-dependent scheduling is a key feature of LTE. This feature selects the DL transmission configuration and related parameters depending on the instantaneous DL channel condition including the interference situation. To support DL channel-dependent scheduling, a UE provides the CSI to the evolved Node B (eNB). The eNB uses the information for its scheduling decisions.

The CSI include one or more pieces of information. One piece of information is Rank Indication (RI) which provides a recommendation on the transmission rank to use or, number of preferred layers that should be used for PDSCH transmission to the UE. Another piece of information is a Precoder Matrix Indication (PMI) that indicates a preferred precoder to use for PDSCH transmission. Another piece of information is a Channel-Quality Indication (CQI) that represents the highest modulation-and-coding scheme to achieve a block-error probability of at most 10%.

A combination of the RI, PMI, and CQI forms a CSI feedback report to the eNB. What is included in the CSI report depends on the UE's configured reporting mode. For example, RI and PMI do not need to be reported unless the UE is in a spatial multiplexing multi-antenna transmission mode.

Downlink Control Information

The Downlink Control Information (DCI) is a predefined format in which the DCI is formed and transmitted in Physical Downlink Control Channel (PDCCH). The DCI format tells the UE how to get its data which is transmitted on Physical Downlink Shared Channel (PDSCH) in the same subframe. It carries the details for the UE such as number of resource blocks, resource allocation type, modulation scheme, redundancy version, coding rate, etc., which help UE find and decode PDSCH from the resource grid. There are various DCI formats used in LTE in PDCCH.

New Radio (NR) Frame Structure

Figure 2:
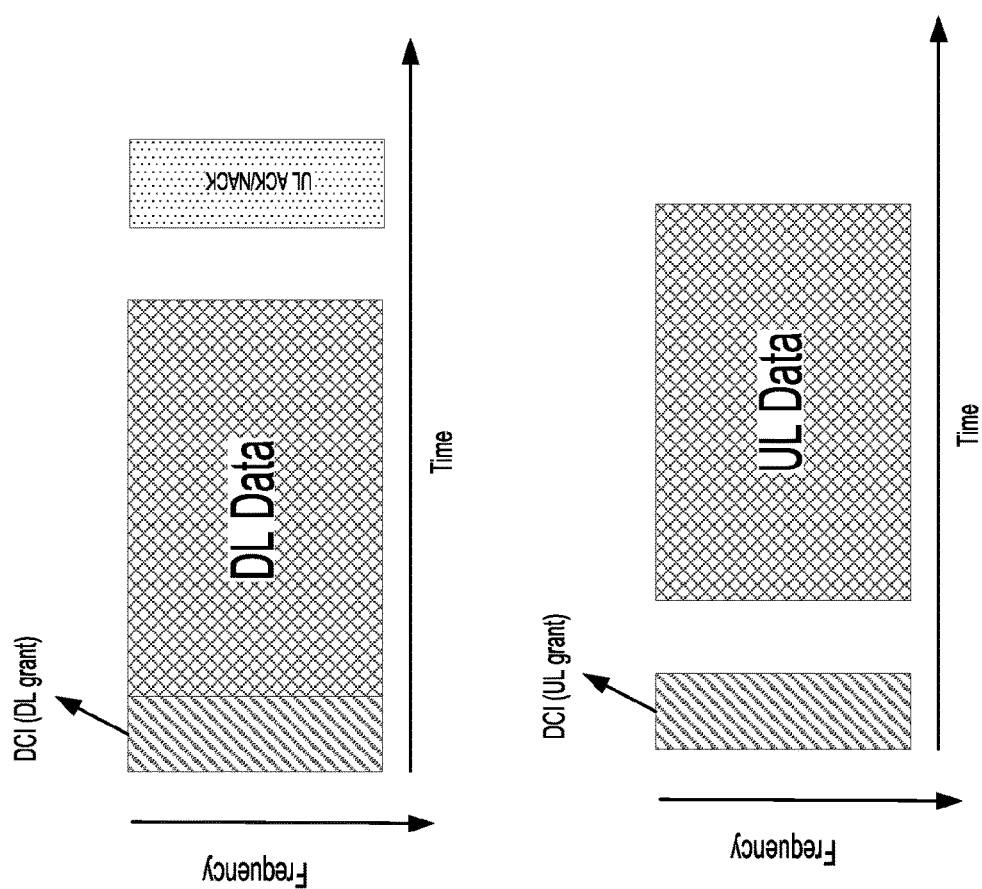
FIG. 2 illustrates a flexible frame structure concept in new radio.

3GPP standardization efforts are underway to define the NR frame structure. It is envisaged to build 'self-contained' time intervals for NR. As illustrated in FIG. 2, a self-contained time interval is understood to contain the control information for a grant, the data and its acknowledgment, i.e., ACK/NACK, all within a time interval and is expected to have configurable UL/DL/side link allocations and reference signals within its resources.

Currently 3GPP standardization agreed that a time interval X can contain one or more of the following features: a DL transmission part, a Guard, and a UL transmission part. Specifically, the following are supported: (i) the DL transmission part of time interval X to contain downlink control information and/or downlink data transmissions and/or reference signals; and (ii) the UL transmission part of time interval X to contain uplink control information and/or uplink data transmissions and/or reference signals.

NR Beamformed Access

3GPP standardization efforts are underway to design the framework for beamformed access. The characteristics of the wireless channel at higher frequencies are significantly different from the sub-6 GHz channel that LTE is currently deployed on. The key challenge of designing the new Radio Access Technology (RAT) for higher frequencies will be in overcoming the larger path-loss at higher frequency bands. In addition to this larger path-loss, the higher frequencies are subject to unfavorable scattering environment due to blockage caused by poor diffraction. Therefore, MIMO/beamforming is essential in guaranteeing sufficient signal level at the receiver end.

Relying solely on MIMO digital precoding used by digital BF to compensate for the additional path-loss in higher frequencies seems not enough to provide similar coverage as below 6 GHz. Thus, the use of analog beamforming for achieving additional gain can be an alternative in conjunction with digital beamforming. A sufficiently narrow beam should be formed with lots of antenna elements, which is likely to be quite different from the one assumed for the LTE evaluations. For large beamforming gain, the beam-width correspondingly tends to be reduced, and hence the beam with the large directional antenna gain cannot cover the whole horizontal sector area specifically in 3-sector configuration. The limiting factors of the number of concurrent high gain beams include the cost and complexity of the transceiver architecture.

Figure 3:
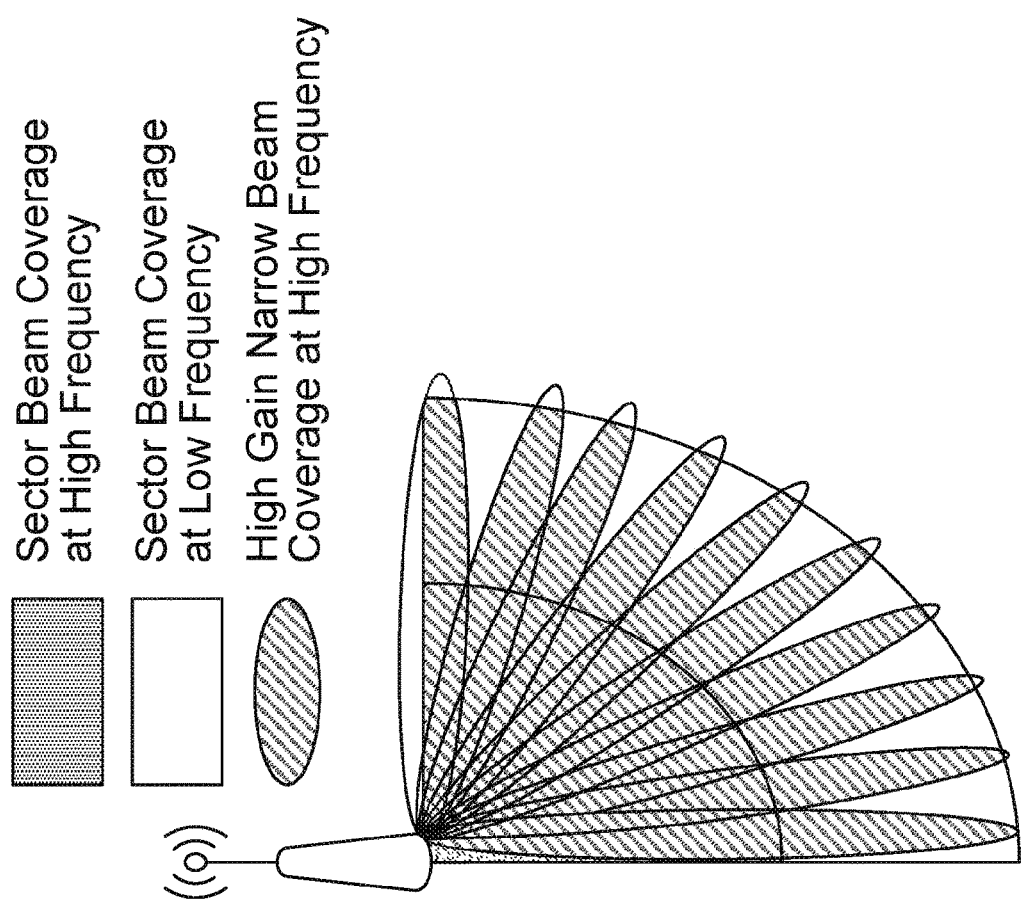
FIG. 3 illustrates cell coverage with sector beams and multiple high gain narrow beams.

From these observations, multiple transmissions in the time domain with narrow coverage beams cover different serving areas. Inherently, the analog beam of a subarray can be steered toward a single direction at the time resolution of a OFDM symbol or any appropriate time interval unit defined for the purpose of beam steering across different serving areas within the cell, and hence the number of subarrays determines the number of beam directions and the corresponding coverage on each OFDM symbol or time interval unit defined for the purpose of beams steering. In some literature, the provision of multiple narrow coverage beams for this purpose has been called "beam sweeping." For analog and hybrid beamforming, the beam sweeping seems to be essential to provide basic coverage in NR. This concept is illustrated in FIG. 3 where the coverage of a sector level cell is achieved with sectors beams and multiple high gain narrow beams. Also, for analog and hybrid beamforming with massive MIMO, multiple transmissions in time domain with narrow coverage beams steered to cover different serving areas is essential to cover the whole coverage areas within a serving cell in NR.

One concept closely related to beam sweeping is the concept of beam pairing which is used to select the best beam pair between a UE and its serving cell, which can be used for control signaling or data transmission. For the downlink transmission, a beam pair will consist of UE RX beam and NR-Node TX beam while for uplink transmission, a beam pair will include a UE TX beam and NR-Node receiver (RX) beam.

Another concept relates to beam training used for beam refinement. As illustrated in FIG. 3, a coarser sector beamforming may be applied during the beam sweeping and sector beam pairing procedure. A beam training may then follow where for example the antenna weights vector are refined, followed by the pairing of high gain narrow beams between the UE and NR-Node.

New Radio Requirements

3GPP TR 38.913 defines scenarios and requirements for New Radio (NR) technologies. The Key Performance Indicators (KPIs) for eMBB, URLLC and mMTC devices are summarized in Table 2.

TABLE 2

| Device | KPI | Requirement |
| --- | --- | --- |
| eMBB | Peak data rate | 20 Gbps for downlink and 10 Gbps for uplink |
|  | Mobility interruption time | 0 ms for intra-system mobility |
|  | Data Plane Latency | 4 ms for UL, and 4 ms for DL |
| URLLC | Control Plane Latency | 10 ms |
|  | Data Plane Latency | 0.5 ms |
|  | Reliability | $1\text{-}10^{-5}$ within 1 ms. |
| mMTC | Coverage | 164 dB |
|  | UE Battery Life | 15 years |
|  | Connection Density | $10^6$ devices/km$^2$ |

3GPP TR 22.863 identifies the use cases and consolidates requirements for the following families for the eMBB scenario. For example, when there are higher data rates, the family focuses on identifying key scenarios from which eMBB primary data rate requirements for peak, experienced, downlink, uplink, etc. can be derived. This also includes related requirements pertaining to latency when applicable with UEs relative speed to ground up to 10 km/h (pedestrian).

Another example relates to higher density. This family covers scenarios with system requirement for the transport of high volume of data traffic per area (traffic density) or transport of data for high number of connections (devices density or connection density) with UEs relative speed to ground up to 60 km/h (pedestrian or users moving on urban vehicle).

Another example includes deployment and coverage. This covers scenarios with system requirements considering the deployment and coverage scenario e.g., indoor/outdoor, local area connectivity, wide area connectivity, with UEs relative speed to ground up to 120 km/h.

Yet another example includes Higher User Mobility. Here, the family focuses on identifying key scenarios from which eMBB mobility requirements can be derived, with UEs relative speed to ground up to 1000 km/h.

Beamforming Based Initial Access

According to an aspect of the application, solutions are described to improve and provide beamforming based initial access for NR systems. In another aspect, beamforming training in RRC_Connected states are described. In yet another aspect, flexible frame structures designed for NR systems are described.

It is envisaged according to this application that BF sweeping and BF training may be conducted at the NR-node, Transmission and Reception Point (TRP) or Remote Radio Head (RRH). As a result, the NR-node, TRP and RRH may be interchangeable. Moreover, the time interval containing DL and/or UL transmissions are flexible for different numerologies and RAN slices may be statically or semi-statically configured. Such time intervals are referred to as Subframes.

Beamforming Based Initial Access

In an embodiment, the NR-node can transmit periodic beamformed training reference signal (BT-RS) to UEs to perform initial access. The periodical BT-RS can be served for two major functions for UE during the initial access stage.

One of these functions includes DL timing-frequency synchronization and PBCH demodulation. The BT-RS is transmitted via sweeping through N (wide) beams at each periodical initial access DL transmission interval. If each beam initial access DL transmission duration is set to Q OFDM symbols and K beams conducts DL beam sweeping simultaneously at each beam transmission duration, then the total transmission duration for all N beams is equal to $$\lceil \frac{N}{K} \rceil \times Q \ OFDM$$

symbols. The BT-RS can occupy L sub-bands in the frequency domain. All numerologies or slice subbands can share the same BT-RS subbands, or each Numerology or slice subband has its own BT-RS subbands. An example of total N=6 beams is setup for initial access shown in FIG. 2.

Figure 4A:
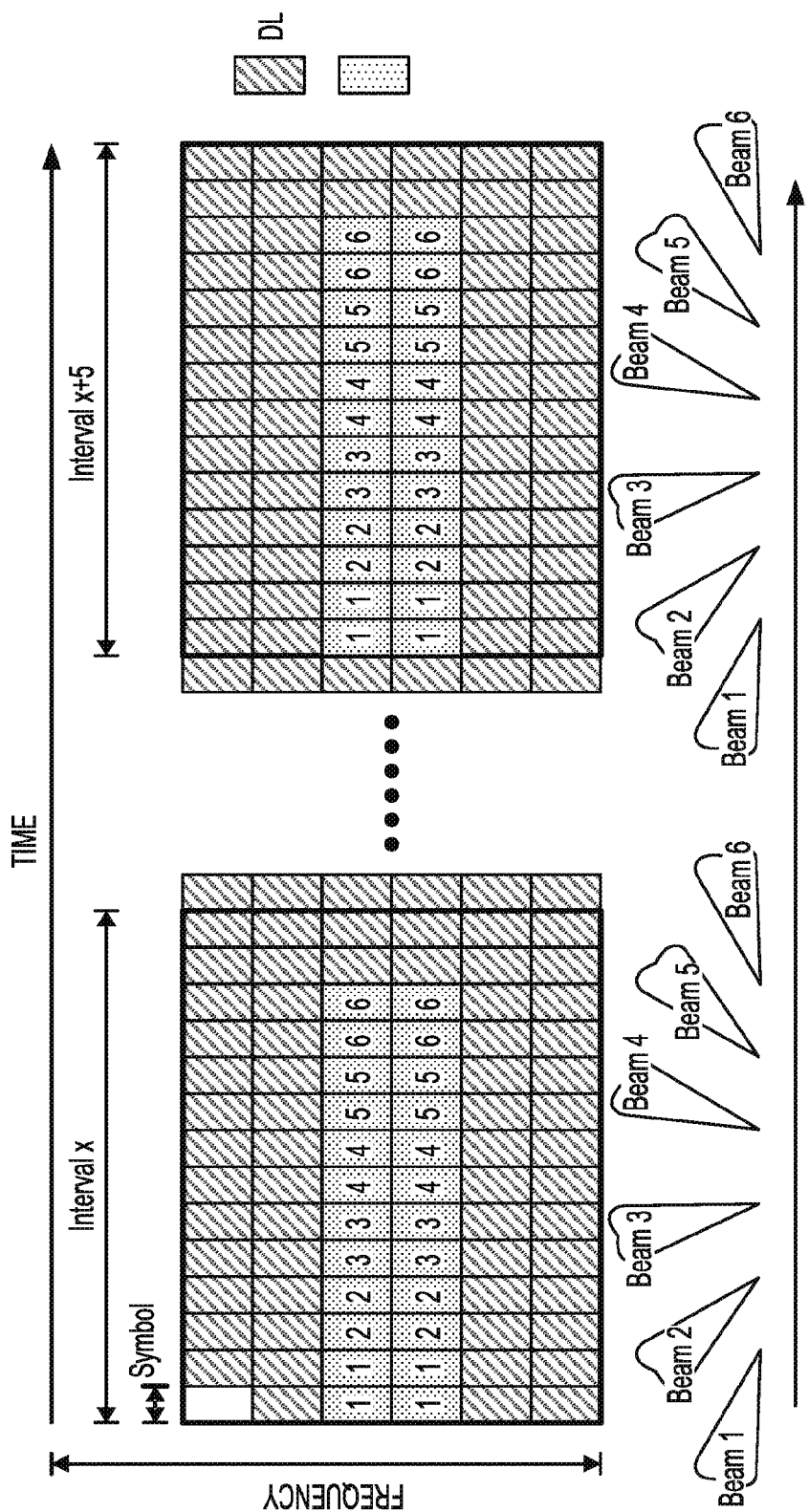
FIGS. 4A-C illustrate beam sweeping techniques according to embodiments of the application.
Figure 4B:
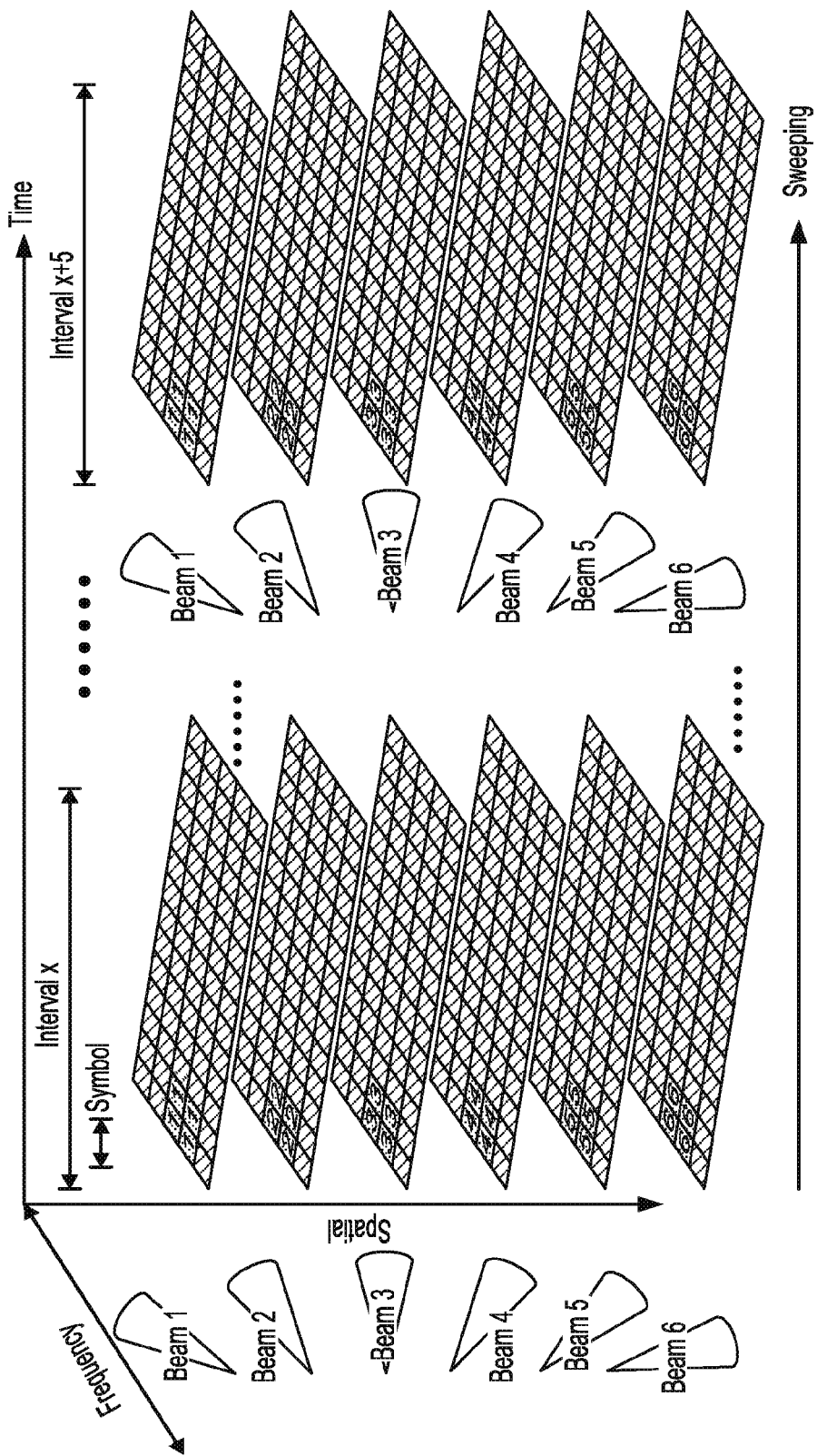

If BR-RS is only configured for single beam transmission at each beam transmission duration, i.e. K=1, then each beam transmission duration is set to Q=2 symbols. The periodicity P of BT-RS is set to 5 time interval x, as an example in the illustration. Hence, the total BT-RS transmission duration is equal to $$\lceil \frac{6}{1} \rceil \times 2 = 12 \ OFDM$$

symbols per time interval that carries BT-RS. The sequential beam seeping is shown in FIG. 4(a). Parallel sweeping is shown in FIG. 4(b) with the total BT-RS transmission duration is equal to $$\lceil \frac{6}{6} \rceil \times 2 = 2$$

symbols. Hybrid sweeping is shown in FIG. 4(c) with the total BT-RS transmission duration is equal to $$\lceil \frac{6}{3} \rceil \times 2 = 6$$

symbols.

Figure 4C:
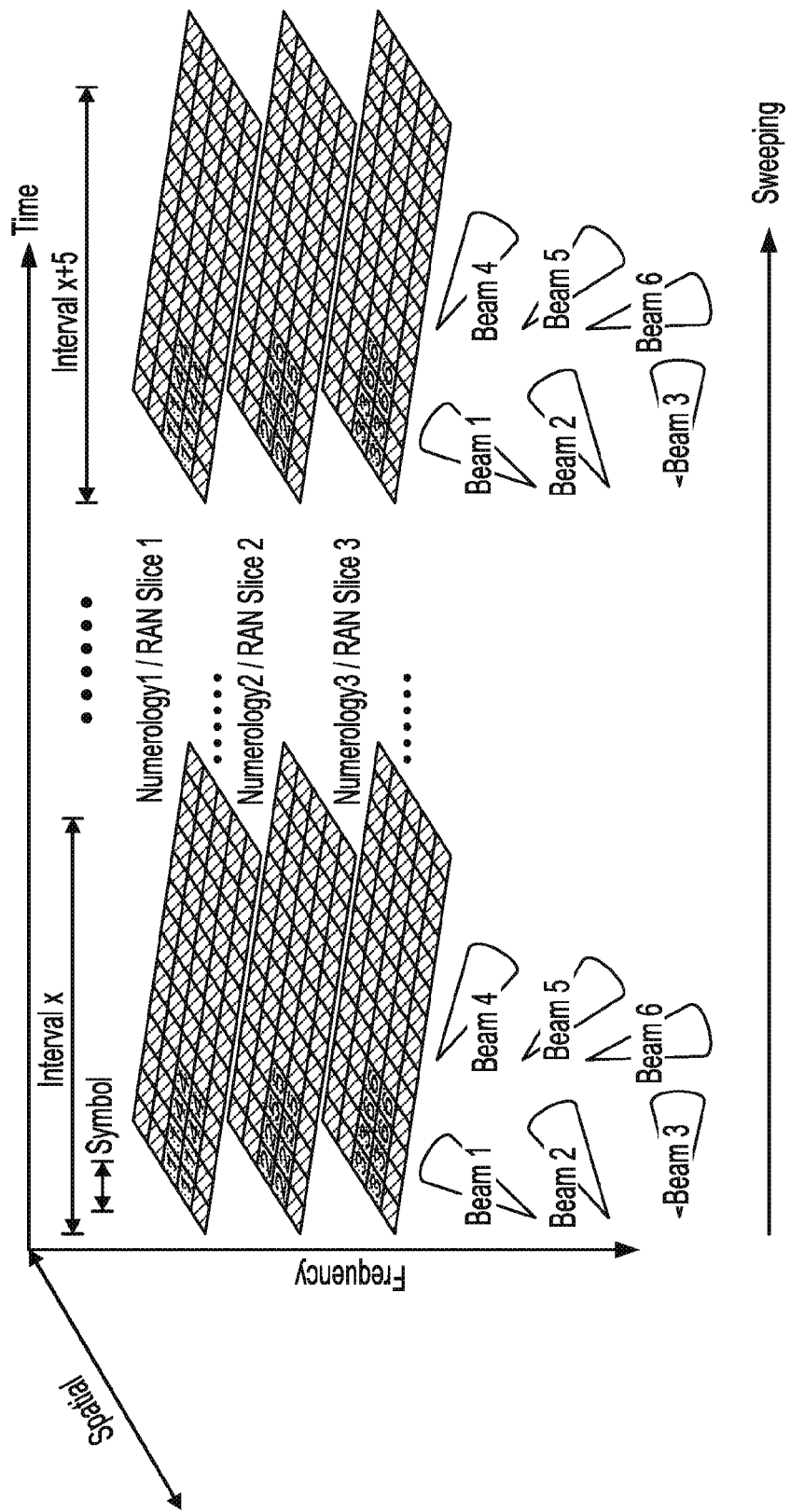

The periodicity of BT-RS transmission P, number of symbol duration for beam transmission duration Q, simultaneous number of beams transmission K can be independently configured to each support multiple numerologies or RAN slice in a NR system, as shown in FIG. 4(c) numerology or 3 RAN slice sub-bands contain their own BT-RS individually in frequency.

There are two possible options for the BT-RS configuration. One option is where each supported numerology or RAN slice has its own BT-RS setup/configuration. Another option is where multiple numerologies or RAN slices share the same BT-RS setup/configuration.

In the following examples, we assume 2 different numerologies are supported in a NR system. Without losing generality, we assume one numerology (numerology 1) has a wider subcarrier spacing than the other (numerology 2). Hence, numerology 1 has shorter symbol time than numerology 2. In this example shown in FIG. 5, it assumes broadcast with $N_1=5$, $K_1=1$ and $Q_1=1$ for numerology 1 and $N_2=3$, $K_2=1$ and $Q_2=2$ for numerology 2. The periodicity of numerology 1 BT-RS is set to 2 subframes (i.e. P=2) and the periodicity of numerology 2 BT-RS is set to 5 subframes (i.e. P=5) in this example. Different numerology can also share a same BT-RS setup for initial access, i.e., UE only needs to detect a shared BT-RS setup for all supported numerologies.

Figure 5:
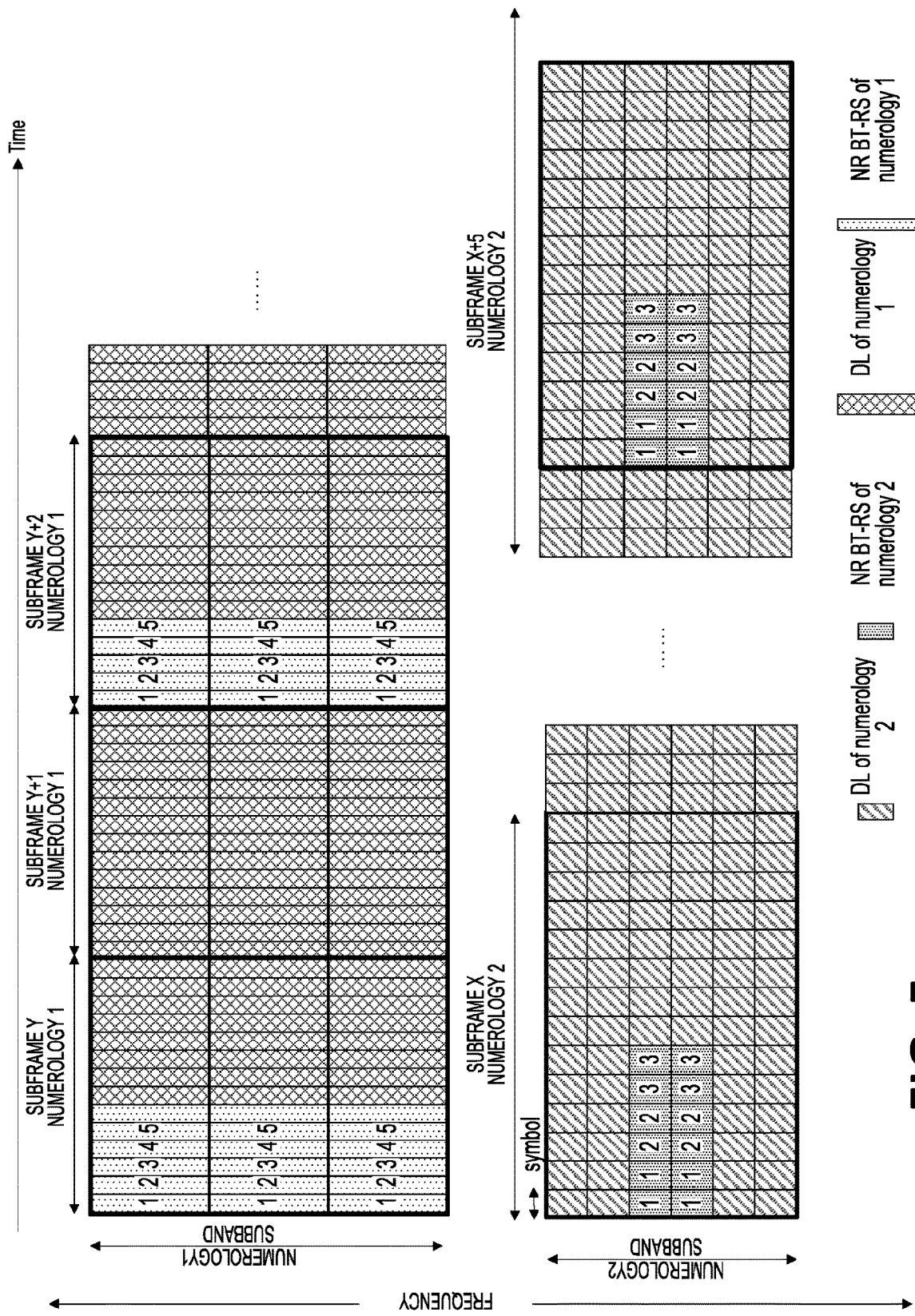
FIG. 5 illustrates 2 beamformed training reference signals (BT-RSs) in a new radio with two different numerologies according to an embodiment of the application.

In FIG. 5, a shared BT-RS with two supported numerologies is shown. In this example, a NR-Node/TRP supports two numerologies and only a shared BT-RS setup for UE to perform initial access. The BT-RS may be allocated at either numerology subband depending on the BF sweeping requirements such as latency, device capability etc.

Figure 6:
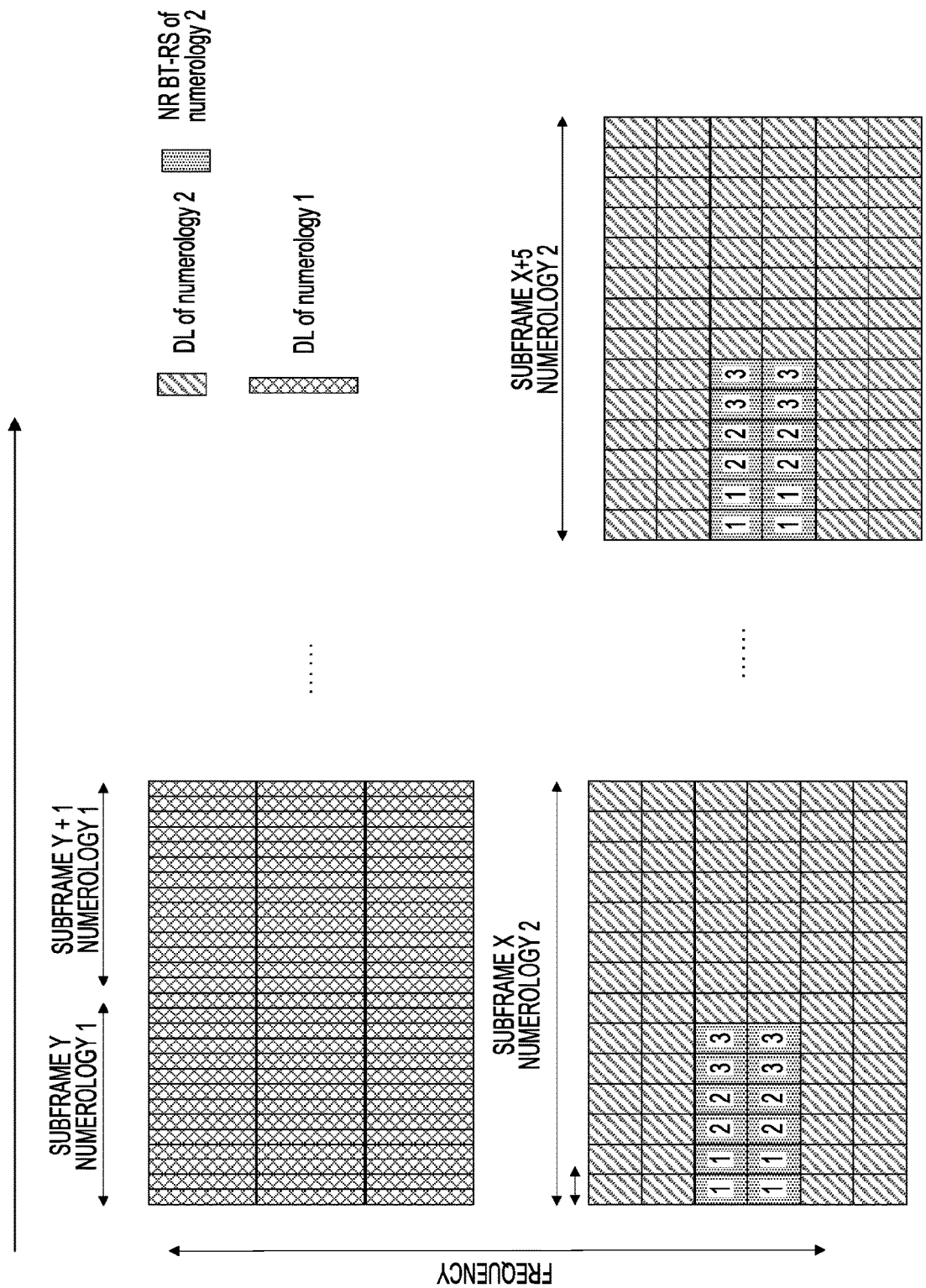
FIG. 6 illustrates a shared BT-RS in a new radio with two different numerologies according to an embodiment of the application.
Figure 7A:
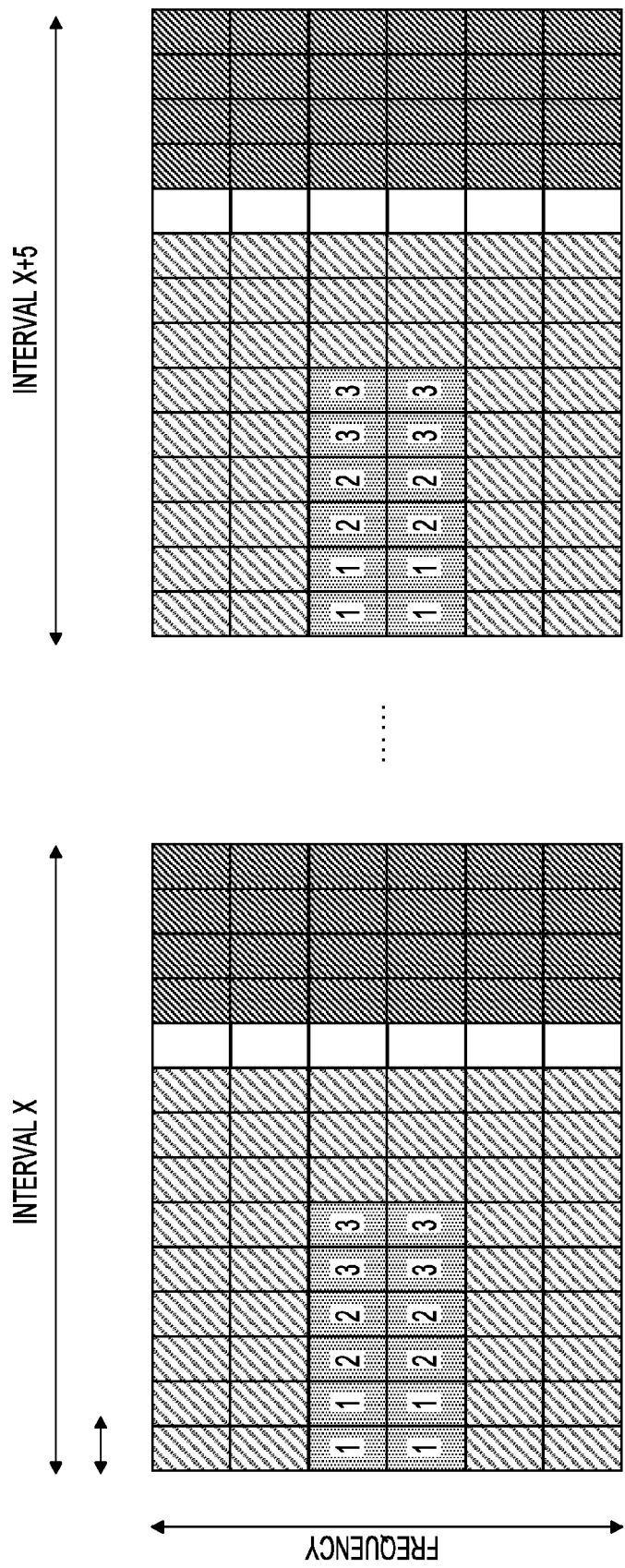
FIG. 7A illustrates a predefined BT-RS configuration in a self-contained subframe according to an embodiment of the application.
Figure 7B:
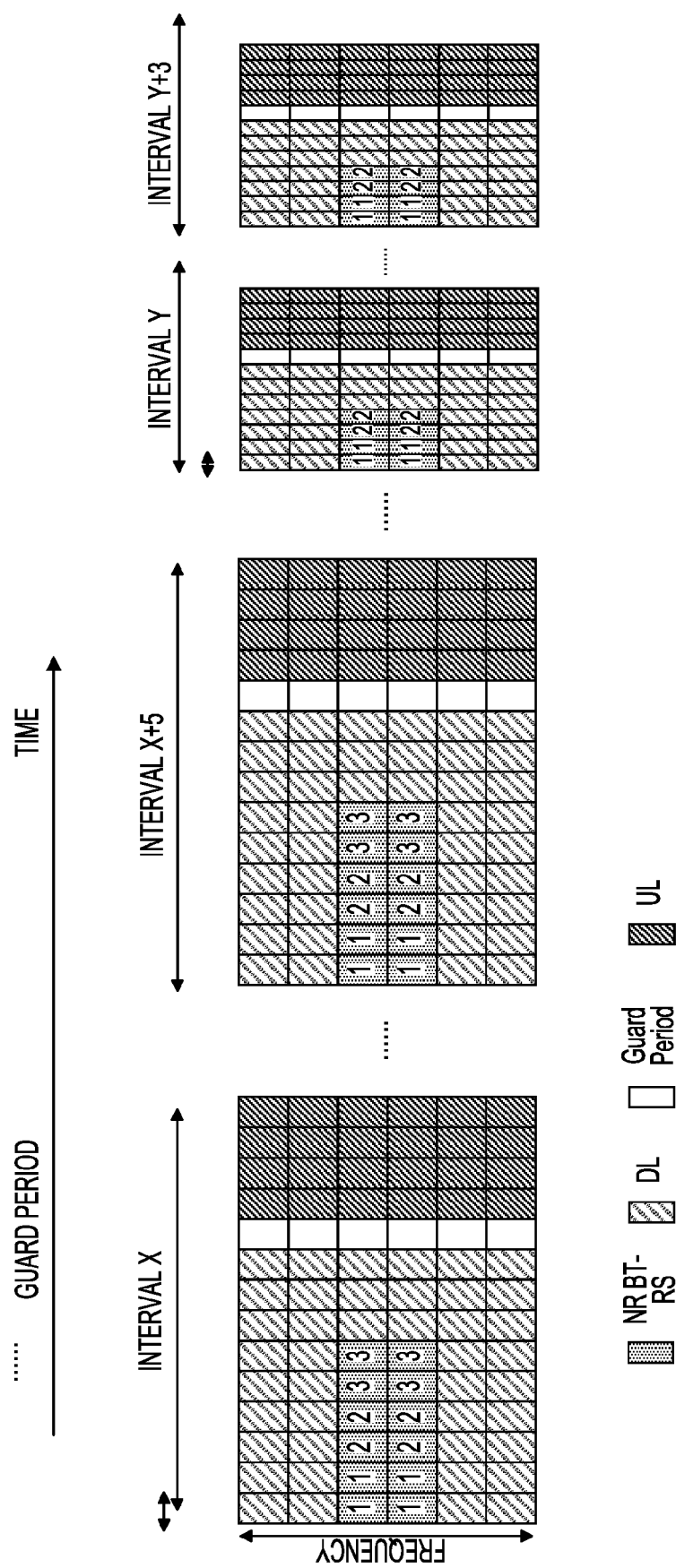
FIG. 7B illustrates a semi-statically configured BT-RS configuration in a self-contained subframe according to an embodiment of the application.

Furthermore, BT-RS can be supported in a self-contained subframe. In a self-contained subframe, BT-RS can be placed at known frequency-time DL resources i with interval x. In FIG. 6, NR BT-RS is placed at the beginning DL symbols and its periodicity is set to P=5 intervals. The BT-RS setup may be predefined with a fixed configuration as shown in FIG. 7(a), or semi-statically configured when the interval is reconfigured with different numerology as shown in FIG. 7(b). The re-configuration by NR-node or TRP may be indicated to UEs via system information broadcasting or high layer signaling such as RRC or MAC message.

Cell (or Sector or RAN Slice) Synchronization and Timing Acquisition

In an embodiment, when a UE is in the initial access stage and has no knowledge of a cell/sector/RAN slice timing information. Then a UE can monitor the periodical transmission BT-RS to acquire the symbol timing, subframe and frame timing. The UE can perform timing synchronization based on correlating N beams (or N hypothesis) with or without using RX beamforming. The N can be known to UE because BT-RS can associate with a counter such that UE can figure out how many beams in BT-RS.

The UE selects beam/cell to perform initial network access based on TXSS signal strength, and/or BF pairing. Each beam i=1, ..., N will be associated a beam ID and each beam ID can be associated with multiple sequences. The number of sequences associated to a beam ID denotes as J. The association of beam ID and its corresponding beam sequences can be predefined by the system. For example, beam sequences can adopt M-sequence with different shifts or other (semi-) orthogonal sequences to allow UE to distinguish beams i=1, ..., N while detecting the beamed ID and symbol, subframe timing simultaneously.

Figure 8:
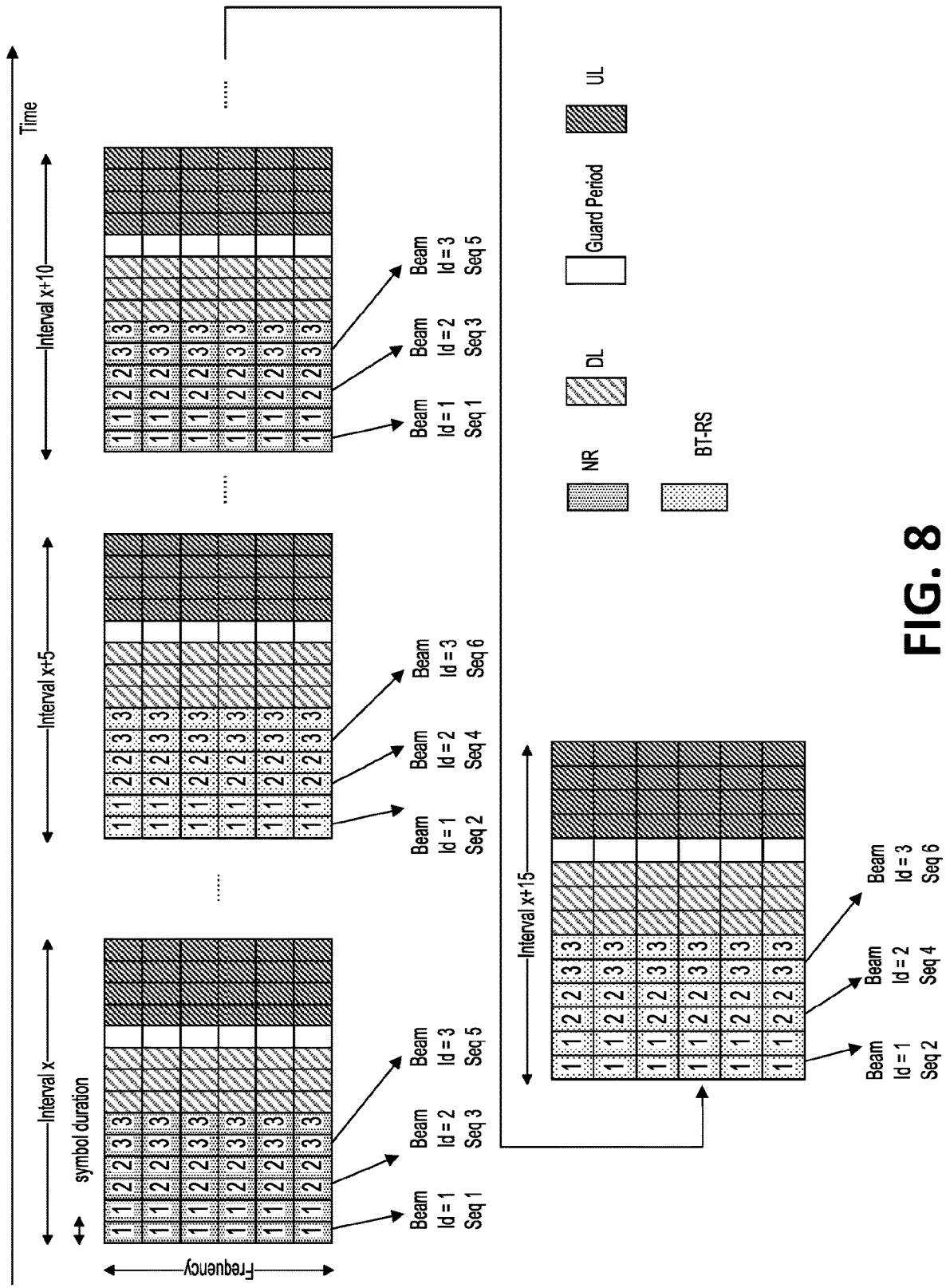
FIG. 8 illustrates an exemplary embodiment of a BT-RS beam identification and association beam sequence in a self-contained subframe of the application.

Since each beam i=1, ..., N has its own unique sequences. Hence, a UE can set up J×N correlators to perform timing detection and beam ID detection. Since the transmission of BT-RS is based on a known periodicity, the delay profile of each beam i=1, ..., N can be utilized by with the accumulation of each beam correlation output. An example of BT-RS beam ID and associated beam sequences is shown in FIG. 8. Specifically, there are N=3 beams and each beam ID is set as 1, 2 and 3. For each beam ID, it is associated with J=2 sequences. Hence, there are J×N hypothesis to be detected for N beams when a UE performs the timing-and-frequency synchronization during the initial access stage. In this example, since each beam ID is associated with J=2 sequences and each associated sequence is transmit at the different time or subframe interval. Therefore, those beam sequences associated to a beam ID can be used to distinguish frame timing. In FIG. 8, each beam ID is associated with 2 sequences and each beam sequence is repeated by 5 subframes. In this approach, frame timing can be distinguished.

Figure 9:
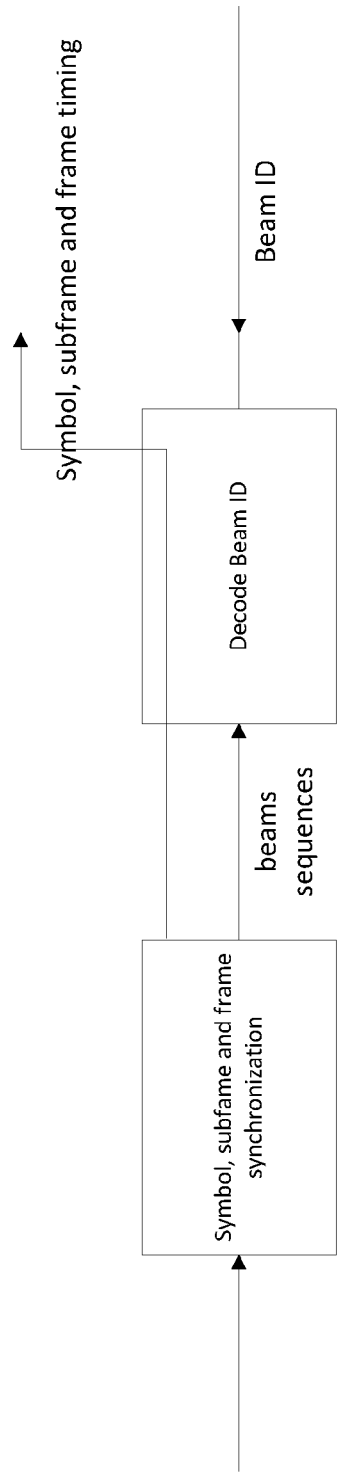
FIG. 9 illustrates an exemplary embodiment of BT-RS beam identification. decoding and synchronization detection embodiment of the application.

UE assumes the RX beamforming gain is equal for all directions, and decides which cell/sector beam to access based on received signal strength of BT-RS. Since each beam ID is associated with unique sequences, UE can decode the beam ID from the associated beam sequences. In practice, beam sequences are selected based on the received signal strength of BT-RS. UE performs initial beam search procedure and finds the best beam to camp on. The symbol, subframe timing and beam ID detection and decoding function in a UE is illustrated in FIG. 9.

PBCH Design

In another embodiment, the NR-node/TRP transmits its BT-RS and beam formed PBCH. The PBCH should be beamformed the same way as corresponding BT-FS for each beam. BCH will serve the purpose of verifying the ID (beam ID or cell/TRP/RAN slice ID) carried on the preceding BT-RS. The PBCH contents may include Cell or TRP or RAN slice common PBCH content. The common part of PBCH can be broadcast following the beam sweeping Beam-specific BCH content. The content may include a Beam ID. The Beam ID may have a flat structure with a locally unique Beam ID in local area (not carry cell ID and TRP ID and/or RAN slice ID).

The content may also include a hierarchical structure. The hierarchical structure includes a cell ID/TRP ID (if applicable)/RAN slice ID (if applicable)/Beam ID. It may also include nested beams with more than one coverage size as illustrated in FIG. 3. Here, the coarser beams have relatively wider coverage and high gain narrow beams with refined antenna weight vectors. In this case, if there are two sizes of coverage beams, one will be denoted as Type1 beam and the other as Type 2 beam. The Type 1 beam is a wider beam that includes more than one Type 2 beam. The Beam ID may be cell ID (and/or TRP ID and/or RAN slice)+Level 1 Beam ID+level 2 Beam ID.

If multiple beams are broadcast simultaneously then each beam has its own beam ID. Type 1 beams may be used for broadcasting of "essential" (or "primary" or "most important") system information (e.g., NR equivalent of LTE MIB, SIB1 and SIB2) while Type 2 beams may be used for delivery of system information on demand for e.g., system information not essential for system access for example service specific system information. There are two options for PBCH design for initial access, the first option is that the PBCH is on demand transmission and the second option is PBCH paired with each beam transmission.

PBCH with Each Beam Transmission

Figure 11:
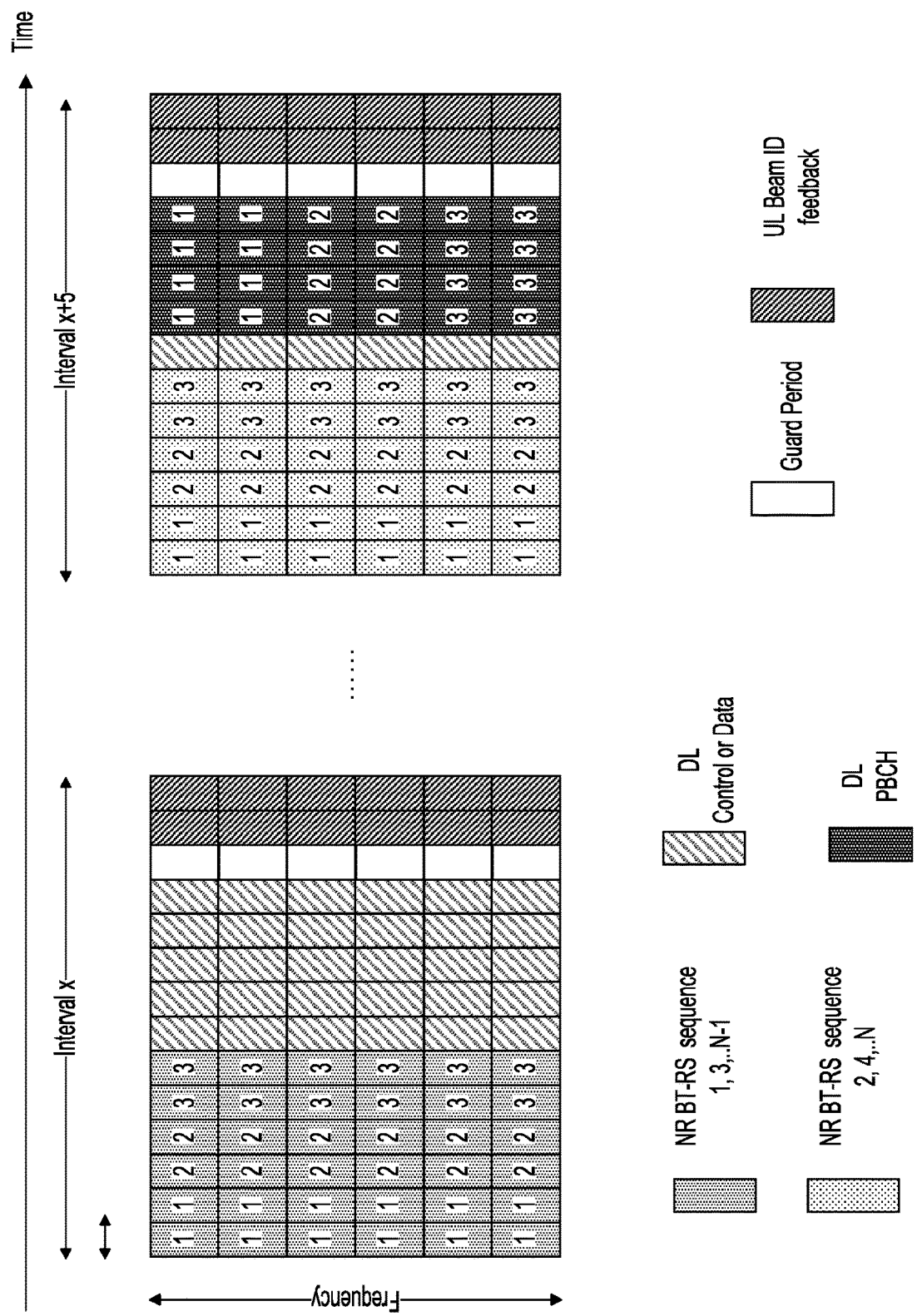
FIG. 11 illustrates placement of BT-RS and PBCH in the frame structure according to an embodiment of the application.
Figure 12:
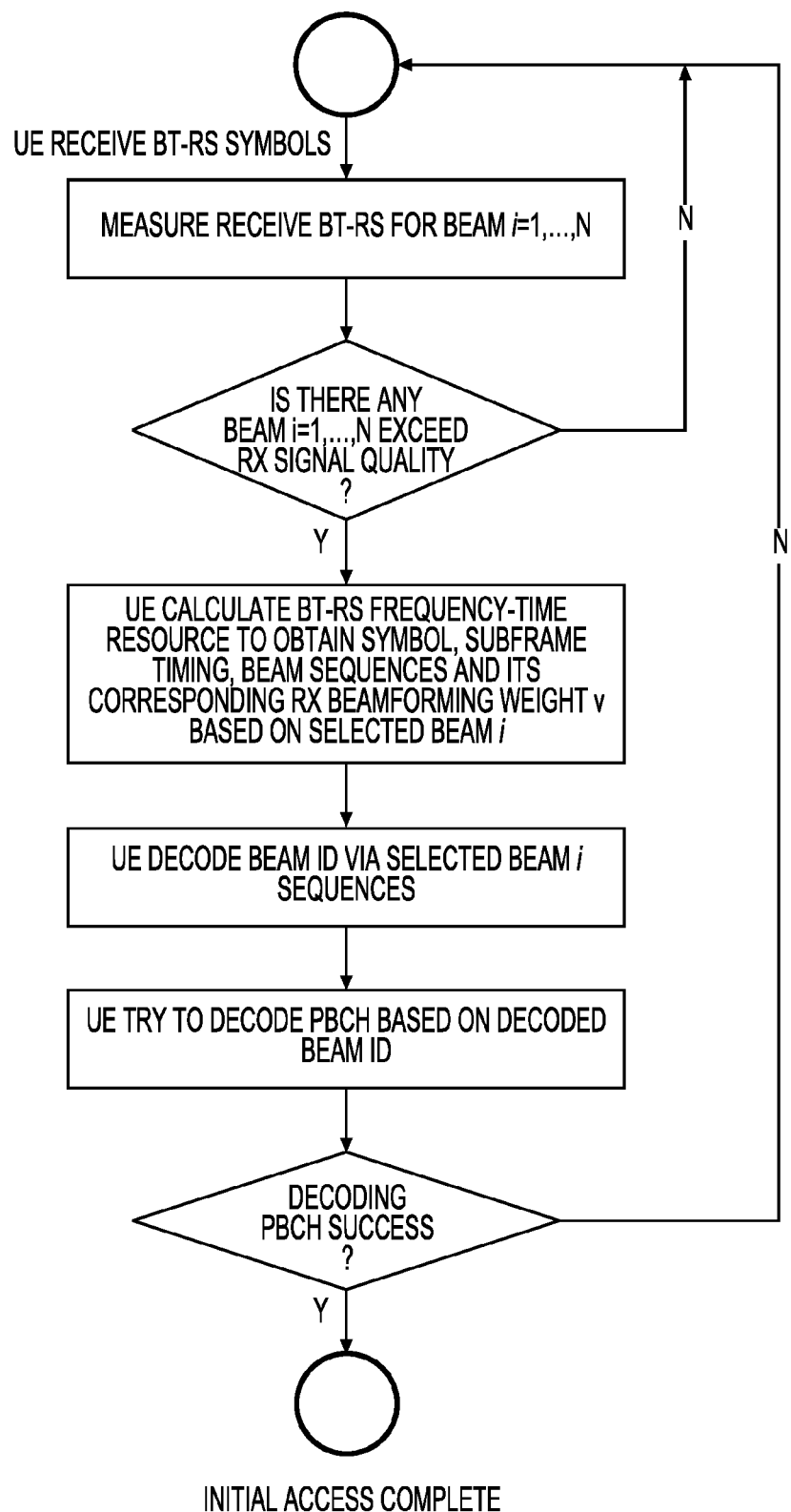
FIG. 12 illustrates an exemplary embodiment of user equipment (UE) initial access procedure for beamforming training when PBCH is paired with a beam transmission according to the application.

In another embodiment at initial access, PBCH is always transmitted following DL BT-RS of each Tx beam in the DL Tx beam sweeping. In this way, once a UE successfully detects a valid BT-RS (and corresponding beam) in the DL, and decodes the beam ID, then the UE can start to decode the corresponding beam formed PBCH. The UE will not perform any beamforming feedback or its Tx beam sweeping/training to the NR-Node before it decodes the PBCH. The UE procedure for this method is exemplarily illustrated in FIG. 12. FIG. 11 describes placement of BT-RS and PBCH in the frame structure.

PBCH

In this option, the UE won't need to decode PBCH until it receives the beam acquisition ACK from NR-node. The beam ID feedback resource has been reserved by NR system and it is known to UE. In addition, contention may occur because multiple UEs may contend if they experience the same beam (or detect the same ID). However, the probability of contention is low because UEs are at different geometric locations and won't undergo the same beam in general. In addition, the NR-node can absorb the uplink propagation due to asynchronization. The feedback mechanism can use the CAZAC sequence proposed in the following equation:

$$BID_{feedback} = e^{j\alpha n}e^{\frac{-j\pi uq(q+1)}{N}}, q = 0, 1, \ldots, Q-1,$$

where Q is the sequence length, the root of CAZAC sequence u can be set as function of beam ID and a is the cyclic shift.

Figure 10:
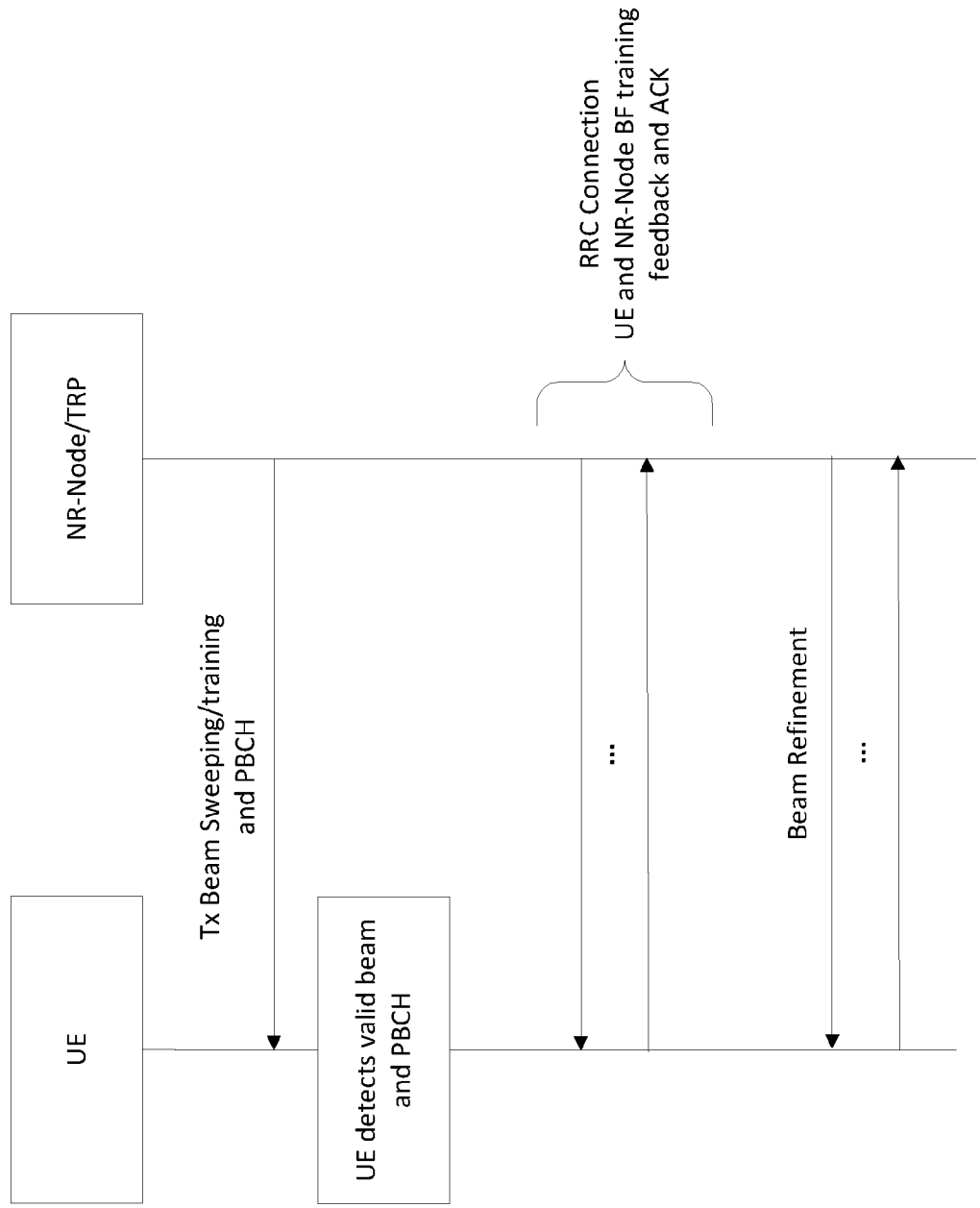
FIG. 10 illustrates a flowchart for physical broadcast channel (PBCH) transmission according to an embodiment of the application.
Figure 13:
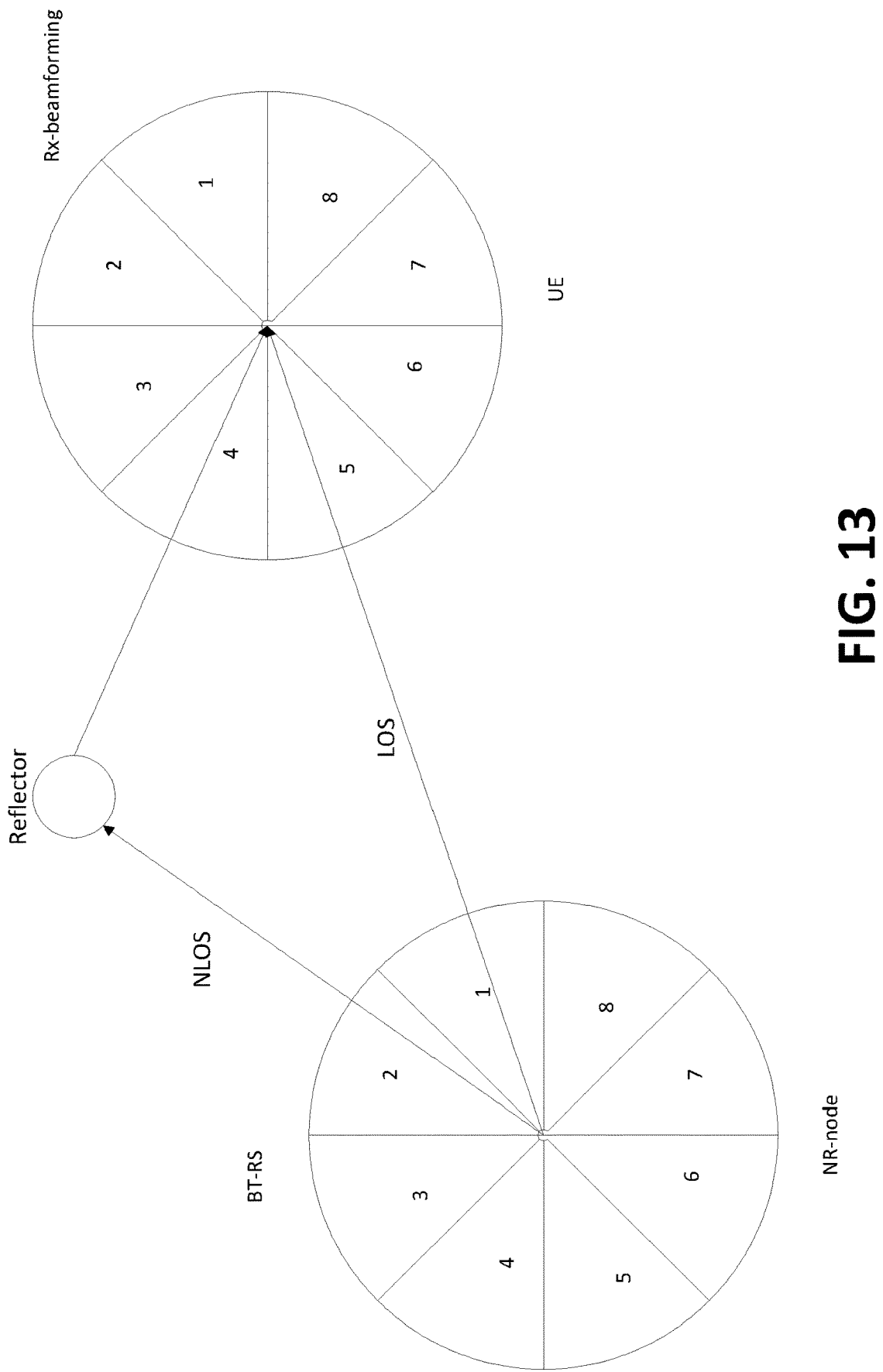
FIG. 13 illustrates an exemplary procedure for beam identification feedback mechanism according to an embodiment of the application.

In a second option, once the UE obtains the beam ID and its corresponding cell/sector timing, then the UE will transmit beam ID feedback with TX beamforming to NR-Node. Upon receiving the beam ID feedback from a UE, NR-Node will send a beam acquisition ACK to the UE. This procedure is exemplarily illustrated in FIG. 10. In this way, the UE completes the beam training stage and is ready for trying to decode the PBCH. Otherwise, the UE will retransmit UL beam ID feedback at the next predefined time-frequency resources. The time and frequency resources for beam ID feedback can be predefined by the NR system. The transmission of beam ID feedback can adopt from the beam ID sequence. This unique beam ID feedback sequence can be derived from the detected beam ID, i.e., the UE will transmit beam ID feedback with a unique training sequence and this training sequence depends on the detected beam ID. The UE can transmit the feedback training sequence to NR-node by using the RX-beamforming weights. For example, a NR-node transmit BT-RS with N=8 and a UE detects the beam ID=1 has the best RX signal strength because beam 1 is light-of-sight (LOS). At the same time, a UE also forms N=8 received beamforming to detect N=8 BT-RS. In this example, UE internally can define the RX-beamform ID from 1 to 8. Each RX beamform ID is associated with its corresponding received BF weights. Let us denote the RX beamforming weights in a UE as $[v_1 \ldots v_8]$, where each $v_i$ is the RX beamforming weights. In this example, this UE finds the best RX beamforming weights is equal to $v_{i=5}$. Hence, this UE will transmit the beam ID=1 with UL TX beamforming weights set to $conj(v_5)$, where $conj(\cdot)$ denotes the conjugate operation. This is exemplary illustrated in FIG. 13.

Figure 14:
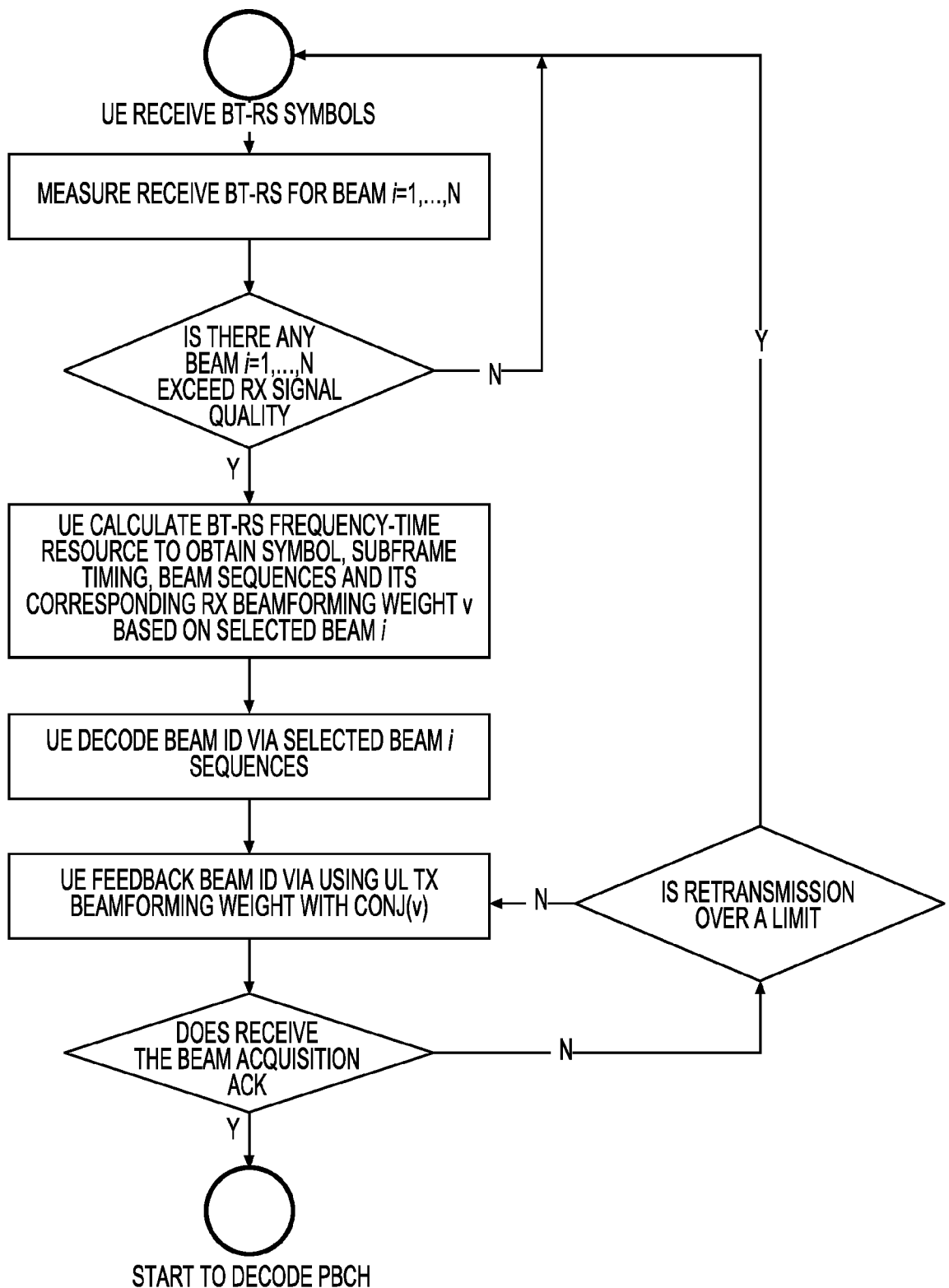
FIG. 14 illustrates an exemplary procedure for UE initial access for beamforming training according to an embodiment of the application.
Figure 15:
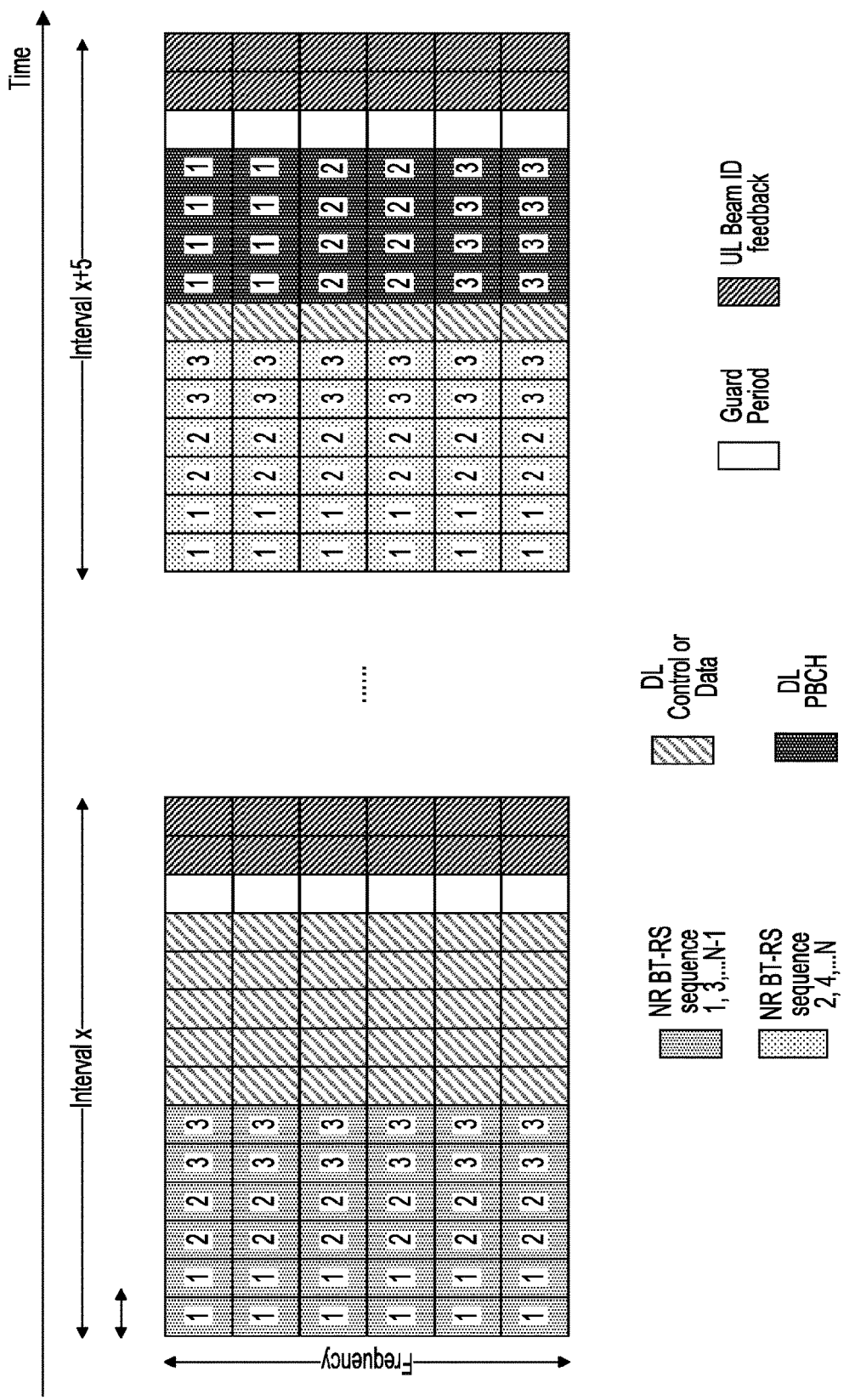
FIG. 15 illustrates an exemplary embodiment of beam identification feedback transmission in a self-contained subframe according to the application.
Figure 16A:
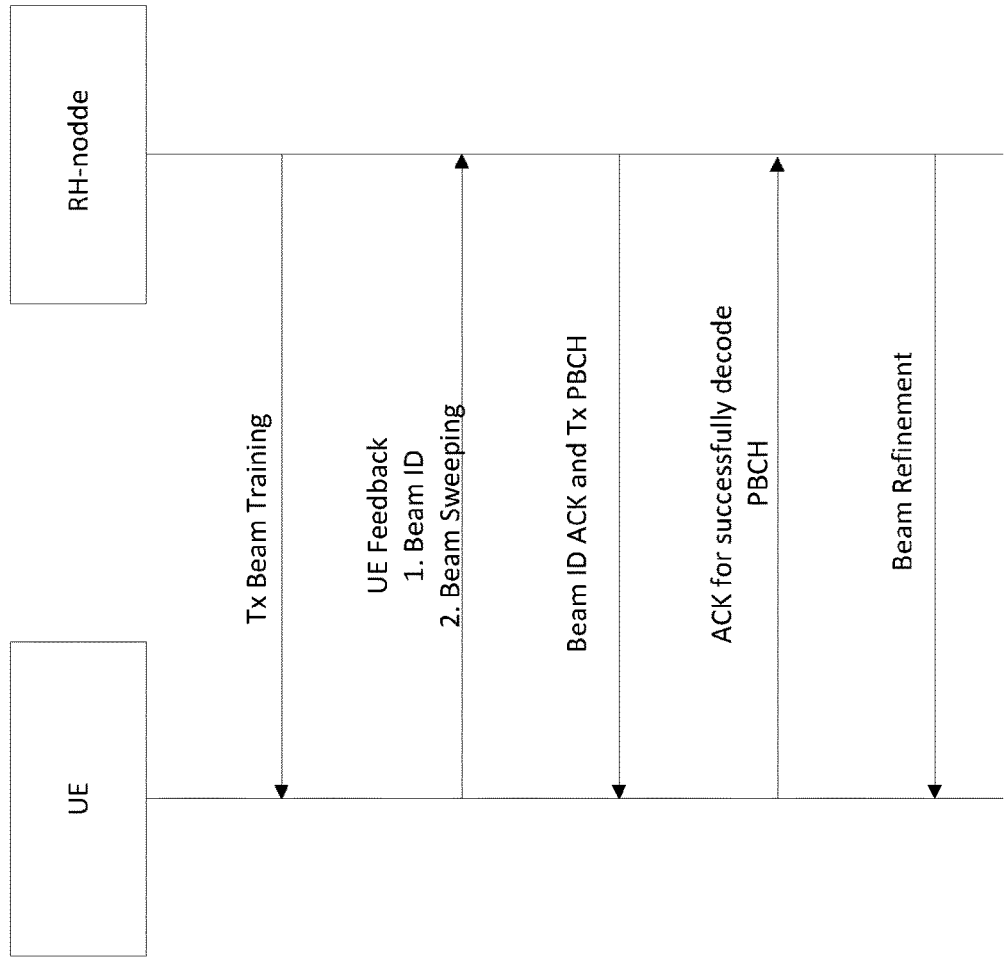
FIG. 16A illustrates an exemplary embodiment of a protocol between UE and RH-node according to the application.
Figure 16B:
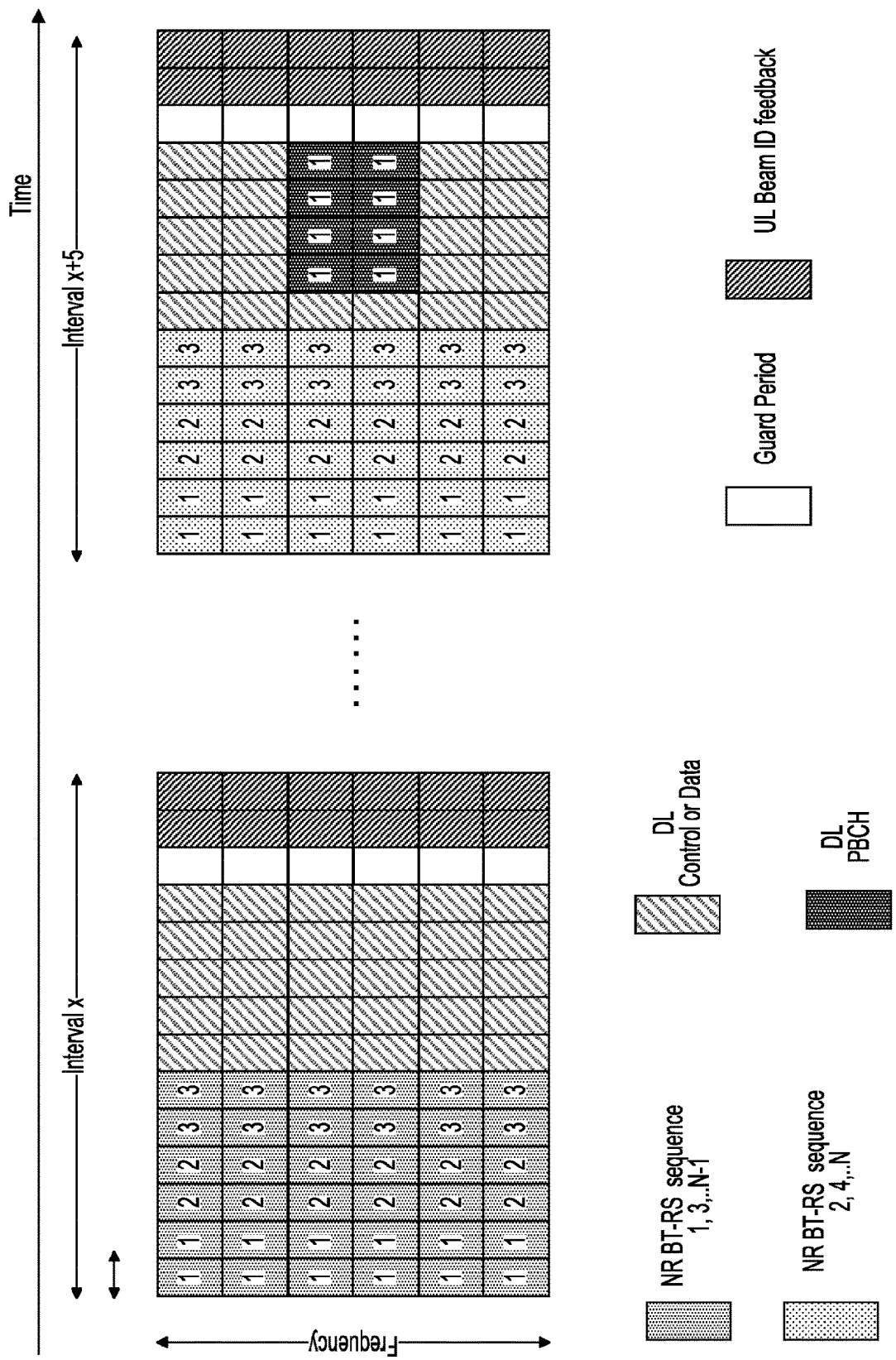
FIG. 16B illustrates an exemplary embodiment of a PBCH transmit after UE feedback according to an embodiment.

The UE initial access procedure for beamforming training is summarized in the following FIG. 14. The beam acquisition ACK transmission timing and it's time-frequency allocated resources can be predefined. For an example, the beam ID feedback in a self-contained frame structure can be configured right after guard symbols as shown in FIG. 15. These dedicated resources are reserved for UE transmit ACK back to NR-node. Those resources may be content by multiple UEs, once contention has happen. UE has to wait until next available transmission resource. FIG. 16(*a*) illustrates communications between the user equipment and the RH-node. FIG. 16(b) illustrates the PBCH transmit after the UE feedback.

Beamforming Training in Active State

According to another aspect of the application, the following solutions are described for frame structure and beamforming procedures in active state. For the UEs that are already in an active (or RRC_Connected) state, it is assumed these UEs have already gone through a beam formed initial access. That is, it has at least acquired the appropriate beams in the DL, and it may or may not have found the best beam in the uplink transmission. In other words, the UE in an active state may or may not have the Tx-Rx beams paired yet.

For the UEs in an active state, the beamforming training can be performed using one or combination of the following methods. One method includes periodic beamforming training and the other method includes on-demand beamforming training.

Periodic BF Training

Figure 17:
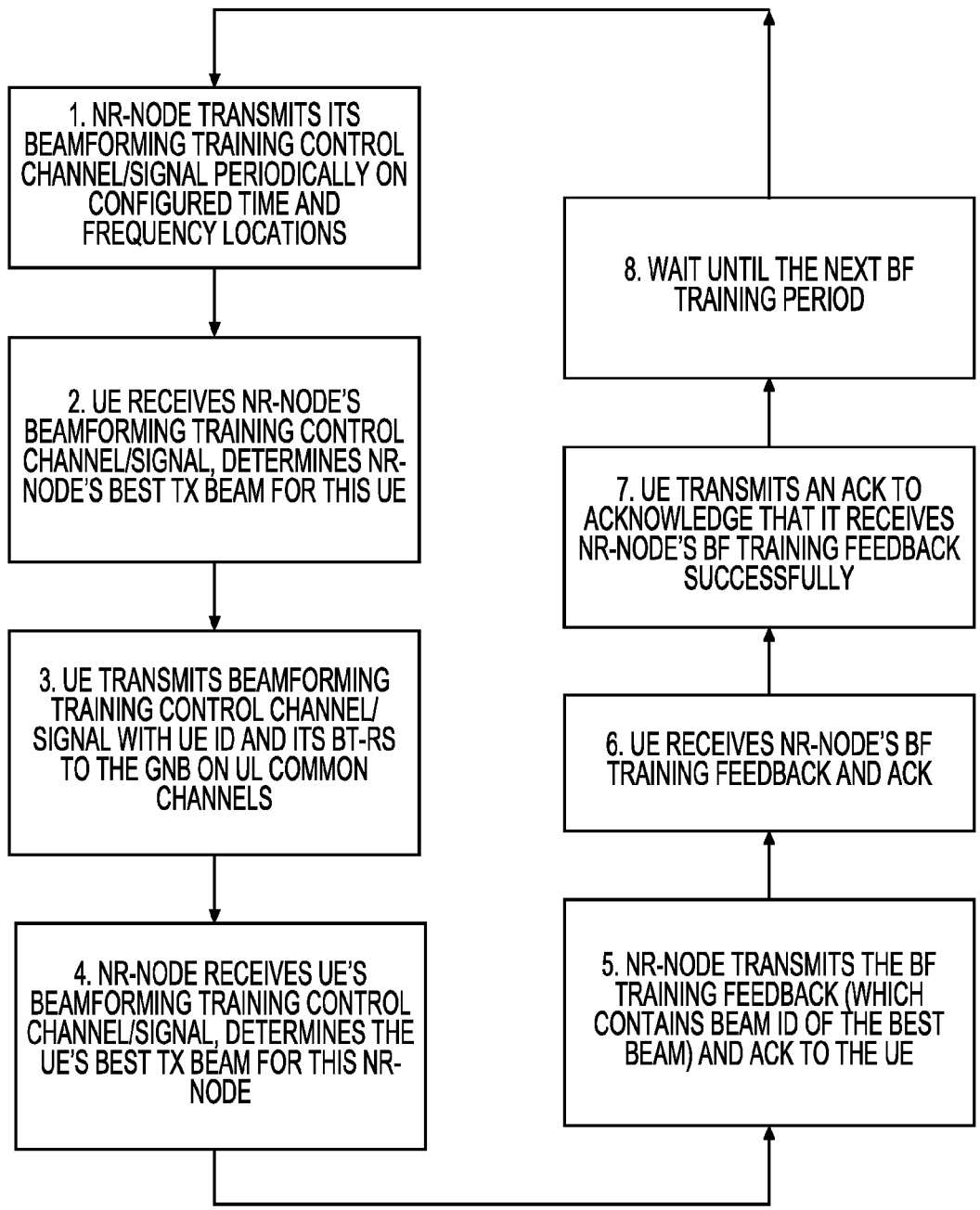
FIG. 17 illustrates an exemplary embodiment of periodic beamform (BF) training procedures according to the application.

According to yet another aspect related to periodic BF training, the following frame structure with BT-RS location, signaling and BF training procedures are described. BF training follows the basic procedures below, which are further described and explained in the subsequent subsections. This is exemplarily shown in FIG. 17 where each step is denoted by an Arabic number. In step 1, the NR-Node transmits its BT-RS and corresponding beam IDs periodically on configured time and frequency locations. Then, the UE receives NR-Node's BT-RS and corresponding beam IDs, determines the NR-Node's best Tx beam for this UE (step 2).

In step 3, the UE transmits the BF training feedback (which contains beam ID of the best beam) to the NR-Node, together with its UE ID (implicitly or explicitly signaled). And UE performs its Tx beam sweeping. Both beam ID feedback and Tx beam sweeping can be transmitted on contention-based uplink channels or common uplink channels shared by multiple UEs in the periodic BF training process. In step 4, the NR-Node receives UE's BF training feedback and BT-RS, determines the UE's best Tx beam for this NR-Node. Next, the NR-Node transmits the BF training feedback (which contains beam ID of the best beam) to the UE (step 5) The NR-Node may transmit an acknowledgement (ACK) to the beamforming feedback sent by the UE in step 3. The ACK can be signaled either explicitly or implicitly. One way to transmit an implicit ACK for feedback in step 3 is that the NR-Node transmits its BF training feedback to the UE using the beam whose beam ID is transmitted by the UE in step 3.

In step 6, the UE receives NR-Node's BF training feedback and ACK for its Step 3. Subsequently, the UE transmits an ACK to acknowledge that it receives NR-Node's BF training feedback successfully (step 7). ACK can be signaled explicitly. Or an implicit ACK is implied if the UE starts to transmit a data packet using the beam whose beam ID is transmitted by the NR-Node in step 5. Thereafter, the NR-Node and UE will start communicating with the paired UL and DL beams which are obtained from the beamforming training (step 8). The beamforming procedures will not be performed until the next BF training period.

NR-Node Tx Beam Sweeping

In yet another aspect of the application, a beamforming training control channel/signal is defined as BF training reference signals (BT-RS) with explicit control information containing Beam ID and a total number of Beams. The explicit control information may be encoded with a CRC. The total number of Beams is optional. In one embodiment, the beamforming training control channel/signal is only a BT-RS (without the part of explicit control information).

Figure 18:
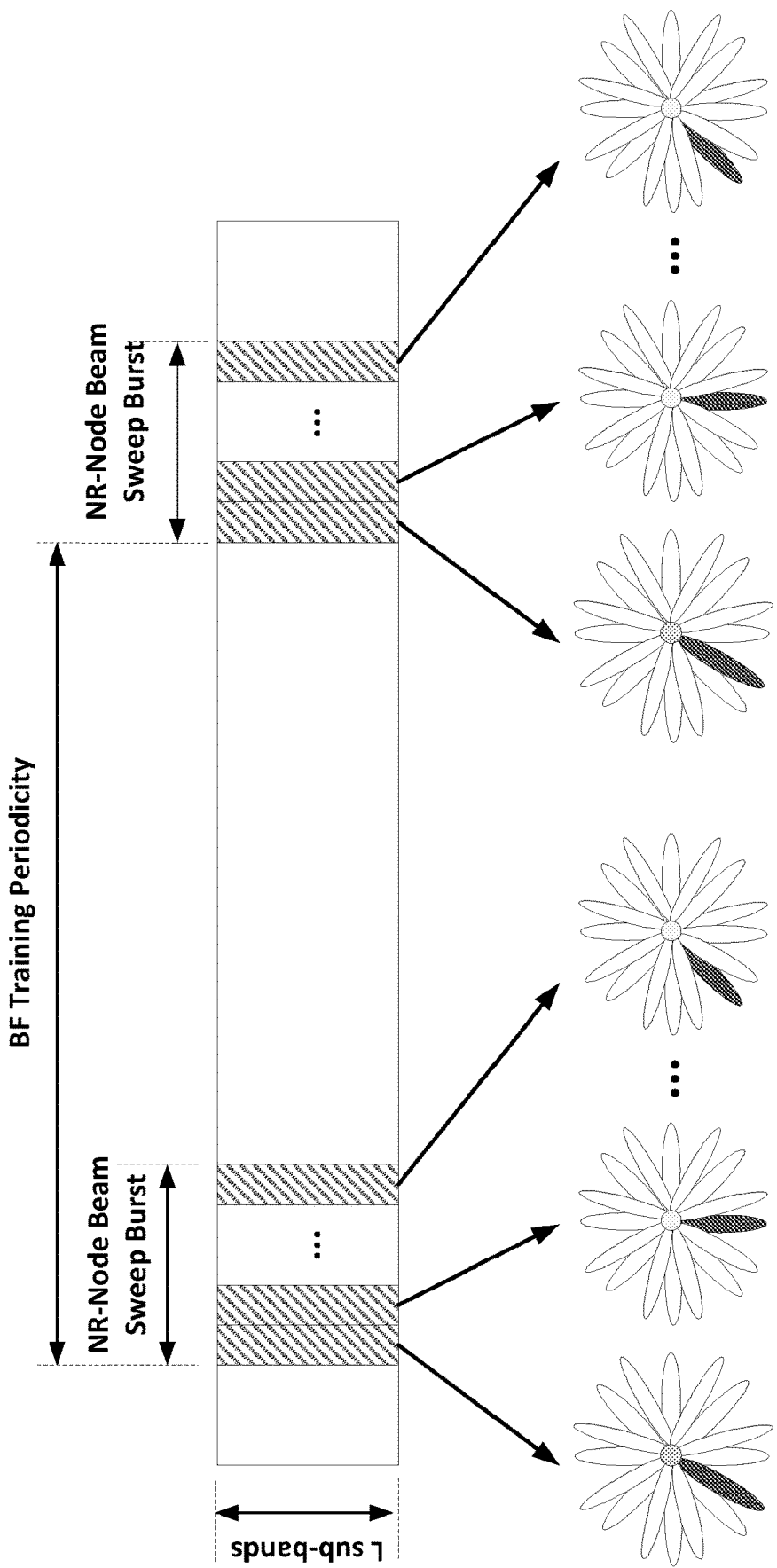
FIG. 18 illustrates an exemplary embodiment of periodic BF training in new radio according to the application.

A series of BF training control channel/signal that sweeps through all beams (or a pre-defined subset of all beams) is defined as NR-Node Beam Sweep Burst. For the purpose of describing the definition of the NR-Node Beam Sweep Burst and BF training periodicity, a generic picture of periodic BF training (where a beam is swept per OFDM symbol) is shown in FIG. 18. NR-Node Beam Sweep Burst is transmitted periodically with a BR training periodicity of PBT.

Figure 19:
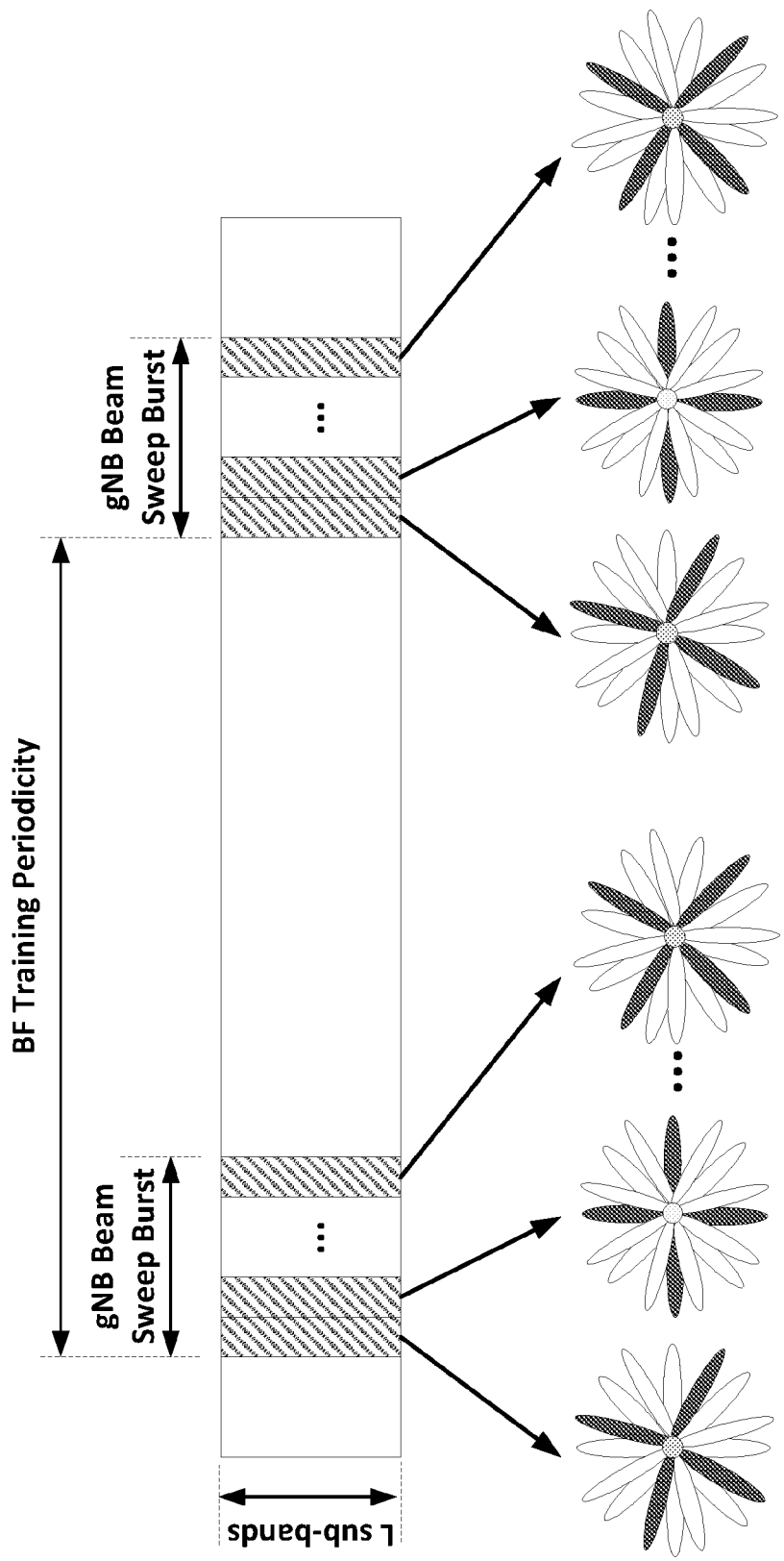
FIG. 19 illustrates an exemplary embodiment of periodic BF training with a number of subarrays equal to 4 in a new radio according to the application.

According to an alternative embodiment, sweeping of multiple beams per OFDM symbol can be performed by multiple subarrays or in the frequency domain if hybrid beamforming is applied. BT-RS should be transmitted on frequency resources of L subbands, where each subband contains a predefined number of subcarriers. These BT-RS subbands should be located at a location known to the UE. For example, at the center frequency of the carrier, or an offset from the center frequency. Sweeping of multiple beams per OFDM symbol can be performed if the number of subarrays used in analog beamforming is larger than one. An example of 4 beams is generated by 4 subarrays per OFDM symbol is shown in FIG. 19. With hybrid beamforming, in each OFDM symbol, multiple beams can be simultaneously swept in the frequency domain.

Sweeping of multiple beams per OFDM symbol can be performed if the number of subarrays used in analog and/or hybrid beamforming is larger than one. With total number of beams=N, the number of beams swept per symbol is denoted by K. As a result, it only takes $S=\lceil N/K \rceil$ to sweep all beams. The multiple beams swept in the same OFDM symbol can be either consecutive or equal-distant. For the case of an equal-distant beam, the distance between the two closest beams equals $\lceil N/K \rceil$. Moreover, Beam IDs of the $i^{th}$ OFDM symbol in the NR-Node Beam Sweep Burst are Bi, Bi+$\lceil N/K \rceil$, Bi+2 $\lceil N/K \rceil$, and Bi+(K−1)$\lceil N/K \rceil$.

With hybrid beamforming applied in the system in each OFDM symbol, multiple beams can be swept simultaneously in the frequency domain. With total number of beams=N, the number of beams swept in the frequency domain per symbol is denote by M, then it only takes $S=\lceil N/M \rceil$ to sweep all beams. Multiple beams swept in the frequency domain can be either consecutive or equal-distant. For the case of equal-distant beam, the distance between 2 closest beams is equal to $\lceil N/M \rceil$; Beam IDs of the $i^{th}$ OFDM symbol in the NR-Node Beam Sweep Burst are Bi, Bi+$\lceil N/K \rceil$, Bi+2$\lceil N/K \rceil$, and Bi+(K−1)$\lceil N/K \rceil$.

The following signaling or specifications help enable periodic BF training. This includes a total number of beams in active state: N. This parameter can either be signaled in the SIB or specified as a fixed value in the standards. Another signal includes a beam sweeping method where the indication of a beam sweeping method can either be signaled in the SIB. Or one of them is specified as the only method used in the standards. Here, a single beam is swept per OFDM symbol. Also, multiple beams generated by multiple subarrays are swept per OFDM symbol. Also, multiple beams are swept in the frequency domain per OFDM symbol Another signal is when a number of beams are swept per OFDM symbol: K. It can be either signaled in the SIB, or a fixed value is specified in the standards. This parameter is the number of beams swept per OFDM symbol of corresponding beam sweeping method above.

Another signal is the frequency domain location of BT-RS. Here, the number of sub-bands occupied by BT-RS, L subbands, can be either specified as a fixed value in the standards. Or it may vary in each cell or a cell's configuration of BF training. Therefore, it is signaled by RRC signalings such as SIB.

The location of the L sub-bands occupied by BT-RS, can be either specified as a fixed location (for example, center frequency or the same as cell search signals and etc.) in the standards. Or it may vary in each cell or a cell's configuration of BF training, therefore signaled by RRC signalings such as SIB. For example, the location of the L sub-bands occupied by BT-RS can be signaled as the starting subcarrier index of the L subbands, which is enough to identify the L subbands. Alternatively, it can be signaled as L subbands occupied by BT-RS are located at the offset of OBT subcarriers (or equivalent frequency in unit of Hz/kHz) away from the center frequency.

Yet another signal is directed to Beam ID. For cases where one beam is swept per OFDM symbol or multiple beams are swept in the frequency domain, the beam ID can be explicitly signaled in beam training signal or implicitly signaled with the transmitted BT-RS. The beam pattern (beam ID at each OFDM symbol, or beam IDs and corresponding frequency sub-bands at each OFDM symbol) can either specified in the standards or signaled in the SIB. For the case where multiple beams (say, K beams) generated by multiple subarrays are swept in the same OFDM symbol, The beam pattern (IDs of K beams at each OFDM symbol) can either specified in the standards or signaled in the SIB. However, the UE still need to distinguish the received beam ID out of K different beams in an OFDM symbol. Therefore, unique IDs (no less than K, and no greater than N) for these K beams should be (explicitly or implicitly) signaled with the transmitted BT-RS. For example, BT-RS sequence with different (orthogonal or non-orthogonal) shifts can be used by the K beams in the OFDM symbol.

Yet a further signal is a multiple beam pattern. This can be consecutive or equal-distant, 1 bit indicator. It can either be specified in the standards or signaled in the RRC signalings, such as SIB.

UE Beam Feedback and Tx Beam Sweeping

In even a further embodiment, upon receiving NR-Node's BT-RS, the UE determines the NR-Node's best Tx beam. UE transmits the beam ID of the best beam back to the NR-Node. The UE performs its Tx beam sweeping by transmitting a burst of UE's beamforming training control channels/signals swept through different beamforming directions. The beamforming training control channel/signal can be transmitted on contention-based uplink channels or common uplink channels shared by multiple UEs in the periodic BF training process. A flexible frame structure contains the periodic NR-Node beamforming training control channels/signals transmission (in the DL), followed by a guard time, and UL common channels for UEs to transmit their beamforming training control channels/signals. Such a frame structure can be a self-contained time interval x for periodic BF training, as shown in the example FIG. 20.

Figure 20:
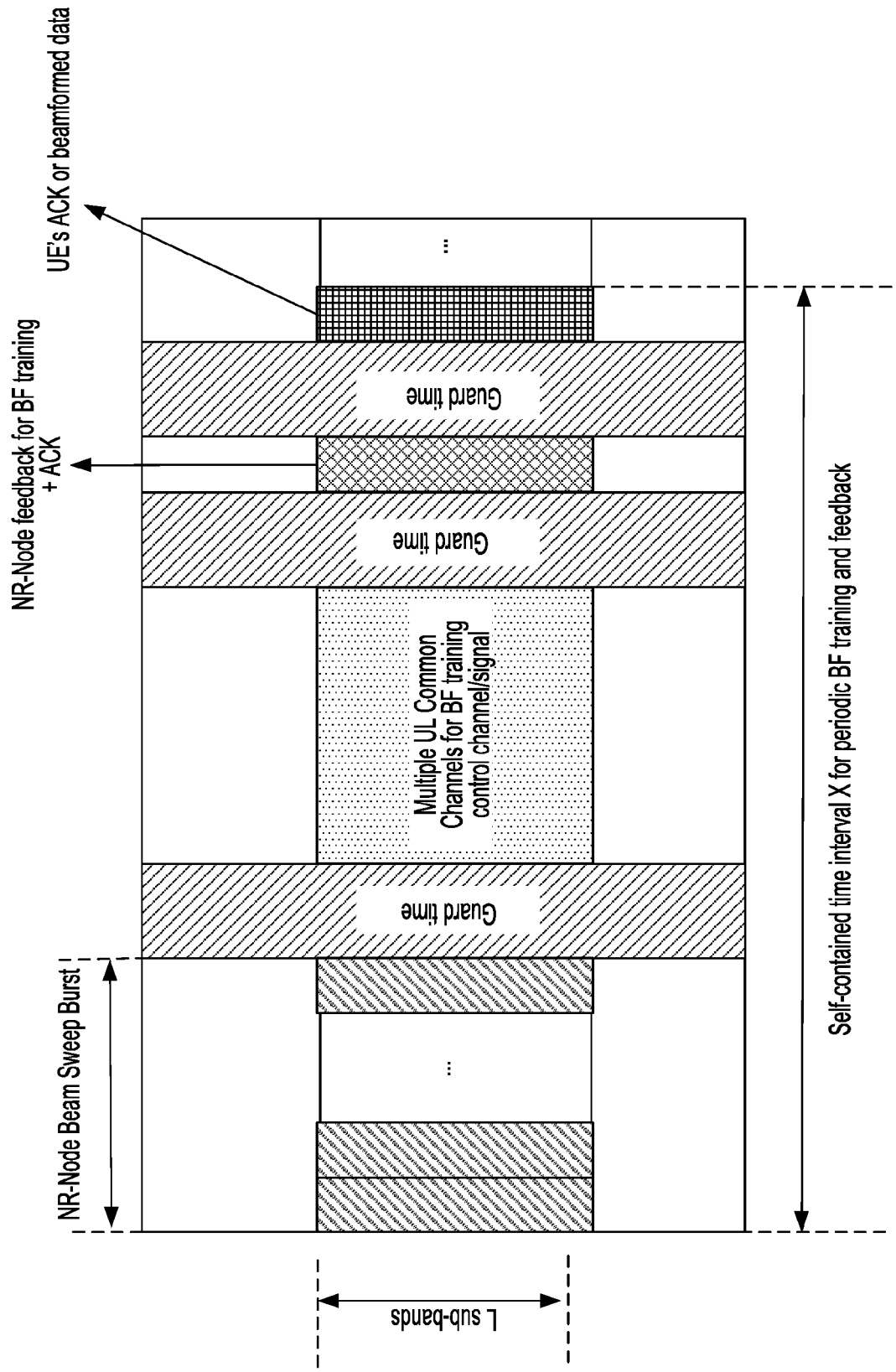
FIG. 20 illustrates an exemplary embodiment of a self-contained time interval X for periodic BF training and feedback according to the application.

The resources for multiple UL common channels for UEs to transmit their beamforming training control channels/signals (as shown in FIG. 20) consists of multiple individual UL common channels in time domain, frequency domain, code domain and potentially spatial domain.

One example of configuring UL common channels resources is that for each beam ID of NR-Node, one individual UL common channel is implicitly configured. A UE that finds this beam ID as the best beam ID is allowed to use this UL common channel resource to transmit its BF training feedback (NR-Node's best beam ID) and its BT-RS. One method to transmit UE's beamforming training control channel/signal and UE ID is to encode the information bits with short block codes or Reed-Solomon code and CRC. UE ID can be scrambled on the CRC. And use UE's BT-RS as demodulation reference signals for the coded explicit control information in the beamforming training control channel/signal. The transmission of beamforming training control channel/signal and UE ID is beam formed and swept through different Tx beams.

In an embodiment, it is possible that the frequency domain resources occupied by multiple UL common channels for the UE's beamforming training control channel/signal may or may not be the same as frequency resources used by NR-Node's BT-RS.

Figure 21:
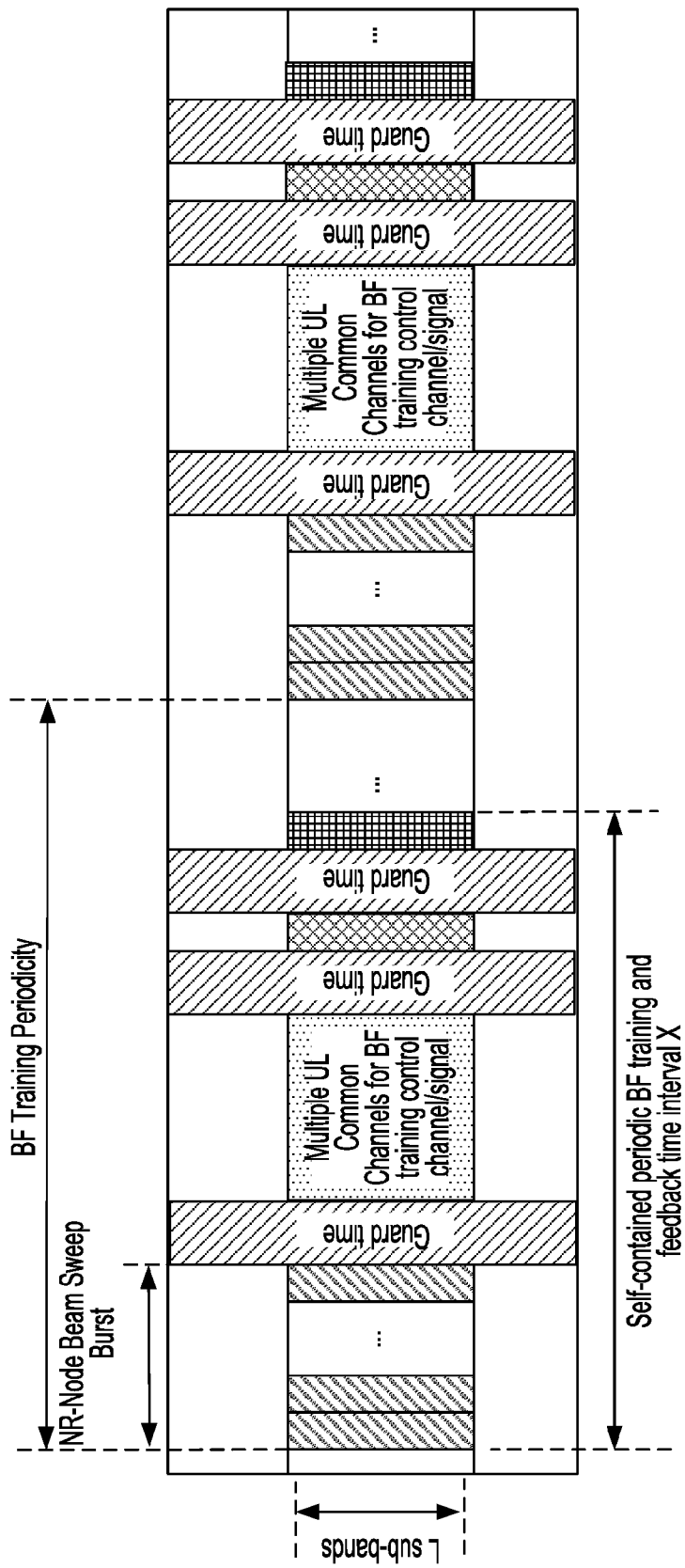
FIG. 21 illustrates an exemplary embodiment of uplink (UL) common channels for UE beamforming feedback and beam sweeping according to the application.

Examples of such as a self-contained time interval x for periodic BF training in the overall channel is shown FIG. 21. The self-contained time interval x for periodic BF training repeats with a pre-defined periodicity. Alternatively, the NR-Node feedback and ACK and UE's ACK can be transmitted in subsequent time intervals following the time intervals where both NR-Node and UE's Tx beam sweeping are done (in other words, their BT-RS are transmitted).

Some semi-static parameters and configuration of the periodic BF training (including configuration of BT-RS, configuration of UL common channel resources to transmit UE beamforming training control channel/signal) can be signaled via RRC signaling such as SIB or MIB.

An example is provided below labeled as Periodic Beamforming Training-ConfigInfo IE. It is defined to include the IEs defaultBFTraingPeriod, BFTrainingBW, BFTrainingResourcesLocation, NR-NodeBeamSweepingPattern and ULCommonChannelConfig which represent key parameters and configuration settings.

Periodic Beamforming Training-Configinfo IE

```
-- ASN1START
PeriodicBeamformingTraining-ConfigINfo :: = SEQUENCE {
Default BFTrainingPeriod         ENUMERATED {
                                 value1, value2, ..., valueM1},
BFTrainingBW                     ENUMERATED {n1, n2, n3, n4, n5, ..., n8}
BFTrainingResourcesLocation      ENUMERATED {n1, n2, n3, n4, n5, ..., n8}
NR-NodeBeamSweepingPattern           ENUMERATED {n1, n2, n3, n4, n5, ..., n8}
ULCommonChannelConfig            ENUMERATED {n1, n2, n3, n4, n5, ..., n8}
}
-- ASN1STOP
```

On-Demand BF Training Techniques

An on-demand BF training technique in an active state is described according to another aspect. Two different design approaches are considered. The first is NR-Node initiated on-demand BF training, and the second is UE initiated on-demand BF training. For UEs that are already in an active (or RRC_Connected) state, it is presumed these UEs have already gone through beam formed initial access. Hence, it has at least acquired the appropriate beams in the DL, and it may or may not have found the best beam in the uplink transmission. In other words, a UE in active state may or may not have the Tx-Rx beams paired yet.

In this case, the NR-Node will perform one-on-one BF training with particular UE in the active state. This may occur in a flexible frame structure used for the one-on-one BF training within a self-contained time interval x. Here, a DCI is transmitted in the beginning to indicate that this time interval is for one-on-one (or dedicated) BF training. This is followed by a burst of NR-Node's transmission of (initiator's) beamforming training control channel/signal for each (narrow) beam. Subsequently, there is a guard time (switching from DL to UL). This is followed by an UL period (which contains one or several dedicated UL channels) for UE to transmit its (responder's) beamforming training control channel/signal (which contains Beamforming feedback). This is followed by a guard time (switching from UL to DL). Next, is a DL period for NR-Node to transmit its BF training feedback+ACK (for preceding BF training feedback received from the UE). Thereafter is a guard time (switching from DL to UL).

Figure 22:
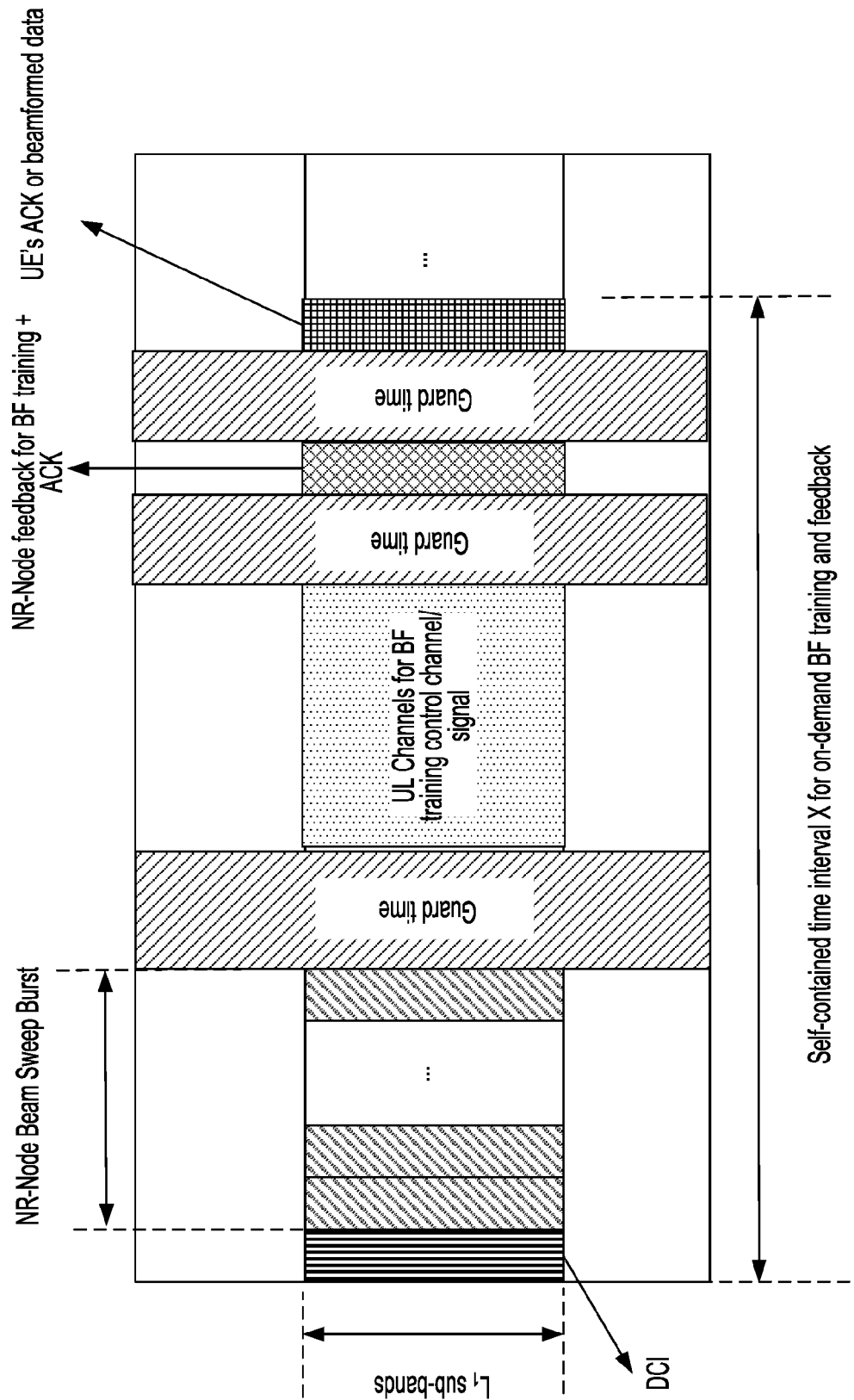
FIG. 22 illustrates an exemplary embodiment of a self-contained time interval X for on-demand one-on-one BF training and feedback according to the application.

This is followed by an optional UL period for UE to transmit ACK (for preceding BF training feedback received from the NR-Node). An example of a self-contained time interval x used for the on-demand one-on-one BF training and feedback is shown in FIG. 22. Alternatively, the NR-Node feedback and ACK, and UE's ACK can be transmitted in subsequent time intervals following the time intervals where both NR-Node and UE's Tx beam sweeping are performed (in other words, their BT-RS are transmitted).

Besides carrying an indicator to signal that the time interval x is a one-on-one (or dedicated) BF training time interval, the DCI will carry the following disclosed information: (i) UE ID (such as C-RNTI or its equivalent). This can be signaled implicitly or explicitly; (ii) number of beams to sweep and IDs of those beams; (iii) beam sweeping pattern for NR-Node's beamforming training control channel/signal and/or UE's beamforming training control channel/signal; and (iv) UL dedicated resources (in terms of time, frequency, code and etc.) for UE's transmission of beamforming training control channel/signal which includes BF feedback (such as the ID of the best Tx Beam). The number of beams to sweep and IDs of those beams; (iii) beam sweeping pattern for NR-Node's beamforming training control channel/signal and/or UE's beamforming training control channel/signal as introduced above will now be discussed. The number of beams to sweep can be explicitly signaled or configured via RRC signaling. Therefore it is not carried in this DCI. Alternatively, it can be specified to be a fixed value in the standards. Beam IDs need to be signaled explicitly in the DCI. The NR-Node can choose a subset of narrow/fine beams out of all available beams in the system. A special case is that the subset contains all available beams.

For example, in an exemplary embodiment, if the UE had acquired a wide beam in the initial access phase, the NR-Node can choose the narrow beams within the beam width of the wide beam (and maybe some additional adjacent narrow beams) as the subset. If the UE has acquired a pair of Tx-Rx beams (finished fine/narrow beamforming training) certain time ago and the NR-Node decides to perform beamforming training again, the subset can be chosen as the previous fine/narrow beam with certain number of adjacent fine/narrow beams.

The Beam sweeping pattern for NR-Node's beamforming training control channel/signal and/or UE's beamforming training control channel/signal as introduced above is now described below in more detail. In each OFDM symbol, a beamforming training control channel/signal for one fine/narrow beam is transmitted. Several (consecutive) symbols are used to sweep through the subset of beams to sweep. Or several beams are generated using multiple subarrays at the same time in each OFDM symbol. Alternatively, several beams are generated in a FDM manner at different sub-bands in each OFDM symbol.

The UL dedicated resources (in terms of time, frequency, code and etc.) for UE's transmission of beamforming training control channel/signal which includes BF feedback (such as the ID of the best Tx Beam) as introduced above is now described. This can explicitly or implicitly be signaled. For example, the frequency resources are equal to the same frequency used by the DCI. The number of OFDM symbols is a pre-defined function of numbers of beams to sweep from the UE side.

Figure 23:
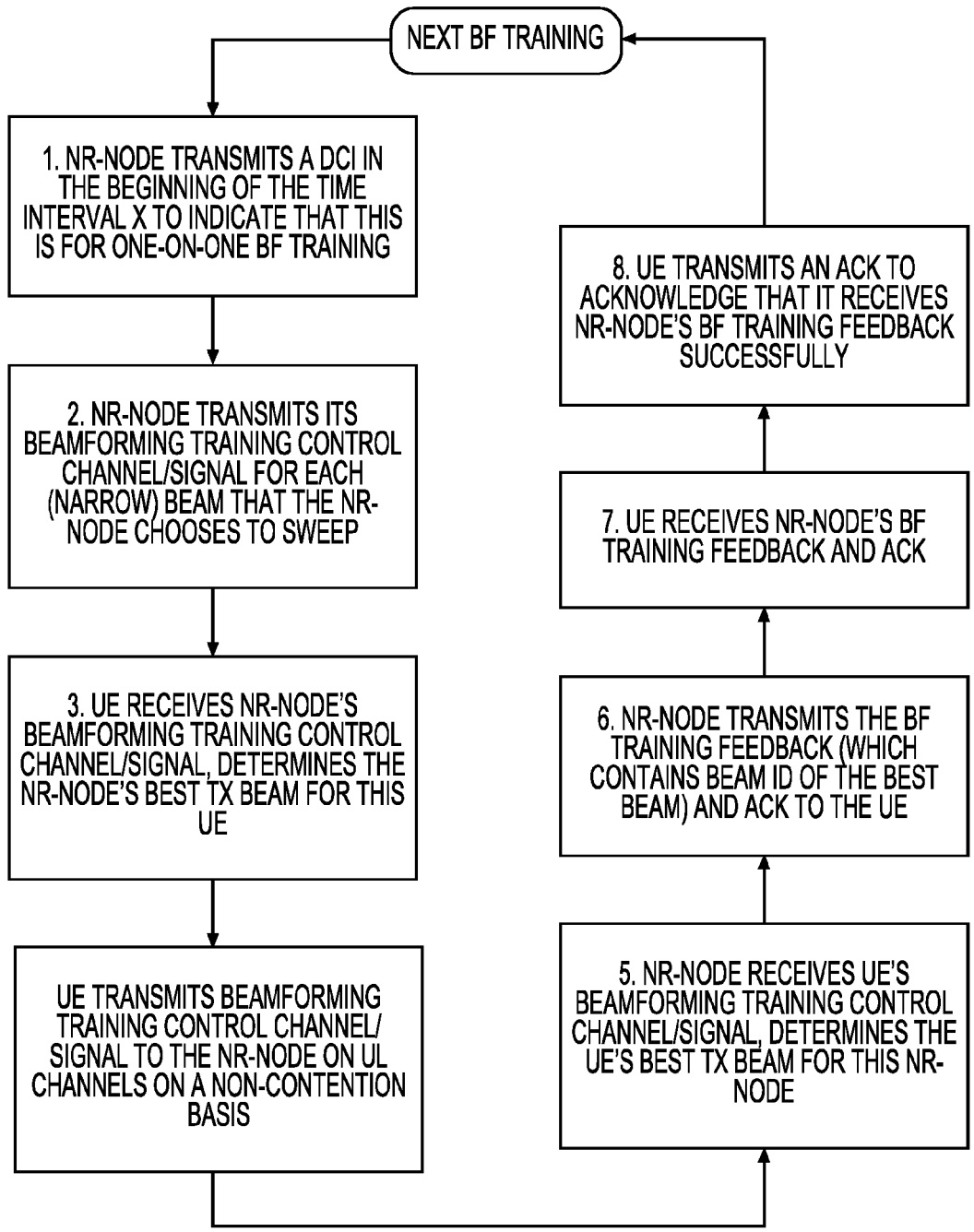
FIG. 23 illustrates an exemplary embodiment of on-demand one-to-one BF training procedures according to the application.

On-demand beamforming training procedures as exemplary illustrated in FIG. 23 are discussed below. Each step is denoted by an Arabic numeral. In step 1, the NR-Node transmits a DCI in the beginning of the time interval x to indicate that this time interval is for one-on-one (or dedicated) BF training. Next, the NR-Node transmits its beamforming training control channel/signal for each (narrow) beam that the NR-Node chooses to sweep (step 2). Thereafter, the UE receives NR-Node's beamforming training control channel/signal and corresponding beam ID, determines the NR-Node's best/optimal Tx beam for this UE (step 3).

According to step 4, the UE transmits its beamforming training control channel/signal including BF training feedback (contains beam ID of the best beam) to the NR-Node sweeping through different beamforming directions. Beamforming training control channel/signals are transmitted on dedicated UL channels on a non-contention basis. Then, the NR-Node receives UE's beamforming training control channel/signal, and determines the UE's best Tx beam for this NR-Node (step 5). Subsequently, the NR-Node transmits the BF training feedback (which contains beam ID of the best beam) to the UE (step 6).

In step 6, the NR-Node may transmit an acknowledgement (ACK) to the beamforming feedback sent by the UE in step 4. The ACK can be signaled either explicitly or implicitly. One way to transmit an implicit ACK for feedback in step 4 is that the NR-Node transmits its BF training feedback to the UE using the beam whose beam ID is transmitted by the UE in step 4.

Thereafter, the UE receives NR-Node's BF training feedback and ACK for its step 4 (step 7). Further, the UE transmits an ACK to acknowledge that it receives NR-Node's BF training feedback successfully (step 8). ACK can be signaled explicitly. Alternatively, an implicit ACK is implied if the UE starts to transmit a data packet using the beam whose beam ID is transmitted by the NR-Node in step 6.

According to another embodiment, the NR-Node will perform one-to-many BF training with multiple UEs in the active state. The UEs that have RRC connection with the NR-Node are configured into different groups, where each group has no more than GBT UEs. And in each group, each UE has its own unique position, which is signaled to the UEs when the group is configured.

In yet a further embodiment, a flexible frame structure is used for the one-on-one BF training. Within a self-contained time interval x, a DCI is transmitted in the beginning to indicate that this time interval is for one-on-many BF training. This is followed by a burst of NR-Node's transmission of initiator's beamforming training control channel/signal for each (narrow) beam. This is followed by a guard time (switching from DL to UL). This is followed by a UL period (which contains several UL channels) for UEs to transmit their own (responder's) beamforming training control channel/signals. This is further followed by a guard time (switching from UL to DL). This is further followed by a DL period for NR-Node to transmit its BF training feedback+ACK (for preceding BF training feedback received from the UE) to each UE. This is further followed by a guard time (switching from DL to UL). This is even further followed by a UL period for UEs to transmit their ACKs (for preceding BF training feedback received from the NR-Node).

Figure 24:
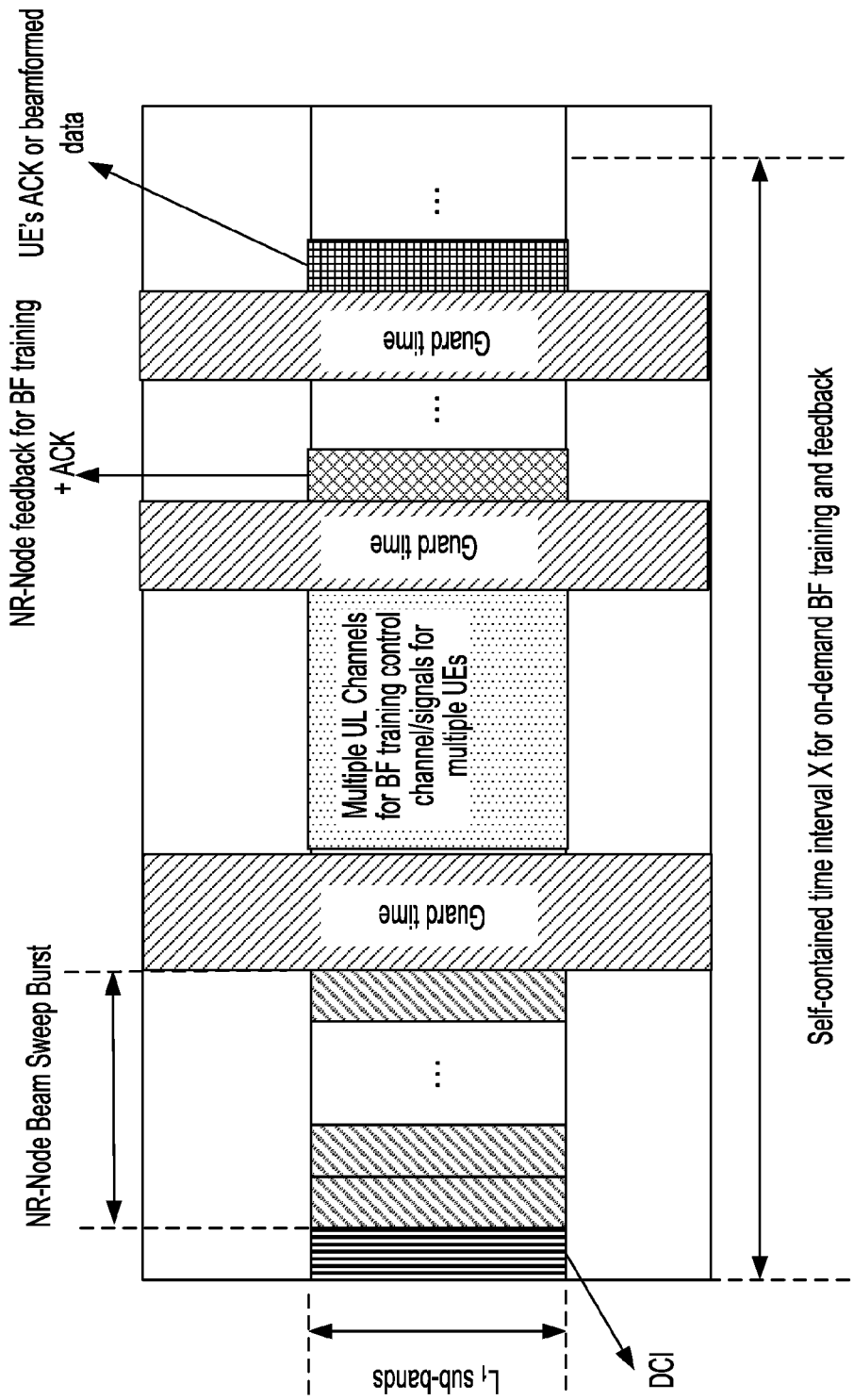
FIG. 24 illustrates an exemplary embodiment of a self-contained time interval x used for on-demand one-on-many BF training and feedback according to the application.

An exemplary self-contained time interval x used for the on-demand one-on-many BF training and feedback is shown in FIG. 24. In addition to carrying an indicator to signal that this time interval x is a one-on-one (or dedicated) BF training time interval, the DCI will carry information including the following:

(i) the NR-Node can perform BF training with one or several pre-configured group of UEs. The Group ID(s) needs to be signaled. Although the following description is for case of one group, it can be extended to the case of multiple groups. This can be signaled implicitly or explicitly.

(ii) Number of beams to sweep and IDs of those beams. Number of beams to sweep can be signaled explicitly or configured via RRC signaling (therefore not carried in this DCI), or specified to be a fixed value in the standards. Beam IDs need to be signaled explicitly in the DCI. Here, the NR-Node can choose a subset of narrow/fine beams out of all available beams in the system for all UEs in the group signaled in DCI. A special case is that the subset contains all available beams. Depending on the group forming criteria and UE's spatial locations/directions in the group, NR-Node may choose different subsets of beams to sweep.

(iii) BT-RS transmission pattern for NR-Node's BT-RS and/or UE's BT-RS. In each OFDM symbol, BT-RS for one fine/narrow beam is transmitted. Several (consecutive) symbols are used to sweep through the subset of beams to sweep. Or several beams are generated using multiple subarrays at the same time in each OFDM symbol. Alternatively, several beams are generated in a FDM manner at different sub-bands in each OFDM symbol.

(iv) The UL resources (in terms of time, frequency locations, code and etc.) for each UE in the group to transmit their beamforming training control channel/signals (such as the ID of the best Tx Beam). This is preferably to be implicitly signaled. For example, the frequency resources equals to the same frequency used by the DCI, and the number of OFDM symbols is a pre-defined function of the number of UEs in the group signaled by the DCI and the numbers of beams to sweep from the UE side. Each UE in the group may use a UE-specific resource/channel to transmit its beamforming training control channel/signal. There is a one-to-one mapping between the each UE's position within the group that performs BF training and the UE-specific resource/channel (in terms of time, frequency locations, and code sequences and etc.). Alternatively, resources locations can be explicitly signaled.

(v) The DL resources (in terms of time, frequency locations, code and etc.) location of NR-Node BF training feedback (such as the ID of the best Tx Beam)+ACK to each UE in the group. This is preferably to be implicitly signaled. For example, the index of resources used by the NR-Node to transmit BF training feedback and ACK to a particular UE is mapped to the index of resources used by UE's transmission of its BF training feedback and BT-RS in previous steps. Alternatively, resources locations can be explicitly signaled.

(vi) The UL resources (in terms of time, frequency locations, code and etc.) location of UE's transmission of its ACK to NR-Node BF training feedback received in previous step. This is preferably to be implicitly signaled. For example, the index of resources used by the UE to transmit ACK is mapped to the index of resources used by NR-Node's transmission of its BF training feedback in previous step.

Figure 25:
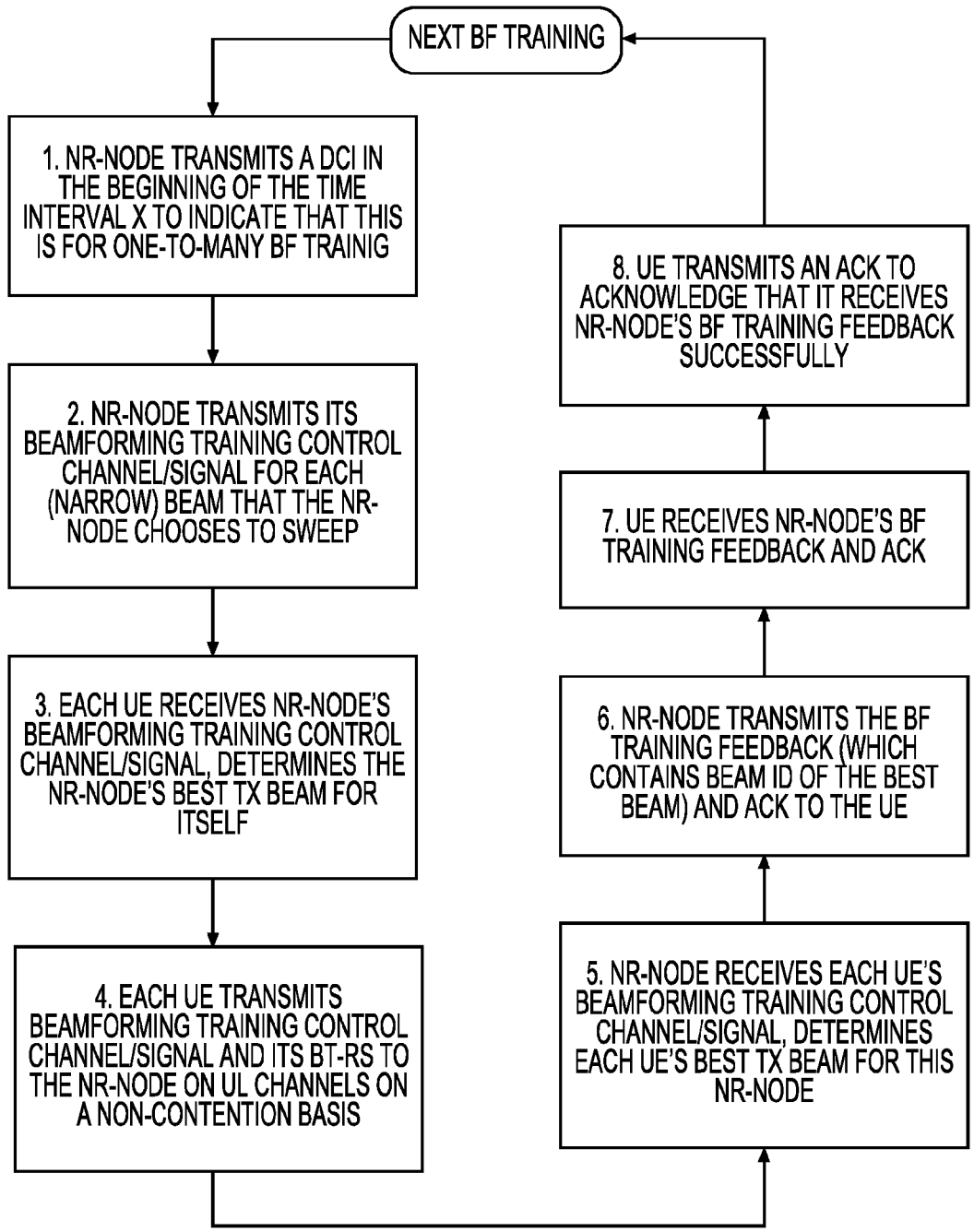
FIG. 25 illustrates an exemplary embodiment of on-demand one-to-many BF training procedures according to the application.
Figure 26:
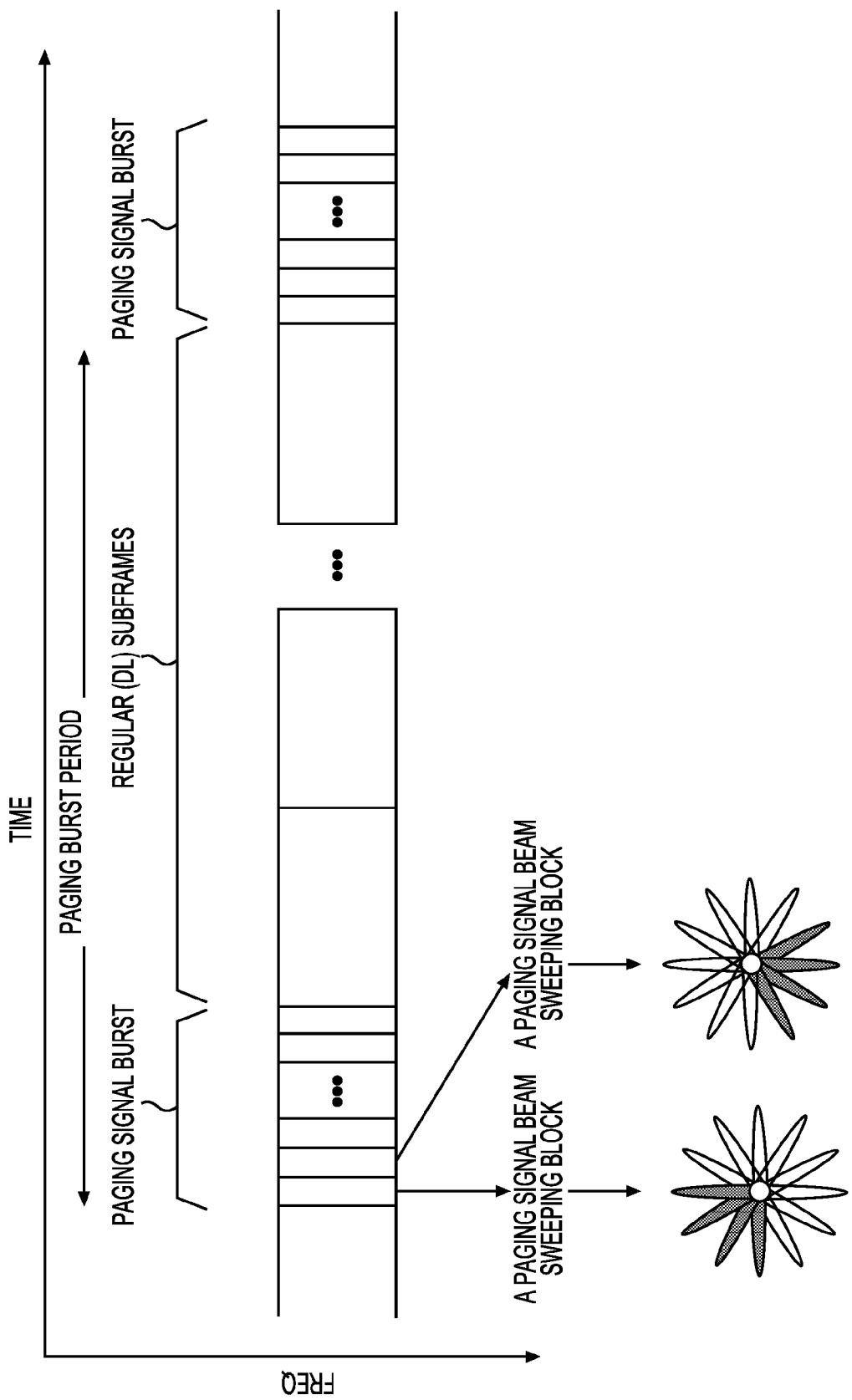
FIG. 26 shows paging block and burst in accordance with an example embodiment.

According to yet a further embodiment, the on-demand one-to-many beamforming training procedures is illustrated in FIG. 25. Each of the steps is denoted by an Arabic numeral. In step 1, the NR-Node transmits a DCI in the beginning of the time interval x to indicate that this time interval is for one-on-many BF training. In step 2, the NR-Node transmits its initiator's beamforming training control channel/signal for each (narrow) beam that the NR-Node chooses to sweep. Subsequently, each UE receives NR-Node's beamforming training control channel/signal and corresponding beam ID, determines the NR-Node's best Tx beam for itself (step 3).

In step 4, the UE transmits the responder's beamforming training control channel/signal to the NR-Node. Beamforming training control channel/signal for each UE are transmitted on UL (dedicated) channels on a non-contention basis. Next, the NR-Node receives UE's beamforming training control channel/signal, determines the UE's best Tx beam for this NR-Node (step 5).

In step 6, the NR-Node transmits the BF training feedback (which contains beam ID of the best beam) to the UE. The NR-Node may transmit an acknowledgement (ACK) to the beamforming feedback sent by the UE in step 4. The ACK can be signaled either explicitly or implicitly. One way to transmit an implicit ACK for feedback in step 4 is that the NR-Node transmits its BF training feedback to the UE using the beam whose beam ID is transmitted by the UE in step 4.

Subsequently, the UE receives NR-Node's BF training feedback and ACK for its step 4 (step 7). Further, the UE transmits an ACK to acknowledge that it receives NR-Node's BF training feedback successfully (step 8). ACK can be signaled explicitly. Alternatively, an implicit ACK is implied if the UE starts to transmit a data packet using the beam whose beam ID is transmitted by the NR-Node in step 6.

In yet another embodiment, the NR-Node will perform one-to-all BF training which allows all UEs in the active state in this NR-Node to perform BF training. The methods and procedures can be the same as solutions for periodic BF training as described above, except a format indicator in the beginning of time interval x to indicate this is a one-to-all BF training time interval. One method is to transmit this format indicator in omni-direction, which requires its transmission to be strongly coded and/or spread in time and frequency so that it has enough coding gain and spreading gain to compensate the path loss. Alternatively, this format indicator can be transmitted using Tx beamforming.

UE Initiated BF Training

According to yet another embodiment of the application, a set of beamforming training triggering criteria is described. This may include, for example, beamforming update periodicity, and SINR threshold.

Upon a triggering event, the UE will send a BF training request to the NR-Node (in a RACH-like manner). The BF training request message can be L1/L2 signalings or higher layer signalings. Upon receiving the request, the NR-Node may choose to respond within a certain time by starting its Tx beam sweeping. The NR-Node may choose to use either one-to-one or one-to-many BF training method. The detailed methods and procedures will be the same as described above.

In a further embodiment, it has been agreed that CSI-RS is supported for NR downlink. The CSI-RS's main functionalities include CSI acquisition and beam management. It has been agreed that at least the following RSs are supported for NR uplink: (i) SRS which is a reference signal with main functionalities of CSI acquisition and beam management; and (ii) FFS which performs RRM measurement.

In 3GPP meetings, the concept of a "RAN controlled state" (also referred to as an INACTIVE state) for NR has been discussed. UEs in a RAN controlled state should incur minimum signaling, minimize power consumption, and minimize resource costs in the RAN/CN, thereby making it possible to maximize the number of UEs utilizing (and benefiting from) this state. Moreover, UEs in RAN controlled state should be able to start data transfer with low delay as required by RAN requirements.

According to aspects discuss below, it will be understood the functionality may be performed or received by an NR-node, Transmission and Reception Point (TRP), or Remote Radio Head (RRH). Therefore, the NR-node, TRP and RRH may be used interchangeably in this application, without limitation, in view of the NR-node being discussed more prevalently for simplicity.

It is also envisaged in accordance with the embodiments below that a time interval containing DL and/or UL transmissions are flexible for different numerologies and RAN slices. These also may be statically or semi-statically configured. Such a time interval structure may be used for a slot or a mini-slot within a subframe. It will be understood that the mechanisms proposed for this time interval structure may be applicable to slot and/or mini-slot.

With respect to SI, as described above, the art has not addressed whether (i) all "cells"/TRPs periodically broadcast the minimum; (ii) the minimum SIs is broadcasted periodically in every cell on which a UE can camp; (iii) there are cells in the system where the UE cannot camp; (iv) whether the UE should be allowed to camp on a cell that doesn't broadcast the minimum SIs. In view of these deficiencies, the term, serving cell, is used in the application to denote one of the following: (i) the cell the UE is camped on, (ii) the cell serving the UE in a RRC INACTIVE CONNECTED state, or (iii) the cell serving the UE in RRC CONNECTED state.

It is envisaged according to this application that the system information distribution should be flexible to ensure future proofness and smooth introduction of new services and features. With beamforming, the system information transmission overhead (time/frequency resources) is N times the overhead of transmission without beamforming. The overhead of SI transmission even when only minimum SI is periodically broadcasted might still be significant for always broadcast. In addition, control plane latency including system access latency, a key KPI to consider will be much more stringent than that of the current cellular systems for many targeted use cases.

It is also envisaged herein that solutions flexible enough to scale and adapt to various deployment scenarios across many verticals targeted by the NR should be considered. Since SIs may be common across cells. The UE might not be required to re-acquire these common SIs as it moves across cells. Similarly, the network (Cells/TRPs) should have the flexibility to avoid redundant SI transmission within localized geographical areas and not be required to periodically broadcast the minimum SI. Upon mobility for initial cell selection or cell reselection, the UE determines the validity of the minimum system information previously stored through pre-configuration or acquired from previously visited cells. If the UE determines the stored minimum system information is valid, the UE may re-use the previously stored minimum system information to evaluate the newly detected cell. It can decide whether the UE is allowed to access the cell. Here, all "cells/TRPs" are not required to periodically broadcast the minimum SI. The NR system may include cells that provide system information on behalf of some other cells.

A cell broadcasting System information, e.g., minimum SIs, (may be multiple minimum SIs configuration set) or other SIs (may be multiple other SIs configuration sets) may also broadcast additional information on the applicability of the broadcasted SI. Such information may include one or more of the following:

(i) The identities of cells, or TRPs, or geographical area composed of multiple cells e.g. SIB validity area or SIB validity zone. The UE may use the received identities to identify the cells where the received SIs for e.g., minimum SIs apply. Furthermore the UE may use the received identity might not be cell identity or TRP identity. In such case, the UE may use the received identity to derive or retrieve the identity of the cells to which the received SIs (minimum SI or other SI) applies.

(ii) The frequencies/frequency bands to which the broadcasted SIs applies. For e.g., the UE may use this information to determine whether or not the received/stored system information applies to cells detected on a given frequency layer. The cell may also provide an indication together with the frequency/band information that excludes certain cells from a frequency layer to which a system information applies. Such indication may be for e.g. cell Physical Cell Identity (PCI).

(iii) The validity time/period of the system information. With this parameter, a cell broadcasting system information (e.g. minimum SI), may indicates the duration of the validity of the system information and/or the time period of the day where the system information applies. Furthermore, the cell may provide the time/period information at the granularity level of cell, TRP or frequency where the system information applies. Alternatively, the cell may provide the validity time/period information globally i.e. applicable to all cells and/or frequencies/bands where the system information applies.

According to the aspect of Mobility Measurement, in the idle mode, the UE may monitor the DL initial access such as NR-PSS and NR-SSS. The DL initial access burst may have a different transmission period T depending on frequency bands (range) and/or numerology. In addition, the number of blocks per burst is also dependent on frequency band and/or numerology. For example, if a NR system is under <6 GHz, a burst may only contain a single block and the initial access burst can be placed at a specific numerology. The transmission of initial access burst T=10 ms. Another example, a NR is operated at 30-40 GHz, a burst may contain 16 blocks. The transmission of initial access burst T=5 ms in this case. The BTRS can support the mobility for either in idle mode (if it is available) or at the connection mode. The BTRS transmission period can be set to be same or different as the initial access burst.

In one embodiment with respect to Paging Signal Design in the Idle Mode, a paging beam sweeping block can be treated as a unit of beam sweeping time unit for paging channel during the idle mode. Each paging block may consist of at least one or more CP-OFDM symbols. Multiple blocks can form a paging beam sweeping burst. Here, the length of a sweeping burst refers to the number of paging beam sweeping blocks in a burst. For example, if a paging beam sweeping burst length is equal to M then there are M sweeping blocks in a burst.

An example of a paging sweeping burst and block is depicted in FIG. 8. The paging beam sweeping burst may be periodically transmitted with a periodical time T. This periodic T may be varied with different applications such as URLLC, mMTC or eMBB services or with different frequency bands (or frequency ranges) and numerology. Each paging beam sweeping block can be associated with single beam or multiple beams. The UE in the idle mode can monitor the paging beam sweeping burst to monitor the paging signal. The paging channel may support transmit diversity such as SFBC. The demodulation reference signal for paging channel for transmit diversity can be assumed as QCL.

Another aspect is directed to RS Configuration for CSI Acquisition and Beam Management. If CSI-RS or SRS is fully configurable for at least DL or UL CSI acquisition and beam management, a UE may need to be aware of the CSI-RS and SRS configurations. This ensures it can efficiently use the CSI-RS and SRS for either CSI acquisition or beam management functions. Techniques are discussed herein to design CSI-RS and SRS architectures related to signaling, i.e., indication, in NR systems. The techniques proposed herein may be applicable to CSI-RS for DL as well as SRS for UL.

In NR systems, there are many factors contributing to CSI-RS and SRS configurations. Some factors include, for example:

(i) Function: CSI-RS and SRS may be configured for different functions, such as for example and without limitation: (a) beam management, e.g., beam detection and selection, beam pairing, beam alignment, beam switching, etc., with the measurement such as Reference Signal Received Power (RSRP) measurement; (b) CSI acquisition, such as beam based CSI measurements to determine analog and/or digital beams, port-based CSI measurements to determine the precoder for digital beams, and/or Channel Quality Indicator (CQI) measurements for data transmission on a selected analog and/or digital beam; and/or (c) RRM measurements, such as RSRP, Reference Signal Received Quality (RSRQ), carrier Received Signal Strength Indicator (RSSI) and/or CQI etc., for radio link adaptation, mobility management, and other functions in RAN or core network.

(ii) Scope: CSI-RS and SRS may be configured for different scopes for different usages, such as for example: (i) Cell, TRP or beam specific to all UEs; and (ii) UE specific to a UE or a group of UEs.

(iii) Allocation: CSI-RS and SRS may be allocated differently in frequency and time for different functions and usages. In frequency, CSI-RS and SRS may be configured across the full band/subband. Alternatively, it may be configured partially in a band/subband. CSI-RS and SRS may also be configured at the center of the band/subband. Alternatively, CSI-RS and SRS may be preconfigured or signaled at a location within a band/subband for partial band scenario.

With regard to CSI-RS and SRS allocation in time, it may be configured with periodic, semi-persistent, or aperiodic (e.g., triggered) transmissions. CSI-RS and SRS may also be configured as either being RAN initiated or UE requested. This may be further configured to include either implicit or explicit signaling for the CSI-RS transmissions.

Figure 27:
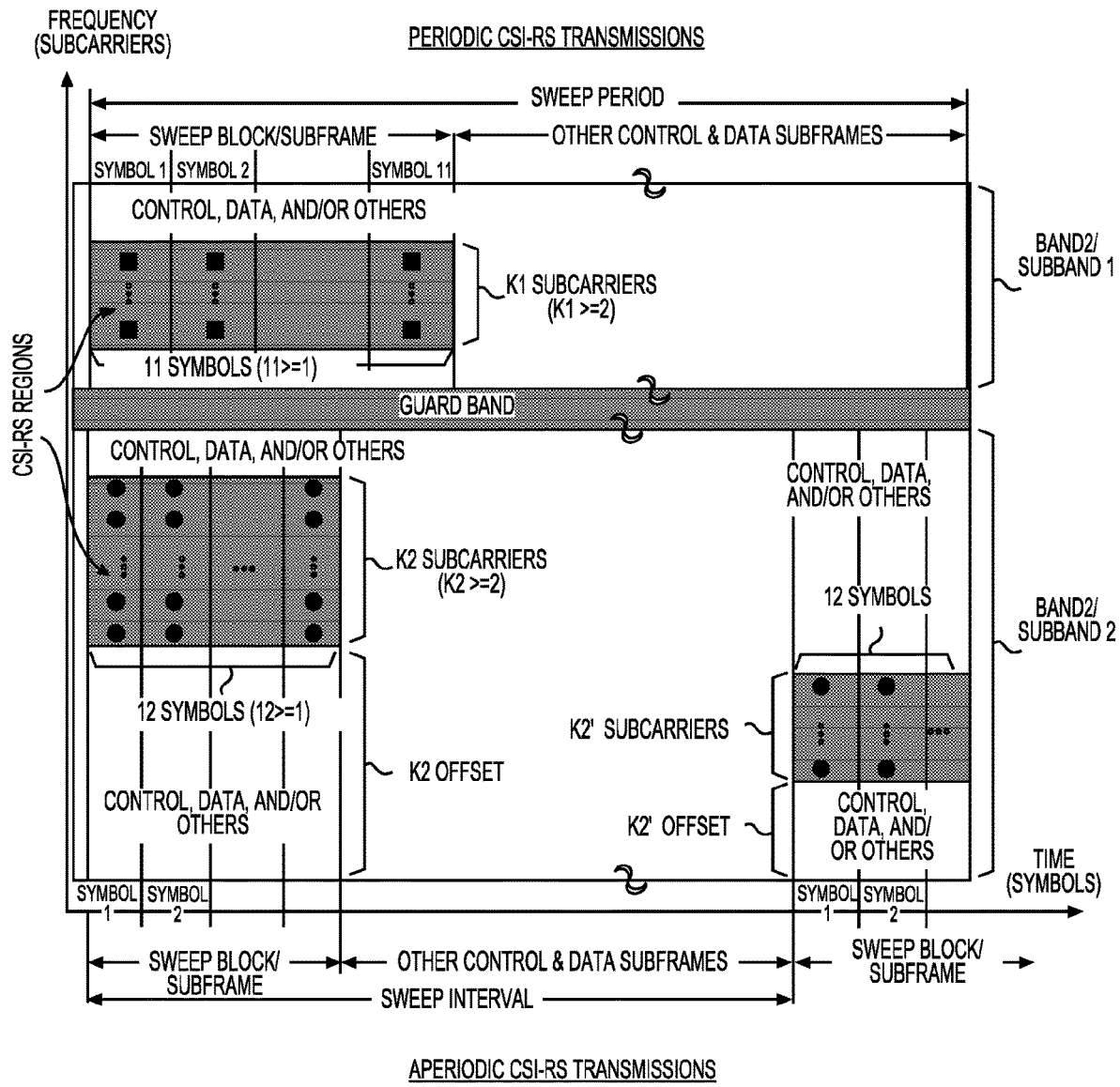
FIG. 27 depicts example allocations of CSI-RS for beam management.

(iv) Structure: CSI-RS and SRS may be configured with different structures, i.e., patterns, and different granularities in frequency and time for different functions, scenarios, numerologies, etc. As shown in FIG. 27 as an exemplary illustration, if CSI-RS is configured for beam management, it may be configured with periodic transmissions centered in band1/subband 1. Alternatively, it may be configured with aperiodic transmissions with different configurations as illustrated in band2/subband 2. In the latter case, the CSI-RS may be distributed continuously or discontinuously (e.g., interleaved with other control elements such as DCI and/or UCI, or even data) over k1 sub-carriers as in band 1/subband 1 or over k2/k2' sub-carriers in band2/subband 2, respectively. In some instances, a CSI-RS region may be located at the center of a band/subband as shown in FIG. 9, and may also be located at a certain frequency location that is preconfigured, broadcasted, or dynamically signaled to UEs, for example using the frequency offset illustrated as "k2offset" or "k2' offset" in FIG. 27.

Figure 28:
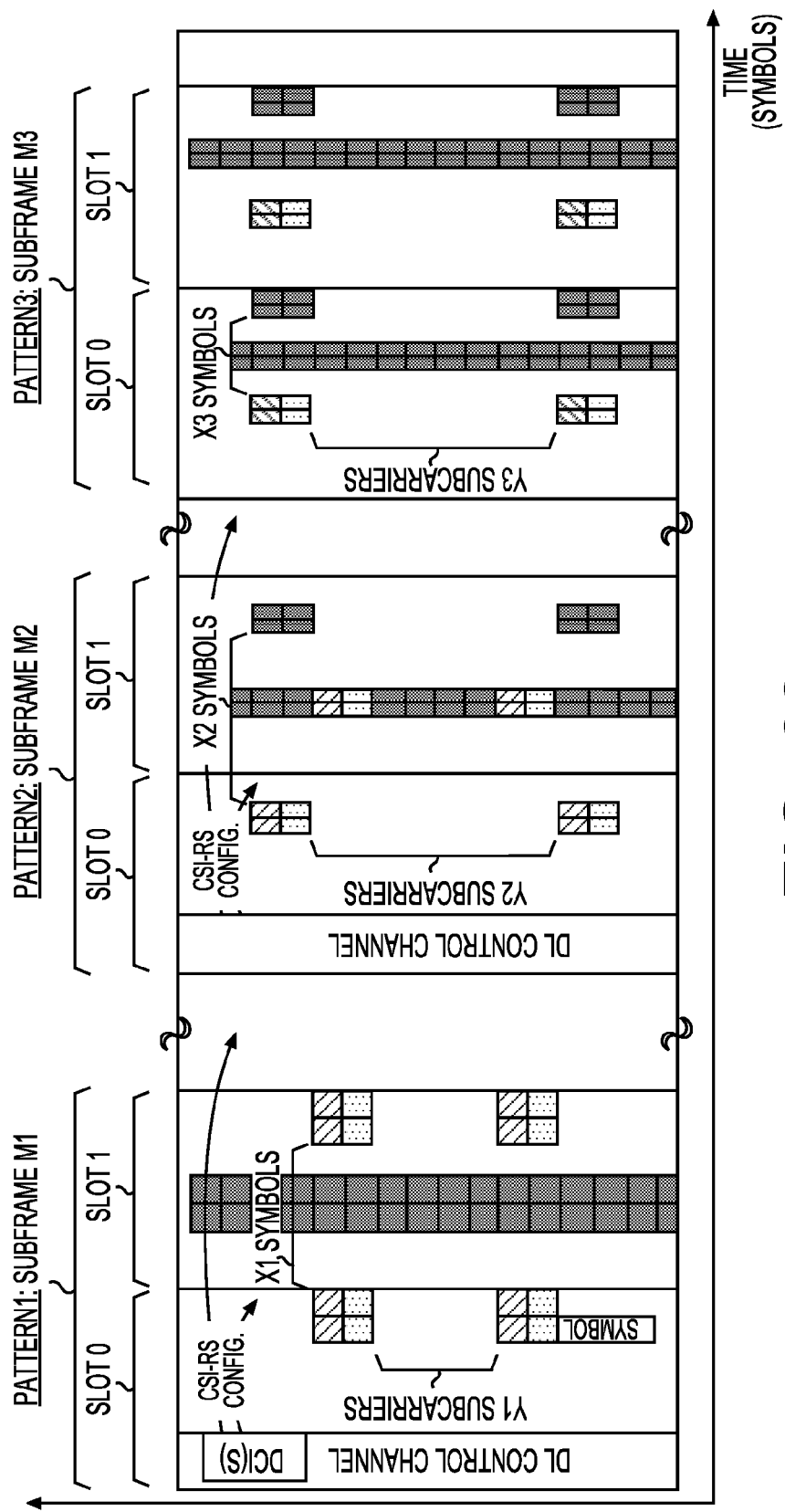
FIG. 28 depicts example patterns of CSI-RS for CSI acquisition in accordance with an example embodiment.

As shown in FIG. 28 as an exemplary illustration, when CSI-RS is configured for CSI acquisition it may be configured with periodic or aperiodic transmission with different configurations. The CSI-RS may be distributed, for example, as illustrated in Patterns 1, 2, or 3 of FIG. 28. According to this embodiment, the CSI RS patterns may be configured based on the following:

(i) numerology, e.g., the number of subcarriers and/or symbols and/or different patterns as illustrated in FIG. 28;

(ii) service, e.g., different patterns for URLLC or eMBB;

(iii) mobility, e.g., different granularity in frequency and/or time; and (iv) cooperation among the cells/TRPs/Beams, e.g., for interference management and/or co-operated transmitting and/or receiving.

In FIG. 28, dynamic signaling for CSI-RS configurations is shown via the DL control channel DCI(s). The DCI(s) may indicate CSI-RS and/or SRS configurations periodically, semi-persistently, or aperiodically, e.g., initiated by NR-node/TRP/Beam, or requested by a UE. An example of a CSI-RS and SRS configuration mapping is listed in Table 3 below, where the configurations specified by an individual parameter or a group of parameters or an index number of all the combinations of supported parameter values.

TABLE 3

| Transmission Mode | UE Specific | Frequency | Time | Pattern |
| --- | --- | --- | --- | --- |
| 0: beam management 1: CSI acquisition | 0: non-UE specific 1: UE specific | 0_0000: centered at the band/subband 1_xxxx: not centered with offset "xxxx". If first bit indicated with "1", needs to specify the offset "xxxx" (e.g., either the offset value or the index of offset positions) in frequency | 00: Aperiodic, network initiated 01: Aperiodic, UE requested 10: semi-persistent 11: periodic | yyyyyyyy: all CSI-RS or SRS patterns for a given transmission mode, scope, allocation in frequency and time, numerology (e.g,. granularities in frequency and time), service, etc. |

As discussed above, the CSI-RS and SRS configurations may need to be indicated to a UE. By so doing, the UE can conduct either beamforming or CSI acquisition. The CSI-RS and SRS configuration parameters in Table 3 above may be indicated to a UE in the following exemplary methods:

(i) Preconfigured on a UE, e.g., by the device manufacturer, the service provider, a system administrator, and/or the user;

(ii) Broadcasted to a UE or UEs, e.g., via the System Information (SI) message;

(iii) Signaled by the higher layer to a UE or UEs, e.g., RRC message or MAC CE; and/or (iv) Signaled by the DL control channel, e.g., DCI(s).

Figure 29:
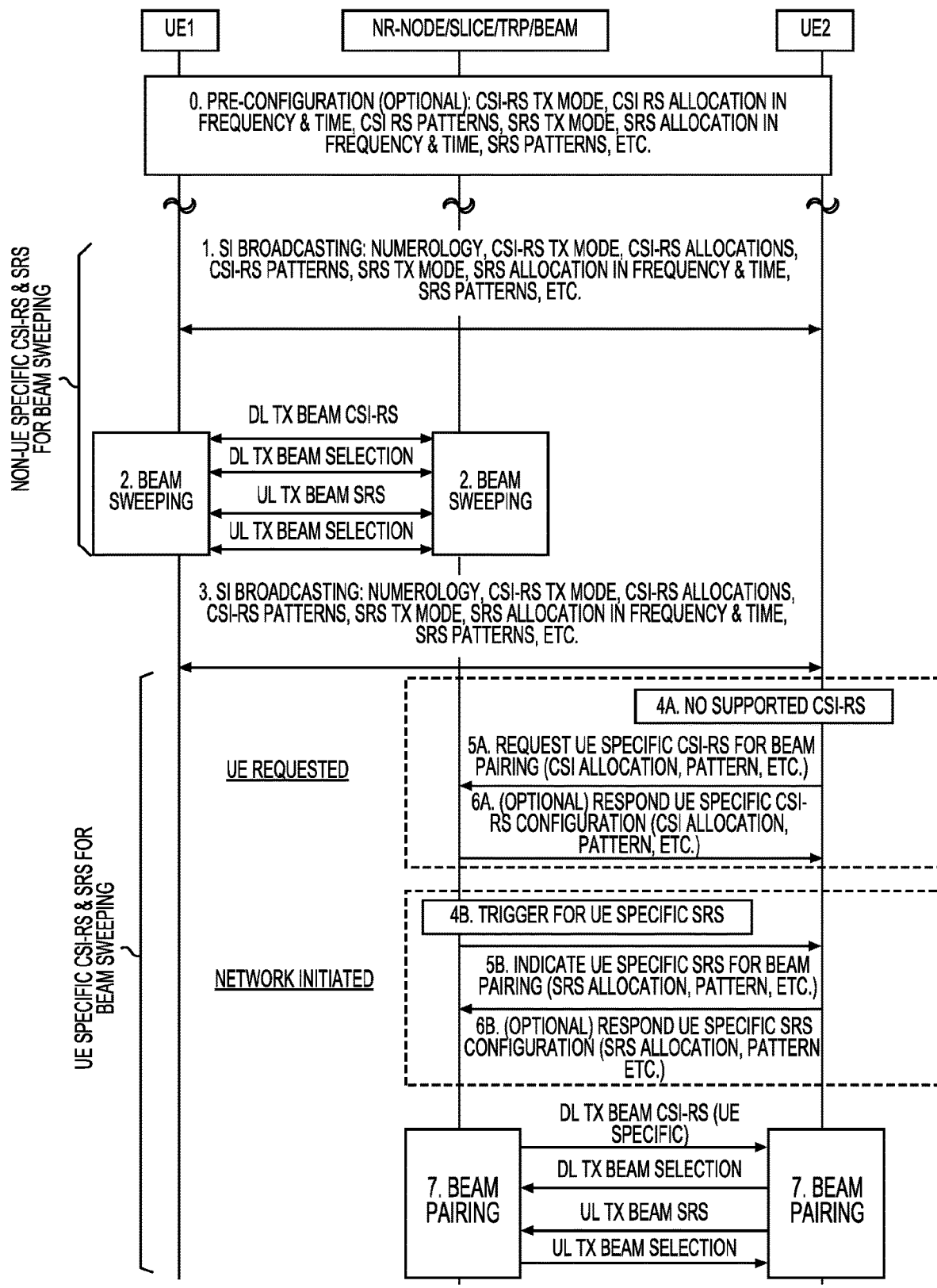
FIG. 29 is a call flow for CSI-RS and SRS configuration signaling for beam management, in accordance with an example embodiment.

An exemplary call flow is depicted in FIG. 29 illustrating how CSI-RS and SRS configurations, i.e., CSI-RS transmission mode=0 and SRS transmission mode=0, are statically/semi-statically/dynamically indicated or signaled to UEs for beam management. In accordance with the illustrated example in FIG. 29, steps 1 and 2 show a non-UE specific CSI-RS and SRS configuration, i.e., UE Specific=0, broadcasted to the UEs (i.e. UE1 and UE2), and UE1 conducts the DL beam selection procedure with the NR-node/TRP/Beam based on the CSI-RS and SRS configurations for beam training.

Steps 3 to 7 describe a UE specific CSI-RS or SRS configuration, i.e., UE Specific=1, unicasted to UE2 for the DL or UL beam pairing between UE2 and the NR-node/TRP/Beam. The UE requested UE-specific CSI-RS configuration indication is shown in steps 4A to 6A. Meanwhile, the NR-node/TRP/Beam initiated, UE-specific SRS configuration indication is illustrated in steps 4B to 6B. The UE-specific CSI-RS and SRS configuration parameters may be signaled via a RRC message or MAC CE, or the DL control channel DCI(s) as exampled herein. UE specific CSI-RS and SRS configurations may also be preconfigured as shown at step 0. They may also be statically configured and broadcasted to UE(s) as shown at step 1 or 3.

Figure 30:
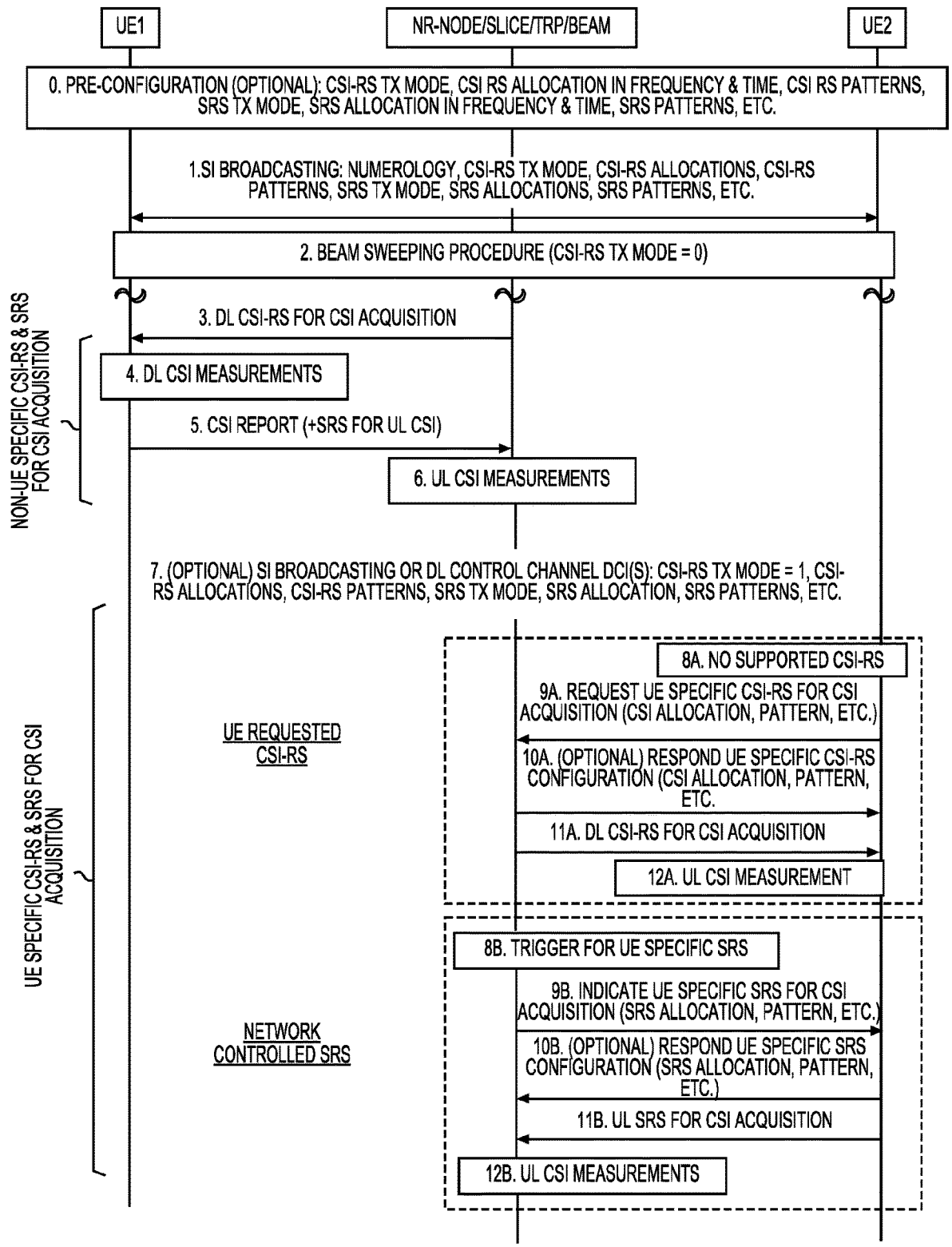
FIG. 30 is a call flow for CSI-RS configuration signaling for CSI acquisition in accordance with an example embodiment.

An exemplary call flow as shown in FIG. 30 illustrates how CSI-RS and SRS configurations, i.e. CSI-RS transmission mode=1 and SRS transmission mode=1, can be statically/semi-statically/dynamically indicated or signaled to UE(s) for beam management. Steps 1 to 6 in FIG. 30 show a non-UE specific CSI-RS and SRS configuration. Here UE Specific=0 provided above in Table 3. UE1 conducts the DL CSI measurement procedure based on the statically or semi-statically indicated CSI-RS configuration for CSI acquisition. The NR-node/TRP/Beam conducts the UL CSI measurement procedure based on the UL SRS sent from UE1. The SRS is transmitted with the CSI report without losing the generality that SRS may be transmitted to stand alone or together with other UL control or data.

In accordance with the illustrated example, steps 8 to 12 of FIG. 30 show UE specific CSI-RS and SRS configuration for DL and UL CSI acquisition between UE2 and the NR-node/TRP/Beam. Here, UE Specific=1 as provided in Table 3. The UE requested UE-specific CSI-RS configuration indication is shown in steps 8A to 12A of FIG. 30, and NR-node/TRP/Beam controlled UE specific SRS configuration indication is illustrated in steps 8B to 12B. The UE-specific CSI-RS and SRS configuration parameters in Table 3 may be signaled via a RRC message or MAC CE, or alternatively, via the DL control channel DCI(s). It is shown that UE-specific CSI-RS and SRS configurations may also be preconfigured as shown at step 0, as well as being statically configured and broadcasted to the UE(s) as shown at step 1 or 3.

For UL-based mobility, the network may configure a UE with UL resources within a configured area/zone. This may occur where the UE performs regular UL tracking signal transmission. The UL tracking signal can be transmitted periodically, where the periodicity is configurable.

In yet even another embodiment, the UL tracking signal may be transmitted on-demand. The transmission may be pursuant to a request by the network or event triggered. The UL tracking signal is used by the network to determine UE's position, e.g., cell/TRP/beam level. The network subsequently uses the determined UE position to send the paging message for a given UE only in the identified area, e.g., cell/TRP/beam, where it previously received the UL tracking signal. The paging message can be transmitted in the DRX/eDRX occasion of the UE. Alternatively it can be directly sent after an UL tracking signal transmission along with a short network acknowledgement/feedback.

NR UEs in the new state may be closely tracked by the network. This is to ensure the network knows which one or multiple TRPs is the most suitable choice to communicate with the UE. Close tracking in this manner has various benefits. For example, it lets the network decide the best suitable TRPs for sending future paging messages. Moreover, suitable TRPs can perform beam refinement/tracking so as to transmit future DL data via the best TX beams. This leads to a high signal to noise ratio (SNR) and also low delays of DL data transfer. Another benefit includes the serving TRP maintaining UL time alignment. In the case of an INACTIVE UE, it will transfer UL short data packets within the state.

With regard to UL signal design, UL tracking signal resources can be uniquely allocated per UE or shared by a group of UEs within a configured area/zone. In the case of unique radio resources, e.g., time, frequency, beam, orthogonal code, a UE can be implicitly identified by the network instead of explicitly sending an identifier. For a narrow band signal that does not carry any upper layer data, e.g., a reference signal carrying a signature sequence, the transmission can be very powerful and efficient. It is understood this allocation method of unique radio resources for each UE may not scale well when a large number of UEs are in this state as the resources for UL data transmissions are limited.

In accordance with a further embodiment, UL tracking signal resources shared by a group of UEs may mitigate the resource shortage problem. However it may result in the network having to send multiple notification messages to different cells/TRPs, since the network may not have accurate position information of a UE. To solve this problem, a UE may send the UL tracking signal by including a UE specific tracking ID unique within a configured area/zone.

However, UL signal transmission may still face various issues. For example, there may be an issue due to transmission collisions. When multiple UEs sharing the same radio resources send the UL tracking signals at the same time, collisions may happen. The collision problem may be mitigated or solved by using some PHY technologies, i.e., orthogonal codes. The problem may persist if too many UEs transmit UL tracking signals at the same time.

Another issue for UL signal transmission may be based on scalability. The UE-specific tracking ID carried in each UL tracking signal should be unique within a configured area/zone. It is understood the range of the tracking ID may need to be considered, especially when the target for connection density in NR should be 1000000 device/km2 in an urban environment.

Another issue for UL signal transmission relates to reconfiguration. When a UE moves to the edge of a configured area/zone, TRPs in the range of the UE may belong to different area/zones. In this case, while TRPs receive the UL tracking signals, they cannot decode (e.g., not tightly synchronized) or recognize (e.g., UE specific tracking ID is only unique in one area/zone) it. Therefore, reconfiguration of the UE UL tracking signal may be needed.

A hybrid version may be considered in view of these drawbacks. Specifically, where a configurable set of UEs within a configured area/zone share specific radio resources, UEs from different areas/zones may use different radio resources. As the UE density within a configured area/zone gradually increases, the network may reduce the size of each UE set by UE reconfigurations. It is understood that different areas/zones may overlap geographically, and two UEs close to each other may actually belong to a different area/zone in some cases. In this way, UEs from the same configured area/zone may sparsely be distributed and transmission collisions may be avoided.

Figure 31:
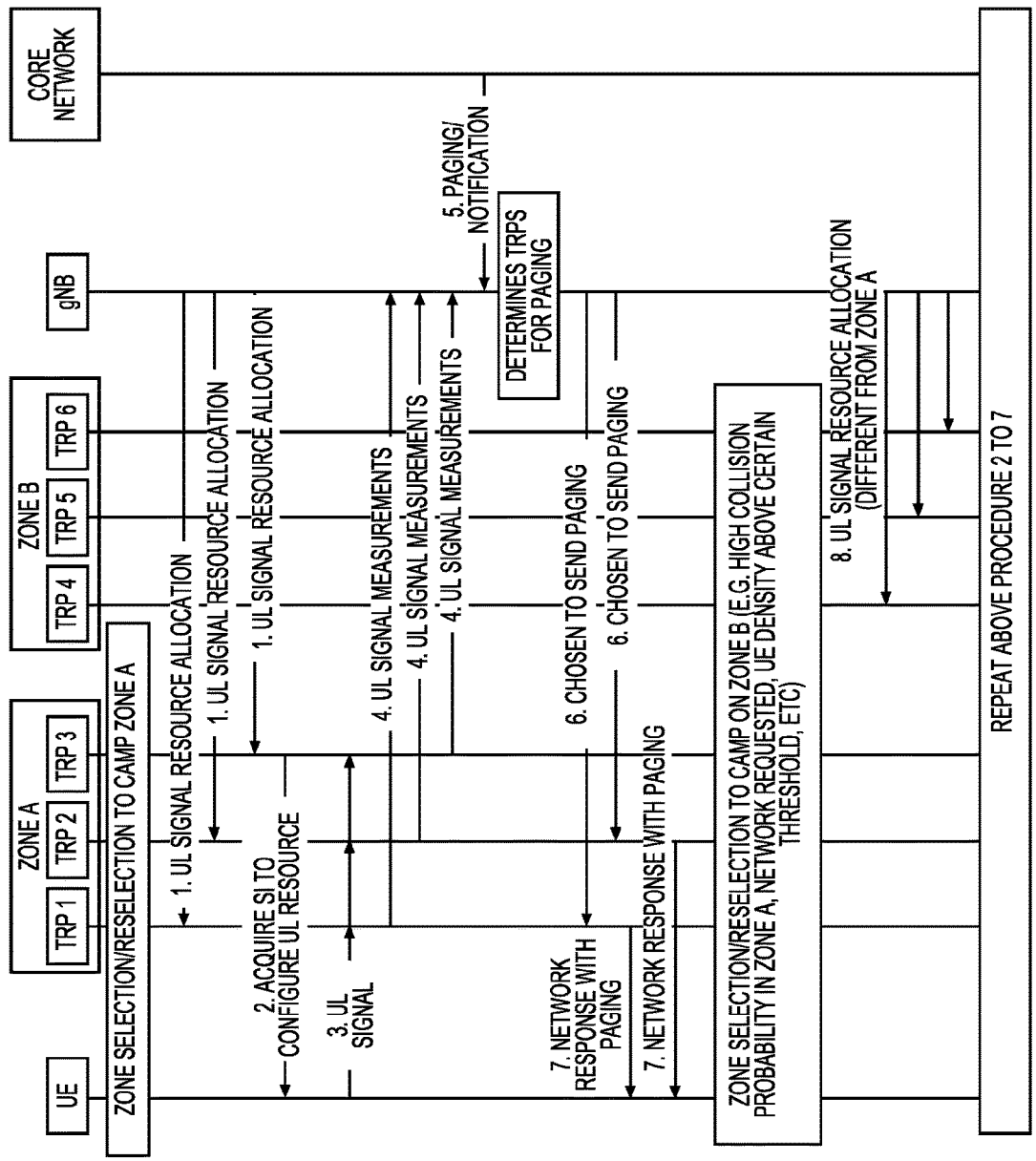
FIG. 31 is a call flow for hybrid uplink (UL) signal resource allocation and corresponding network paging in accordance with an example embodiment.

In an exemplary embodiment as shown in FIG. 31, hybrid UL signal resource allocation and corresponding network paging are described. Each of the steps in FIG. 31 is denoted by an Arabic numeral. In step 0, the UE is already configured to be in Zone A due to a previous Zone selection/reselection process. Next, the gNB allocates a Zone specific UL signal resource to all the TRPs (TRP1, TRP 2 and TRP 3) in Zone A (step 1). In step 2, the UE acquires system information (Minimum SI or Other SI) to configure its UL signal resources (e.g. time, frequency, beam, orthogonal code, etc.). Thereafter, the UE sends its UL signal to the nodes/TRPs in Zone A (step 3).

In step 4, all TRPs in Zone A receive the UL signal and send measured results to gNB. In step 5, the Core Network has available data for the UE and sends a paging message to UE. Once the paging message is received by gNB, gNB analyzes history measurement results and determines the suitable TRPs in order to forward the paging message. Then, the gNB forwards the paging message to chosen TRPs (step 6)

The selected TRPs send network feedback to UE as response to previous received UL signal. Due to various reasons, the UE is configured to be in Zone B (step 7). The reasons may include, without limitation, that the UE moves to another position, or there is a high collision probability in Zone A, or the network/operators request the change of zone due to network reconfigurations/deployments, or the UE itself detects that too many UEs are in the Zone A. The detection may result in a determination whether the number of UEs exceeds a predetermined value. In some cases, there may be some geographical overlapping between Zone A and Zone B.

In step 8, switching from Zone A to Zone B causes UE using different UL signal radio resources. So gNB allocates different radio resources for Zone B and information of the detailed allocation is sent to all TRPs (TRP4, TRP 5 and TRP 6) in Zone B. Further, steps 2 through 7 may be repeated as time progresses.

According to another embodiment directed to RAN Notifications, a NR RAN may be partitioned into RAN Notification Areas (RNA) or zones. These are envisioned to be composed of multiple TRPs from one or more NR cells. For NR, a set of beams transmitted by TRPs in an NR cell/cells are used to define a zone. The UEs in in the new RAN-controlled state, e.g., RRC_INACTIVE, may be configured with a set of beam IDs that correspond to a zone; e.g. an NR-Mobility set.

The UEs in RRC_INACTIVE transmit UL tracking signals that may be measured by the TRP/gNB. In turn, these are used to track the location of the UE. How often a UE transmits UL tracking signals may be dependent on a number of factors including, for example, the device type/service, the speed/mobility state, the UE's location within the zone, etc. The UL tracking signal configuration may be zone dependent. In one embodiment, the UL tracking signals may be based on a small data transmission that is piggybacked with the random access preamble, where the data transmission is used to signal the UE identity. Alternatively, the UE may be configured with dedicated time/frequency resources that may be used to transmit the UL tracking signal.

The network may use these UL measurements to track the UE within a zone and determine when a UE is moving from one zone to another. When moving between zones, in an example, the network reconfigures the UE with a new NR-Mobility set that corresponds to the beams of the new zone. The network may also reconfigure the UE with a new UL tracking signal configuration that will be used in the new zone.

When a UE in RRC_INACTIVE needs to be paged, the RAN may send the paging message using the set of beams in the NR-Mobility set. Alternatively, if the network is tracking the UE more precisely, then the network may first page the UE using a subset of beams in the NR-Mobility set; and if a response is not received, the UE may then be paged using the full set of beams in the NR-Mobility set.

Figure 32:
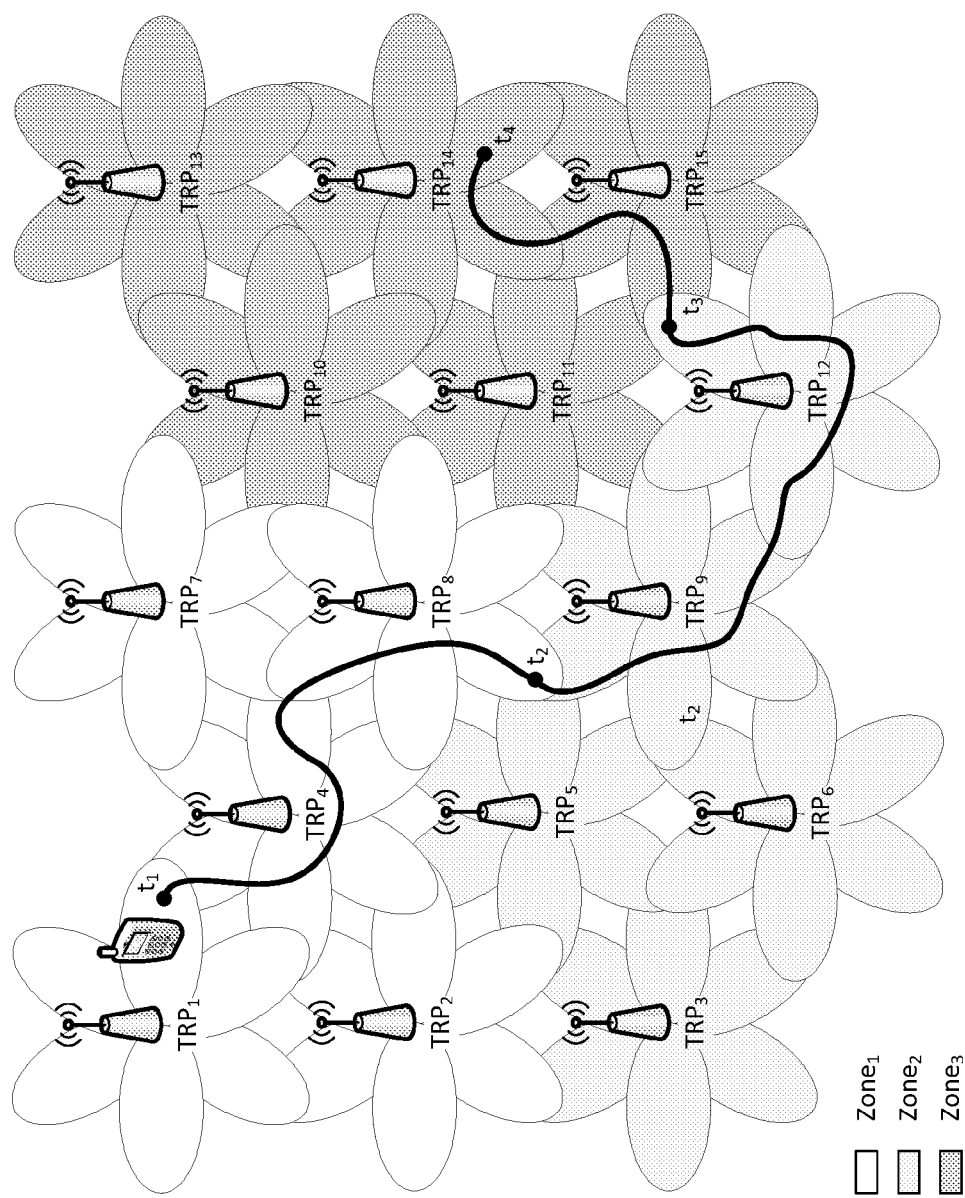
FIG. 32 is a diagram that shows an example new radio (NR) network with multiple tracking zones.
Figure 33:
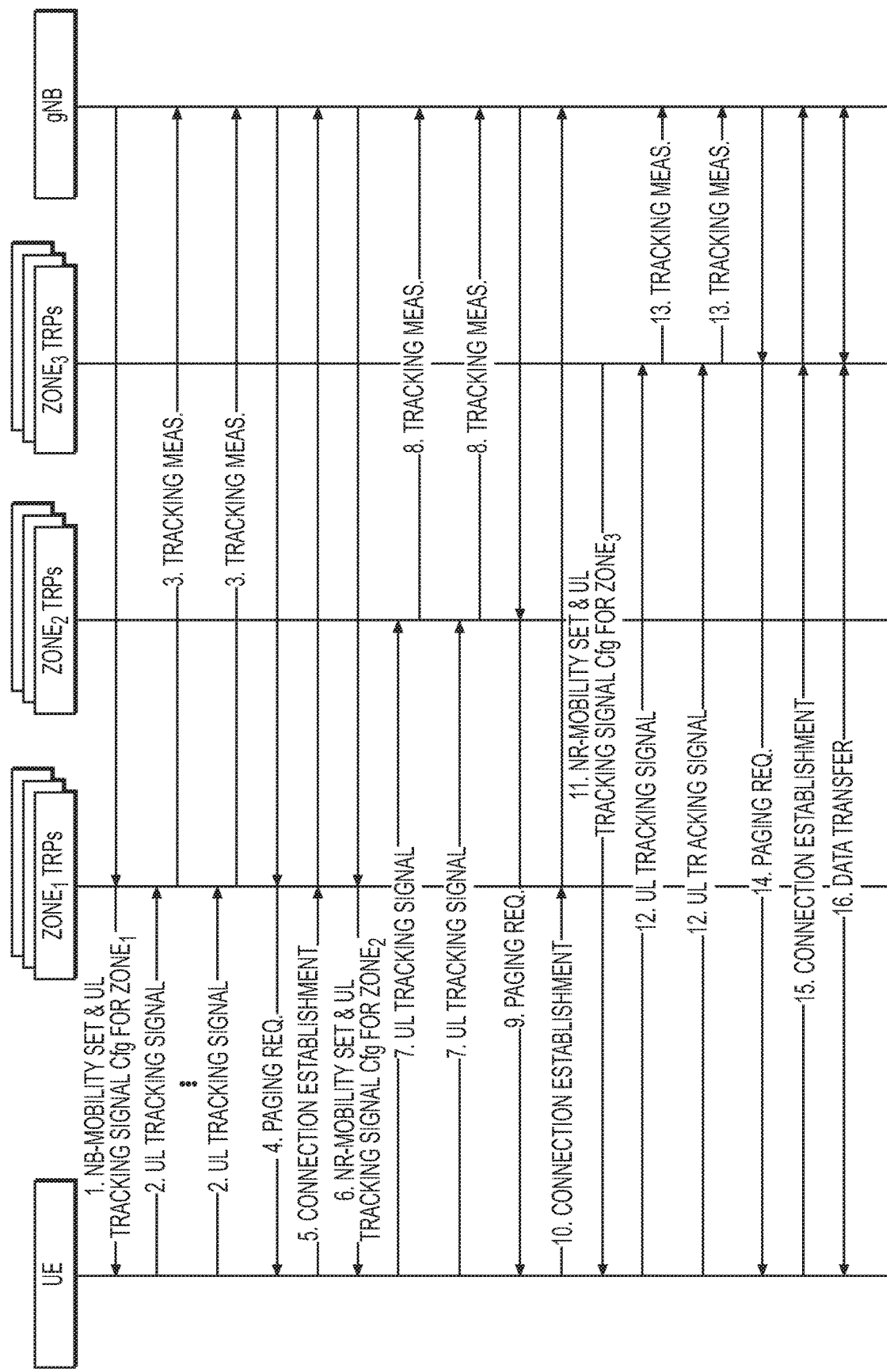
FIG. 33 is an example signaling diagram that shows the signaling between the UE and the network as the UE moves along the path shown in FIG. 32.

FIG. 32 shows an exemplary network deployment with three zones. It will be understood that any number of zones may be implemented as desired. Each zone corresponds to a set of tightly synchronized TRPs. FIG. 32 also shows an exemplary path that the UE may take over time. The points on the path labeled as 'tn' show the location of the UE at a given time. For example, as shown:

At time t1, the UE is deep in Zone1;
At time t2, the UE is at the boundary between Zone1 and Zone2;
At time t3, the UE is at the boundary between Zone2 and Zone3;
At time t4, the UE is deep in Zone3.

In yet a further embodiment, the following steps shown in FIG. 15 may be performed. Each step is denoted by an Arabic numeral. In step 1, the UE is configured with an NR-Mobility Set and UL tracking configuration for Zone1. The NR-Mobility Set and UL tracking configuration may be signaled as IEs in the RRCRonnectionReconfiguration message, the RRCConnectionSuspend message or any other message that is used for controlling the connection between the UE and RAN.

Next, the UE transmits UL tracking signals that are received by one or more TRPs in Zone1. The UE may transmit UL tracking signals periodically. Alternatively, event-based triggering may be used where the events may be based on criterion signaled to the UE from the network. In one embodiment, the UE may be configured to commence transmission of UL tracking signals or transmit the UL tracking signals more frequently when the measurements associated with the beams in the NR-Mobility set are below a threshold. The UE speed may also be considered as part of the criteria evaluated to determine if UL tracking signals should be transmitted, and if so, at what rate.

The device type/service may also be used to control the transmission of the UL tracking signals. For example, fixed low power mMTC devices may not be required to transit UL tracking signals at all or may transmit them very infrequently. UR/LL devices may be configured to transmit UL tracking signals very frequently to enable precise tracking of the UE by the network to ensure a high success rate when paging the UE.

Subsequently in step 3, TRPs in Zone1 report tracking measurements for the UE to the gNB. The gNB then determines that the UE is moving from Zone1 to Zone2 and pages the UE so it can reconfigure the UE for Zone2. In some cases, if the network is tracking the UE at the zone level, the gNB may send the paging message using the full set of beams in the NR-Mobility set (step 4). Alternatively, if the network is tracking the UE more precisely, then the gNB may first page the UE using a subset of beams in the NR-Mobility set; and if a response is not received, the UE may then be paged using the full set of beams in the NR-Mobility set.

The UE then establishes/resumes a connection in response to the page (step 6). The UE may transmit the RRCConnectionEstablishment, the RRCConnectionResume message or any other message that may be used to establish/resume the connection between the UE and the RAN. In step 6, the gNB reconfigures the UE with an NR-Mobility Set and UL Tracking configuration for Zone2. The NR-Mobility Set and UL tracking configuration may be signaled to the UE as described above. In step 7, the UE transmits an UL tracking signal which is received by one or more TRPs in Zone2. The transmission of the UL tracking signals may be controlled as described in step 2.

Thereafter, the TRPs in Zone2 report tracking measurements for the UE to the gNB (step 8). In step 7, the gNB determines the UE is moving from Zone2 to Zone3 and pages the UE so it can reconfigure the UE for Zone3. The gNB may page the UE as described in step 4. Next, the UE establishes/resumes a connection in response to the page. The UE may establish/resume the connection as described in step 5.

In step 11, the gNB reconfigures the UE with a NR-Mobility Set and UL Tracking configuration for Zone3. The NR-Mobility Set and UL tracking configuration may be signaled to the UE as described in step 1. Next, in step 12, the UE transmits an UL tracking signal which is received by one or more TRPs in Zone3. The transmission of the UL tracking signals may be controlled as described in step 2. Subsequently, the TRPs in Zone3 report tracking measurements for the UE to the gNB (step 13). The gNB then pages UE in Zone2 to establish a Mobile Terminated (MT) call. The gNB may page the UE as described in step 4 (step 14). The UE establishes/resumes a connection in response to the page (step 15) The UE may establish/resume the connection as described in step 5. Finally, data is transferred between the UE and gNB (step 16)

According to the present application, it is understood that any or all of the systems, methods and processes described herein may be embodied in the form of computer executable instructions, e.g., program code, stored on a computer-readable storage medium which instructions, when executed by a machine, such as a computer, server, M2M terminal device, M2M gateway device, transit device or the like, perform and/or implement the systems, methods and processes described herein. Specifically, any of the steps, operations or functions described above may be implemented in the form of such computer executable instructions. Computer readable storage media includes volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

According to yet another aspect of the application, a non-transitory computer-readable or executable storage medium for storing computer-readable or executable instructions is disclosed. The medium may include one or more computer-executable instructions such as disclosed above in the plural call flows according to FIGS. 10, 12, 14, 17, 23, 25, 29-31 and 33. The computer executable instructions may be stored in a memory and executed by a processor disclosed above in FIGS. 1C and 1F, and employed in devices including a node such as for example, a base station and end-user equipment. In particular, the UE as shown for example in FIGS. 1B and 1E is configured to perform the instructions of active beamforming training during an interval in the network including: (i) receiving, from a new radio node, a beamforming training signal and beam identification for each of plural beams during the interval; (ii) determining an optimal transmission beam of the new radio node based on the beamforming training signals of the plural beams; (iii) transmitting, to the new radio node, a signal including a beam identification of the optimal transmission beam and an identification of the apparatus during the interval; and (iv) receiving, from the new radio node, an optimal transmission beam for the apparatus including a beam identification based upon a determination from the new radio during the interval.

In another aspect of the application, an apparatus includes a processor having instructions stored thereon for uplink signal resource allocation in new radio including: (i) receiving, from a zone on the network, system information including an uplink signal resource allocation of plural nodes in the zone; (ii) configuring an uplink signal based on the received system information; (iii) sending the configured uplink signal to the plural nodes in the zone; and (iv) receiving, from one or more of the plural nodes selected by a router on the network, a paging message including network feedback.

In yet another aspect of the application, an apparatus includes a processor having instructions stored thereon for reference signal configuration in new radio including: (i) determining, at the apparatus, an absence of a supported configuration of a channel state information reference signal for user equipment; (ii) sending, to a new radio node in the new radio, a request for the channel state reference signal of the user equipment; and (iii) receiving, from the new radio node in the new radio, the supported configuration for the UE. While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:
1. An apparatus for wireless communication comprising:
a processor; and
a non-transitory memory operably coupled to the processor, the non-transitory memory storing executable instructions that when executed by the processor, cause the processor to perform:

monitoring a first beamforming training reference signal (BT-RS) and physical broadcast channel (PBCH) of a network node to acquire symbol timing and subframe timing, where a common part of the PBCH includes a beam ID;

transmitting, to the network node, a beam ID feedback with a unique training sequence generated based on the beam ID to establish a radio resource control (RRC) connection;

receiving, from the network node, a second BT-RS to perform beamforming training; and receiving, from the network node, downlink control information (DCI) carrying plural beam IDs, wherein the plural beam IDs are associated with plural beams that are configured via RRC signaling, and resources of the second BT-RS are configured by a RRC message via the RRC connection.

2. The apparatus of claim 1, wherein
the beamforming training is triggered by the DCI, and
the beamforming training is on-demand beamforming training.

3. The apparatus of claim 2, wherein the DCI carries one or more of an ID of the apparatus, a beam sweeping pattern of a beamforming training control channel of the network node, uplink dedicated resources, group ID, beam training reference signal transmission pattern, and downlink resources.

4. The apparatus of claim 1, wherein the second BT-RS is configured to be semi-persistent or aperiodic.

5. The apparatus of claim 1, wherein the processor is further configured to execute the instructions of receiving the second BT-RS via a beam associated with the beam ID transmitted to the network node.

6. The apparatus of claim 5, wherein the processor is further configured to execute the instructions of sending a data packet via the beam of the network node.

7. The apparatus of claim 1, wherein the processor is further configured to execute the instructions of decoding the PBCH.

8. The apparatus of claim 1, wherein the processor is further configured to execute the instructions of determining an optimal transmission beam of the network node for uplink based on the first BT-RS.

9. The apparatus of claim 1, wherein the processor is further configured to execute the instructions of sweeping the first BT-RS through a beam of a symbol.

10. The apparatus of claim 9, wherein the sweeping instructions are performed on an uplink common channel.

11. The apparatus of claim 2, wherein an interval of the beamforming training includes the DCI indicating one-on-one beamforming training.

12. An apparatus for wireless communication, the apparatus comprising:
a processor; and
a non-transitory memory operably coupled to the processor, the non-transitory memory storing executable instructions that when executed by the processor cause the processor to effectuate operations comprising:
transmitting, to a user equipment (UE), a first beamforming training reference signal (BT-RS) and physical broadcast channel (PBCH) for acquiring symbol timing and subframe timing, where a common part of the PBCH includes a beam ID;
receiving, from the UE, a beam ID feedback with a unique training sequence generated based on the beam ID to establish a radio resource control (RRC) connection with the UE; and
transmitting, to the UE, a second BT-RS to perform beamforming training,
transmitting, to the UE, downlink control information (DCI) carrying plural beam IDs, wherein
the plural beam IDs are associated with plural beams that are configured via RRC signaling, and
resources of the second BT-RS are configured by a RRC message via the RRC connection.

13. The apparatus of claim 12, wherein the beamforming training is on-demand beamforming training.

14. The apparatus of claim 12, wherein
the beamforming training is triggered by the DCI.

15. The apparatus of claim 14, wherein the DCI carries one or more of an ID of the UE, a beam sweeping pattern of a beamforming training control channel of the apparatus, uplink dedicated resources, group ID, beam training reference signal transmission pattern, and downlink resources.

16. The apparatus of claim 12, wherein the second BT-RS is configured to be semi-persistent or aperiodic.

17. The apparatus of claim 12, wherein the processor is further configured to execute the instructions of sending, to the UE, the second BT-RS via a beam associated with the beam ID.

18. The apparatus of claim 17, wherein the processor is further configured to execute the instructions of receiving a data packet via the beam from the UE.

19. The apparatus of claim 12, wherein the processor is further configured to execute the instructions of receiving, from the UE, a determined optimal transmission beam of the apparatus for uplink based on the first BT-RS.

20. The apparatus of claim 12, wherein an interval of the beamforming training includes a guard time preceding uplink common channels, and DCI preceding the guard time.

* * * * *